United States Patent [19]

Hata et al.

[11] Patent Number: 4,984,876

[45] Date of Patent: Jan. 15, 1991

[54] ZOOM LENS SYSTEM

[75] Inventors: Kazuyoshi Hata; Masami Tanaka, Osaka, Japan

[73] Assignee: Minolta Camera Kabushiki Kaisha, Osaka, Japan

[21] Appl. No.: 244,796

[22] Filed: Sep. 15, 1988

[30] Foreign Application Priority Data

| Sep. 16, 1987 | [JP] | Japan | 62-231293 |
| Sep. 16, 1987 | [JP] | Japan | 62-231294 |
| Sep. 16, 1987 | [JP] | Japan | 62-231295 |
| Sep. 16, 1987 | [JP] | Japan | 62-231296 |
| Sep. 21, 1987 | [JP] | Japan | 62-236493 |
| Sep. 21, 1987 | [JP] | Japan | 62-236494 |
| Sep. 21, 1987 | [JP] | Japan | 62-236495 |
| Sep. 30, 1987 | [JP] | Japan | 62-246222 |

[51] Int. Cl.$^5$ ............................................. G02B 15/00
[52] U.S. Cl. ..................................... 350/423; 350/475
[58] Field of Search ........................ 350/423, 427, 475

[56] References Cited

U.S. PATENT DOCUMENTS 3,160,699 12/1964 Yamaji ................................ 350/427
4,673,258 6/1987 Masumoto ......................... 350/423

Primary Examiner—Paul M. Dzierzynski
Attorney, Agent, or Firm—Price, Gess & Ubell

[57] ABSTRACT

A zoom lens system comprises from the object side to the image side: a first lens unit of a positive refractive power; a second lens unit of a negative refractive power; and a third lens unit of a positive refractive power; wherein one of the first and third lens units is shiftable along the optical axis of the lens system in both of the zooming operation and the focusing operation, and the second lens unit is also shiftable along the optical axis of the lens system in the zooming operation.

39 Claims, 43 Drawing Sheets

FIG.4
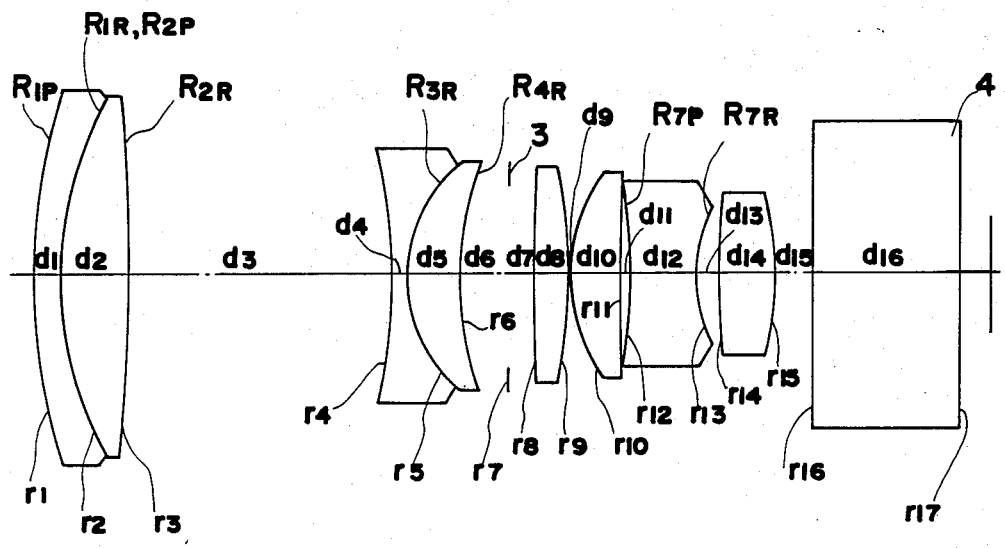
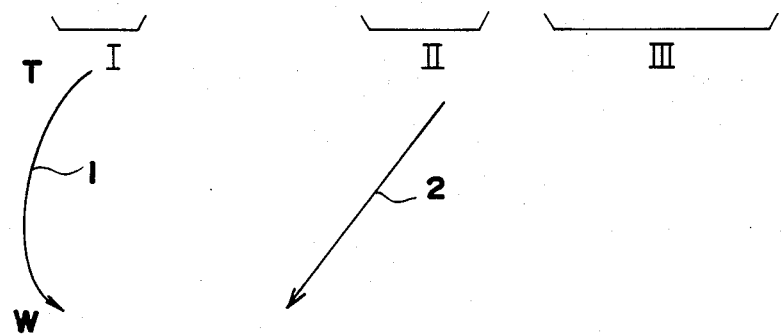

F1.63

— d
---- SC

-0.2  0.2
Spherical Aberration
Sine Condition

Y'4.1

---- DM
—— DS

-0.2  0.2
Astigmatism

Y'4.1

-5.0  5.0
Distortion %

F1.63

— d
---- SC

-0.2  0.2
Spherical Aberration
Sine Condition

Y'4.1

---- DM
—— DS

-0.2  0.2
Astigmatism

Y'4.1

-5.0  5.0
Distortion %

F1.63

— d
---- SC

-0.2  0.2
Spherical Aberration
Sine Condition

Y'4.1

---- DM
—— DS

-0.2  0.2
Astigmatism

Y'4.1

-5.0  5.0
Distortion %

F1.63

—— d
---- SC

-0.2  0.2
Spherical Aberration
Sine Condition

Y'4.1

---- DM
—— DS

-0.2  0.2
Astigmatism

Y'4.1

-5.0  5.0
Distortion %

F1.63

—— d
---- SC

-0.2  0.2
Spherical Aberration
Sine Condition

Y'4.1

---- DM
—— DS

-0.2  0.2
Astigmatism

Y'4.1

-5.0  5.0
Distortion %

F1.63

—— d
---- SC

-0.2  0.2
Spherical Aberration
Sine Condition

Y'4.1

---- DM
—— DS

-0.2  0.2
Astigmatism

Y'4.1

-5.0  5.0
Distortion %

F1.63
— d
---- SC
-0.2  0.2
Spherical Aberration
Sine Condition

Y'4.1
---- DM
— DS
-0.2  0.2
Astigmatism

Y'4.1
-5.0  5.0
Distortion %

F1.63
— d
---- SC
-0.2  0.2
Spherical Aberration
Sine Condition

Y'4.1
---- DM
— DS
-0.2  0.2
Astigmatism

Y'4.1
-0.5  5.0
Distortion %

F1.63
— d
---- SC
-0.2  0.2
Spherical Aberration
Sine Condition

Y'4.1
---- DM
— DS
-0.2  0.2
Astigmatism

Y'4.1
-5.0  5.0
Distortion %

F1.63

—— d
---- SC

-0.2  0.2
Spherical Aberration
Sine Condition

Y'4.1

---- DM
—— DS

-0.2  0.2
Astigmatism

Y'4.1

-5.0  5.0
Distortion  %

F1.63

—— d
---- SC

-0.2  0.2
Spherical Aberration
Sine Condition

Y'4.1

---- DM
—— DS

-0.2  0.2
Astigmatism

Y'4.1

-5.0  5.0
Distortion  %

F1.63

—— d
---- SC

-0.2  0.2
Spherical Aberration
Sine Condition

Y'4.1

---- DM
—— DS

-0.2  0.2
Astigmatism

Y'4.1

-5.0  5.0
Distortion  %

F1.63

—— d
---- SC

-0.2  0.2
Spherical Aberration
Sine Condition

Y'4.1

---- DM
—— DS

-0.2  0.2
Astigmatism

Y'4.1

-5.0  5.0
Distortion  %

F1.63

—— d
---- SC

-0.2  0.2
Spherical Aberration
Sine Condition

Y'4.1

---- DM
—— DS

-0.2  0.2
Astigmatism

Y'4.1

-5.0  5.0
Distortion  %

F1.63

—— d
---- SC

-0.2  0.2
Spherical Aberration
Sine Condition

Y'4.1

---- DM
—— DS

-0.2  0.2
Astigmatism

Y'4.1

-5.0  5.0
Distortion  %

F1.63

—— d
---- SC

-0.2   0.2
Spherical Aberration
Sine Condition

Y'4.1

---- DM
—— DS

-0.2   0.2
Astigmatism

Y'4.1

-5.0   5.0
Distortion %

F1.63

—— d
---- SC

-0.2   0.2
Spherical Aberration
Sine Condition

Y'4.1

---- DM
—— DS

-0.2   0.2
Astigmatism

Y'4.1

-5.0   5.0
Distortion %

F1.63

—— d
---- SC

-0.2   0.2
Spherical Aberration
Sine Condition

Y'4.1

---- DM
—— DS

-0.2   0.2
Astigmatism

Y'4.1

-5.0   5.0
Distortion %

F1.44
— d
---- SC
-0.2  0.2
Spherical Aberration
Sine Condition

Y'4.1
---- DM
—— DS
-0.2  0.2
Astigmatism

Y'4.1
-5.0  5.0
Distortion  %

F1.44
— d
---- SC
-0.2  0.2
Spherical Aberration
Sine Condition

Y'4.1
---- DM
—— DS
-0.2  0.2
Astigmatism

Y'4.1
-5.0  5.0
Distortion  %

F1.44
— d
---- SC
-0.2  0.2
Spherical Aberration
Sine Condition

Y'4.1
---- DM
—— DS
-0.2  0.2
Astigmatism

Y'4.1
-5.0  5.0
Distortion  %

F1.72

— d
---- SC

-0.2  0.2
Spherical Aberration
Sine Condition

Y'4.1

---- DM
—— DS

-0.2  0.2
Astigmatism

Y'4.1

-5.0  5.0
Distortion  %

F1.44

— d
---- SC

-0.2  0.2
Spherical Aberration
Sine Condition

Y'4.1

---- DM
—— DS

-0.2  0.2
Astigmatism

Y'4.1

-5.0  5.0
Distortion  %

F1.44

— d
---- SC

-0.2  0.2
Spherical Aberration
Sine Condition

Y'4.1

---- DM
—— DS

-0.2  0.2
Astigmatism

Y'4.1

-5.0  5.0
Distortion  %

F1.63

-0.2  0.2
Spherical Aberration
Sine Condition
— d
---- SC

Y'4.1

-0.2  0.2
Astigmatism
---- DM
— DS

Y'4.1

-5.0  5.0
Distortion  %

F1.63

-0.2  0.2
Spherical Aberration
Sine Condition
— d
---- SC

Y'4.1

-0.2  0.2
Astigmatism
---- DM
— DS

Y'4.1

-5.0  5.0
Distortion  %

F1.63

-0.2  0.2
Spherical Aberration
Sine Condition
— d
---- SC

Y'4.1

-0.2  0.2
Astigmatism
---- DM
— DS

Y'4.1

-5.0  5.0
Distortion  %

F1.70

Spherical Aberration
Sine Condition

Y'4.1

Astigmatism

Y'4.1

Distortion %

F1.63

Spherical Aberration
Sine Condition

Y'4.1

Astigmatism

Y'4.1

Distortion %

F1.63

Spherical Aberration
Sine Condition

Y'4.1

Astigmatism

Y'4.1

Distortion %

F1.71

Spherical Aberration
Sine Condition

Y'4.1

Astigmatism

Y'4.1

Distortion %

F1.63

Spherical Aberration
Sine Condition

Y'4.1

Astigmatism

Y'4.1

Distortion %

F1.63

Spherical Aberration
Sine Condition

Y'4.1

Astigmatism

Y'4.1

Distortion %

FIG.44a FI.65 Spherical Aberration Sine Condition
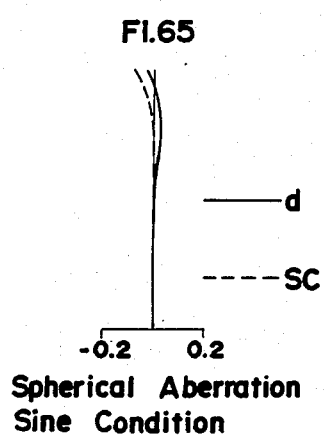
FIG.44b Y'4.1 Astigmatism
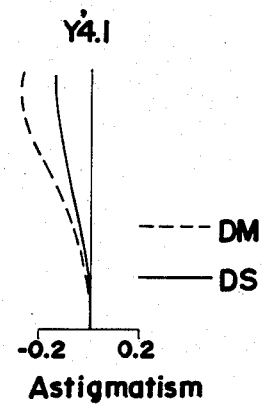
FIG.44c Y'4.1 Distortion %
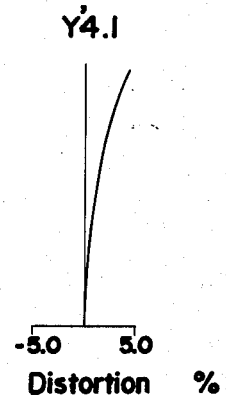
FIG.45a F1.52 Spherical Aberration Sine Condition
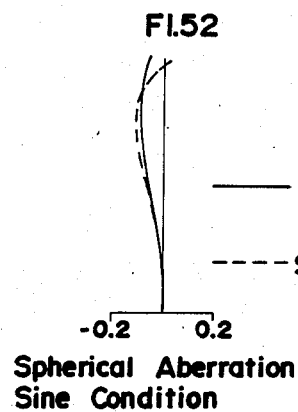
FIG.45b Y'4.1 Astigmatism
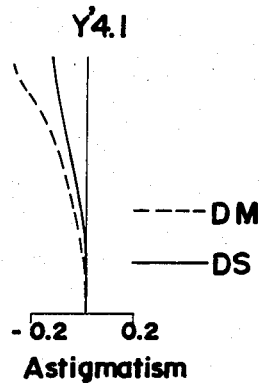
FIG.45c Y'4.1 Distortion %
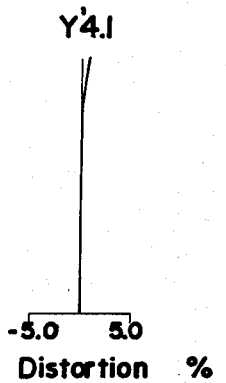
FIG.46a F1.52 Spherical Aberration Sine Condition
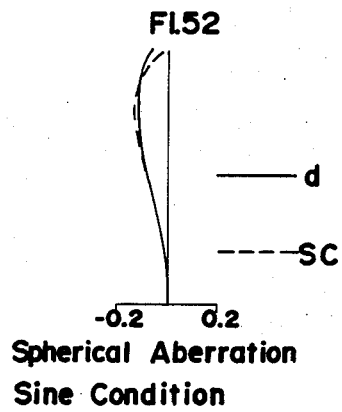
FIG.46b Y'4.1 Astigmatism
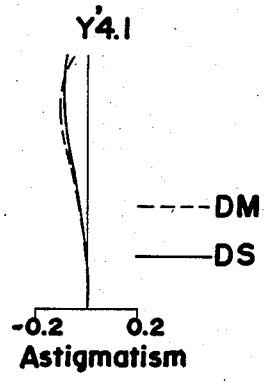
FIG.46c Y'4.1 Distortion %
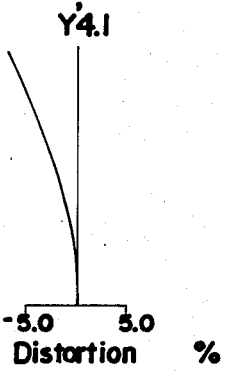

FI.65

—— d
---- SC

-0.2  0.2
Spherical Aberration
Sine Condition

Y'4.1

---- DM
—— DS

-0.2  0.2
Astigmatism

Y'4.1

-5.0  5.0
Distortion  %

FI.52

—— d
---- SC

-0.2  0.2
Spherical Aberration
Sine Condition

Y'4.1

---- DM
—— DS

-0.2  0.2
Astigmatism

Y'4.1

-5.0  5.0
Distortion  %

FI.52

—— d
---- SC

-0.2  0.2
Spherical Aberration
Sine Condition

Y'4.1

---- DM
—— DS

-0.2  0.2
Astigmatism

Y'4.1

-5.0  5.0
Distortion  %

F1.65

-0.2  0.2
Spherical Aberration
Sine Condition

Y'4.1

-0.2  0.2
Astigmatism

Y'4.1

-5.0  5.0
Distortion   %

F1.63

-0.2  0.2
Spherical Aberration
Sine Condition

Y'4.1

-0.2  0.2
Astigmatism

Y'4.1

-5.0  5.0
Distortion   %

F1.63

-0.2  0.2
Spherical Aberration
Sine Condition

Y'4.1

-0.2  0.2
Astigmatism

Y'4.1

-5.0  5.0
Distortion   %

F1.63
— d
---- SC
-0.2   0.2
Spherical Aberration
Sine Condition

Y'4.1
---- DM
—— DS
-0.2   0.2
Astigmatism

Y'4.1
-5.0   5.0
Distortion  %

F1.63
— d
---- SC
-0.2   0.2
Spherical Aberration
Sine Condition

Y'4.1
---- DM
—— DS
-0.2   0.2
Astigmatism

Y'4.1
-5.0   5.0
Distortion  %

F1.63
— d
---- SC
-0.2   0.2
Spherical Aberration
Sine Condition

Y'4.1
---- DM
—— DS
-0.2   0.2
Astigmatism

Y'4.1
-5.0   5.0
Distortion  %

F1.63

Spherical Aberration
Sine Condition

Y'4.1

Astigmatism

Y'4.1

Distortion %

F1.63

Spherical Aberration
Sine Condition

Y'4.1

Astigmatism

Y'4.1

Distortion %

F1.63

Spherical Aberration
Sine Condition

Y'4.1

Astigmatism

Y'4.1

Distortion %

F1.52

Spherical Aberration  
Sine Condition

Y'4.1

Astigmatism

Y'4.1

Distortion %

F1.44

Spherical Aberration  
Sine Condition

Y'4.1

Astigmatism

Y'4.1

Distortion %

F1.44

Spherical Aberration  
Sine Condition

Y'4.1

Astigmatism

Y'4.1

Distortion %

F1.69

-0.2  0.2
Spherical Aberration
Sine Condition
— d
--- SC

Y'4.1

-0.2  0.2
Astigmatism
--- DM
— DS

Y'4.1

-5.0  5.0
Distortion  %

F1.44

-0.2  0.2
Spherical Aberration
Sine Condition
— d
--- SC

Y'4.1

-0.2  0.2
Astigmatism
--- DM
— DS

Y'4.1

-5.0  5.0
Distortion  %

F1.44

-0.2  0.2
Spherical Aberration
Sine Condition
— d
--- SC

Y'4.1

-0.2  0.2
Astigmatism
--- DM
— DS

Y'4.1

-5.0  5.0
Distortion  %

F1.74

—— d
---- SC

-0.2   0.2
Spherical Aberration
Sine Condition

Y'4.1

---- DM
—— DS

-0.2   0.2
Astigmatism

Y'4.1

-5.0   5.0
Distortion   %

F1.61

—— d
---- SC

-0.2   0.2
Spherical Aberration
Sine Condition

Y'4.1

---- DM
—— DS

-0.2   0.2
Astigmatism

Y'4.1

-5.0   5.0
Distortion   %

F1.61

—— d
---- SC

-0.2   0.2
Spherical Aberration
Sine Condition

Y'4.1

---- DM
—— DS

-0.2   0.2
Astigmatism

Y'4.1

-5.0   5.0
Distortion   %

F1.75
Spherical Aberration
Sine Condition

Y4.1
Astigmatism

Y4.1
Distortion %

F1.61
Spherical Aberration
Sine Condition

Y4.1
Astigmatism

Y4.1
Distortion %

F1.61
Spherical Aberration
Sine Condition

Y4.1
Astigmatism

Y4.1
Distortion %

FIG. 71a
F1.63
— d
---- SC
-0.2  0.2
Spherical Aberration
Sine Condition
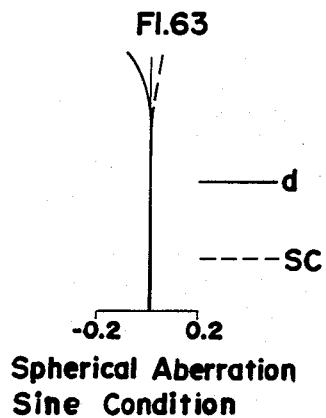
FIG. 71b
Y4.1
---- DM
—— DS
-0.2  0.2
Astigmatism
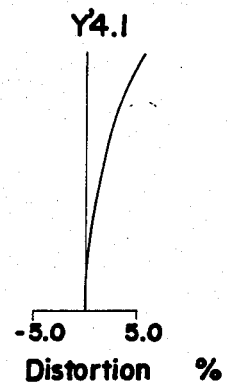
FIG. 71c
Y4.1
-5.0  5.0
Distortion  %
FIG. 72a
F1.63
— d
---- SC
-0.2  0.2
Spherical Aberration
Sine Condition
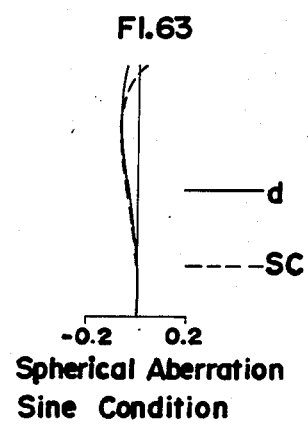
FIG. 72b
Y4.1
---- DM
—— DS
-0.2  0.2
Astigmatism
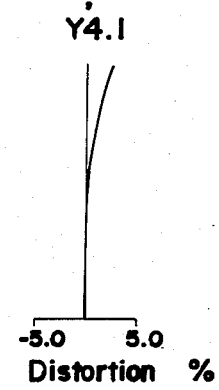
FIG. 72c
Y4.1
-5.0  5.0
Distortion  %
FIG. 73a
F1.63
— d
---- SC
-0.2  0.2
Spherical Aberration
Sine Condition
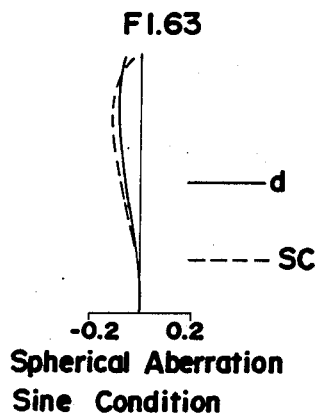
FIG. 73b
Y4.1
---- DM
—— DS
-0.2  0.2
Astigmatism
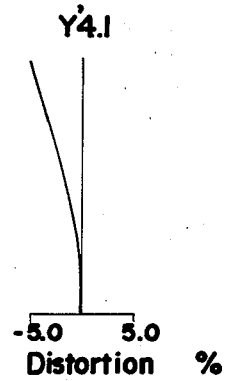
FIG. 73c
Y4.1
-5.0  5.0
Distortion  %

F1.75

—— d
---- SC

-0.2  0.2
Spherical Aberration
Sine Condition

Y'4.1

---- DM
—— DS

-0.2  0.2
Astigmatism

Y'4.1

-5.0  5.0
Distortion  %

F1.63

—— d
---- SC

-0.2  0.2
Spherical Aberration
Sine Condition

Y'4.1

---- DM
—— DS

-0.2  0.2
Astigmatism

Y'4.1

-5.0  5.0
Distortion  %

—— d
---- SC

-0.2  0.2
Spherical Aberration
Sine Condition

---- DM
—— DS

-0.2  0.2
Astigmatism

-5.0  5.0
Distortion  %

F1.53
— d
---- SC
-0.2  0.2
Spherical Aberration
Sine Condition

Y'4.1
---- DM
— DS
-0.2  0.2
Astigmatism

Y'4.1
-5.0  5.0
Distortion  %

F1.53
— d
---- SC
-0.2  0.2
Spherical Aberration
Sine Condition

Y'4.1
---- DM
— DS
-0.2  0.2
Astigmatism

Y'4.1
-5.0  5.0
Distortion  %

F1.53
— d
---- SC
-0.2  0.2
Spherical Aberration
Sine Condition

Y'4.1
---- DM
— DS
-0.2  0.2
Astigmatism

Y'4.1
-5.0  5.0
Distortion  %

F1.53

—— d
---- SC

-0.2  0.2
Spherical Aberration
Sine Condition

Y'4.1

---- DM
—— DS

-0.2  0.2
Astigmatism

Y'4.1

-5.0  5.0
Distortion  %

F1.53

—— d
---- SC

-0.2  0.2
Spherical Aberration
Sine Condition

Y'4.1

---- DM
—— DS

-0.2  0.2
Astigmatism

Y'4.1

-5.0  5.0
Distortion %

F1.53

—— d
---- SC

-0.2  0.2
Spherical Aberration
Sine Condition

Y'4.1

---- DM
—— DS

-0.2  0.2
Astigmatism

Y'4.1

-5.0  5.0
Distortion  %

F1.61

-0.2  0.2
Spherical Aberration
Sine Condition

—— d
---- SC

Y4.1

-0.2  0.2
Astigmatism

---- DM
—— DS

Y4.1

-5.0  5.0
Distortion  %

F1.61

-0.2  0.2
Spherical Aberration
Sine Condition

—— d
---- SC

Y4.1

-0.2  0.2
Astigmatism

---- DM
—— DS

Y4.1

-5.0  5.0
Distortion  %

F1.61

-0.2  0.2
Spherical Aberration
Sine Condition

—— d
---- SC

Y4.1

-0.2  0.2
Astigmatism

---- DM
—— DS

Y4.1

-5.0  5.0
Distortion  %

F1.63
—— d
---- SC
Spherical Aberration
Sine Condition

Y'4.1
---- DM
—— DS
Astigmatism

Y'4.1
Distortion %

F1.63
—— d
---- SC
Spherical Aberration
Sine Condition

Y'4.1
---- DM
—— DS
Astigmatism

Y'4.1
Distortion %

F1.63
—— d
---- SC
Spherical Aberration
Sine Condition

Y'4.1
---- DM
—— DS
Astigmatism

Y'4.1
Distortion %

F1.63

— d
---- SC

-0.2  0.2
Spherical Aberration
Sine Condition

Y'4.1

---- DM
—— DS

-0.2  0.2
Astigmatism

Y'4.1

-5.0  5.0
Distortion  %

F1.63

— d
---- SC

-0.2  0.2
Spherical Aberration
Sine Condition

Y'4.1

---- DM
—— DS

-0.2  0.2
Astigmatism

Y'4.1

-5.0  5.0
Distortion  %

F1.63

— d
---- SC

-0.2  0.2
Spherical Aberration
Sine Condition

Y'4.1

---- DM
—— DS

-0.2  0.2
Astigmatism

Y'4.1

-5.0  5.0
Distortion  %

F1.90

-0.2   0.2
Spherical Aberration
Sine Condition

——— d
---- SC

Y'4.1

-0.2   0.2
Astigmatism

---- DM
——— DS

Y'4.1

-5.0   5.0
Distortion %

F1.63

-0.2   0.2
Spherical Aberration
Sine Condition

——— d
---- SC

Y'4.1

-0.2   0.2
Astigmatism

---- DM
——— DS

Y'4.1

-5.0   5.0
Distortion %

F1.63

-0.2   0.2
Spherical Aberration
Sine Condition

——— d
---- SC

Y'4.1

-0.2   0.2
Astigmatism

---- DM
——— DS

Y'4.1

-5.0   5.0
Distortion %

F1.63

Spherical Aberration
Sine Condition

Y'4.1

Astigmatism

Y'4.1

Distortion %

F1.63

Spherical Aberration
Sine Condition

Y'4.1

Astigmatism

Y'4.1

Distortion %

F1.63

Spherical Aberration
Sine Condition

Y'4.1

Astigmatism

Y'4.1

Distortion %

F1.63

—— d
---- SC

-0.2   0.2
Spherical Aberration
Sine Condition

Y'4.1

---- DM
—— DS

-0.2   0.2
Astigmatism

Y'4.1

-5.0   5.0
Distortion   %

F1.63

—— d
---- SC

-0.2   0.2
Spherical Aberration
Sine Condition

Y'4.1

---- DM
—— DS

-0.2   0.2
Astigmatism

Y'4.1

-5.0   5.0
Distortion   %

F1.63

—— d
---- SC

-0.2   0.2
Spherical Aberration
Sine Condition

Y'4.1

---- DM
—— DS

-0.2   0.2
Astigmatism

Y'4.1

-5.0   5.0
Distortion   %

F1.63
Spherical Aberration
Sine Condition
—— d
---- SC
-0.2  0.2

Y4.1
Astigmatism
---- DM
—— DS
-0.2  0.2

Y4.1
Distortion  %
-5.0  5.0

F1.63
Spherical Aberration
Sine Condition
—— d
---- SC
-0.2  0.2

Y4.1
Astigmatism
---- DM
—— DS
-0.2  0.2

Y4.1
Distortion  %
-5.0  5.0

F1.63
Spherical Aberration
Sine Condition
—— d
---- SC
-0.2  0.2

Y4.1
Astigmatism
---- DM
—— DS
-0.2  0.2

Y4.1
Distortion  %
-5.0  5.0

F 1.63

-0.2   0.2
Spherical Aberration
Sine Condition
—— d
---- SC

Y'4.1

-0.2   0.2
Astigmatism
---- DM
—— DS

Y'4.1

-5.0   5.0
Distortion   %

F 1.63

-0.2   0.2
Spherical Aberration
Sine Condition
—— d
---- SC

Y'4.1

-0.2   0.2
Astigmatism
---- DM
—— DS

Y'4.1

-5.0   5.0
Distortion   %

F 1.63

-0.2   0.2
Spherical Aberration
Sine Condition
—— d
---- SC

Y'4.1

-0.2   0.2
Astigmatism
---- DM
—— DS

Y'4.1

-5.0   5.0
Distortion   %

F1.68

-0.2   0.2
Spherical Aberration
Sine Condition

Y'4.1

-0.2   0.2
Astigmatism

Y'4.1

-5.0   5.0
Distortion   %

F1.63

-0.2   0.2
Spherical Aberration
Sine Condition

Y'4.1

-0.2   0.2
Astigmatism

Y'4.1

-5.0   5.0
Distortion   %

F1.63

-0.2   0.2
Spherical Aberration
Sine Condition

Y'4.1

-0.2   0.2
Astigmatism

Y'4.1

-5.0   5.0
Distortion   %

ZOOM LENS SYSTEM

BACKGROUND OF THE INVENTION

1. Field of the Invention

The present invention relates to a zoom lens system and more particularly to a zoom lens system applicable to a video camera or a still video camera.

2. Description of the Prior Art

Recently, since the compactness of a plurality of electric circuits and integrated circuits contained in a video camera system and the like are improved, the lens system contained in such a camera system possesses large rate in size and in weight in whole of the camera system. The cost of the lens system also possesses so large rate as to prevent from lowering the cost of the whole camera system. The compactness in size, the lightness in weight and the low cost are indispensable for such video camera system. Therefore, how to construct the lens system as compact in size, light in weight, and low in cost as possible is an important matter.

A solution of the above matter often results in abandoning the use of the zoom lens system and adopting a fixed focal length lens system. Though the adoption of the fixed focal length lens system realizes the compactness in size, the lightness in weight and the low in cost of the whole camera system, the charm is much reduced because of the fixed focal length thereof. A focal length of a lens system can be altered by attaching a converter or an attachment thereto. However, such convertor or attachment should be carried separately from a camera body. Additionally, it is hard to be said that the smaller size, lighter weight and lower cost have been realized, if the converter or attachment is considered to be included in whole of the system. Also, in recent years, a lens shutter camera including a converter has been proposed so that the converter can be inserted to or retracted from a photographing path to convert the compound focal length of its photographing lens system. However, it is also hard to be said that such lens shutter camera realizes the smaller size, lighter weight and lower cost. Additionally, since the zoom ratio realized by such lens shutter camera is relatively small as 2.0 and it is impossible to change the compound focal length with continuing photographing operations, the charm is also much reduced.

Then, a zoom lens system is considered to be applied again. However, most of conventional zoom lens systems are designed to achieve a high zoom ratio, and therefore are large in size and very expensive. Contrary, Japanese Laid-Open Patent Application No. 143311/1983 proposed a zoom lens system designed to realize the compactness in size, light in weight and low in cost with a low zoom ratio, but such a proposed zoom lens system can not be put in practical use because of its insufficient correction of aberrations, particular of the chromatic aberration.

SUMMARY OF THE INVENTION

An object of the present invention is to provide a zoom lens system in which both of first and second lens units, counted from the object side, have simple constructions with well correcting various aberrations.

The other object of the present invention is to provide a zoom lens system in which the fluctuation of aberrations due to the zooming operation can be decreased and the remaining aberrations can be corrected well even if the lens system is set to its shortest focal length condition.

Further other object of the present invention is to provide a zoom lens system in which the total length of the zoom lens system is shortened with maintaining a large aperture ratio and with a small number of lens elements.

Further other object of the present invention is to provide a zoom lens system in which its focusing operation is performed by shifting at least a part of the zoom lens group shiftable in the zooming operation so as to be suitable for automatic focusing operation with making the construction of lens barrel more simple.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

To achieve the above-described objects, an aspect of the present invention provides a compact zoom lens system comprising from the object side to the image side: a first lens unit of a positive refractive power, consisting of a negative meniscus lens element having an object side surface convex to the object side, and a bi-convex lens element whose object side surface has stronger refractive power than its image side surface has; a second lens unit of a negative refractive power, consisting of a negative lens element whose object side surface has stronger refractive power than its image side surface has, and a positive meniscus lens element having an object side surface convex to the object side; and a third lens unit of a negative refractive power; wherein the second lens unit and one of the first and third lens units are shiftable along the optical axis of the lens system in the zooming operation while another thereof is stationary on the optical axis in the zooming operation.

According to the other aspect of the present invention, a zoom lens system comprises from the object side to the image side: a first lens unit of a positive refractive power; a second lens unit of a negative refractive power; and a third lens unit of a positive refractive power; wherein one of the first and third lens units is shiftable along the optical axis of the lens system in both of the zooming operation and the focusing operation, and the second lens unit is also shiftable along the optical axis of the lens system in the zooming operation.

According to the further other aspect of the present invention, a zoom lens system comprises from the object side to the image side: a first lens unit of a positive refractive power, consisting of from the object side to the image side, a negative meniscus lens element having an object side surface convex to the object side, and a bi-convex lens element whose object side surface has stronger refractive power than its image side surface has; a second lens unit of a negative refractive power, consisting of a negative lens element whose image side surface has stronger refractive power than its object side surface has, and a negative compound lens component in which a negative lens element is cemented a positive lens element; and a third lens unit of a positive refractive power; wherein the second lens unit and one of the first and third lens units are shiftable along the optical axis of the lens system in the zooming operation, while another thereof is stationary on the optical axis in the zooming operation.

BRIEF DESCRIPTION OF THE DRAWINGS

FIGS. 4 represents a cross sectional view of the lens system according to a fifteenth embodiment of the present invention in the longest focal length condition;

FIGS. 44a to 44c represent the aberration curves of the twelfth embodiment for the longest focal length condition in the infinity focusing condition;

FIGS. 45a to 45c represent the aberration curves of the twelfth embodiment for the medium focal length condition in the infinity focusing condition;

FIGS. 46a to 46c represent the aberration curves of the twelfth embodiment for the shortest focal length condition in the infinity focusing condition;

FIGS. 71a to 71c represent the aberration curves of the twenty-first embodiment for the longest focal length condition in the infinity focusing condition;

FIGS. 72a to 72c represent the aberration curves of the twenty-first embodiment for the medium focal length condition in the infinity focusing condition;

FIGS. 73a to 73c represent the aberration curves of the twenty-first embodiment for the shortest focal length condition in the infinity focusing condition;

DETAILED DESCRIPTION OF THE PREFERRED EMBODIMENTS

The following description is provided to enable any person skilled in the commercial camera and video field to make and use the invention and sets forth the best modes contemplated by the inventors for carrying out their invention. Various modifications, however, will remain readily apparent to those skilled in the art, since the generic principles of the present invention have been defined herein specifically to provide a relatively economical and easily manufactured compact zoom lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with a video camera or various compact cameras such as a still video camera.

Figure 1:
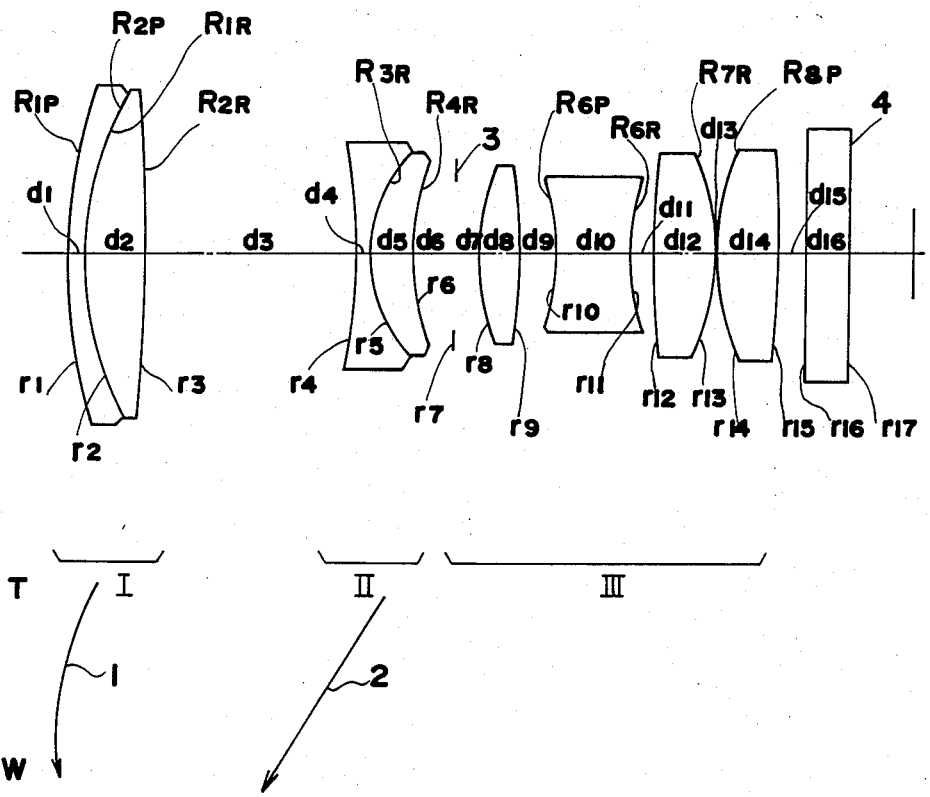
FIGS. 1 represents a cross sectional view of the lens system according to a first and a second embodiments of the present invention in the longest focal length condition.
Figure 2:
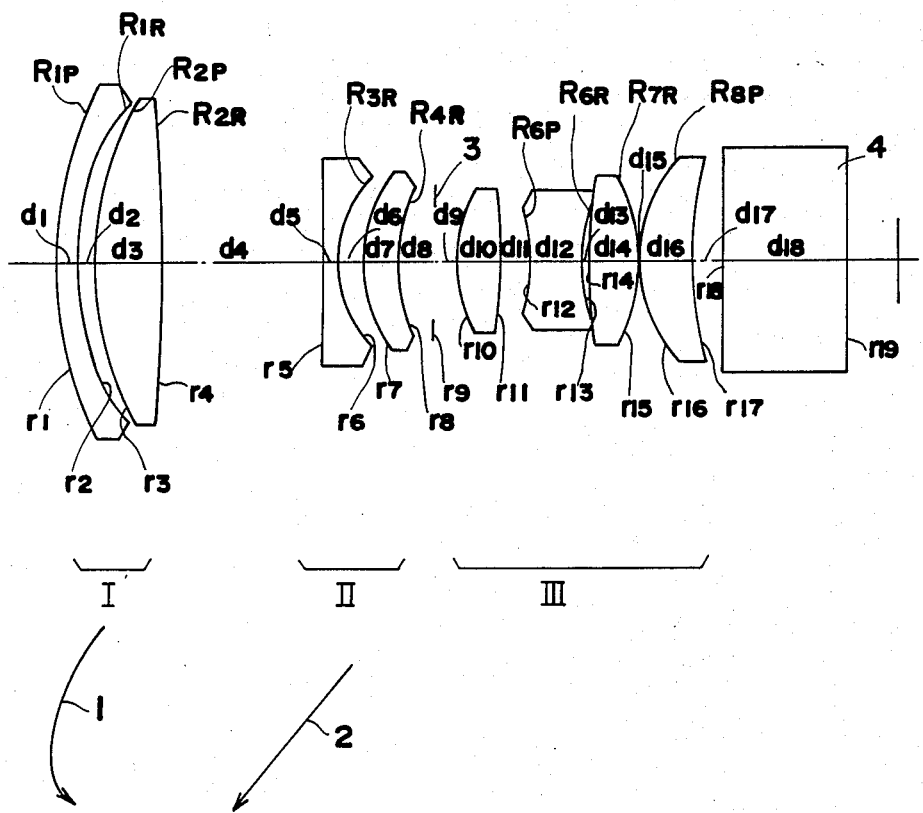
FIGS. 2 represents a cross sectional view of the lens system according to a third to eighth embodiments of the present invention in the longest focal length condition.
Figure 3:
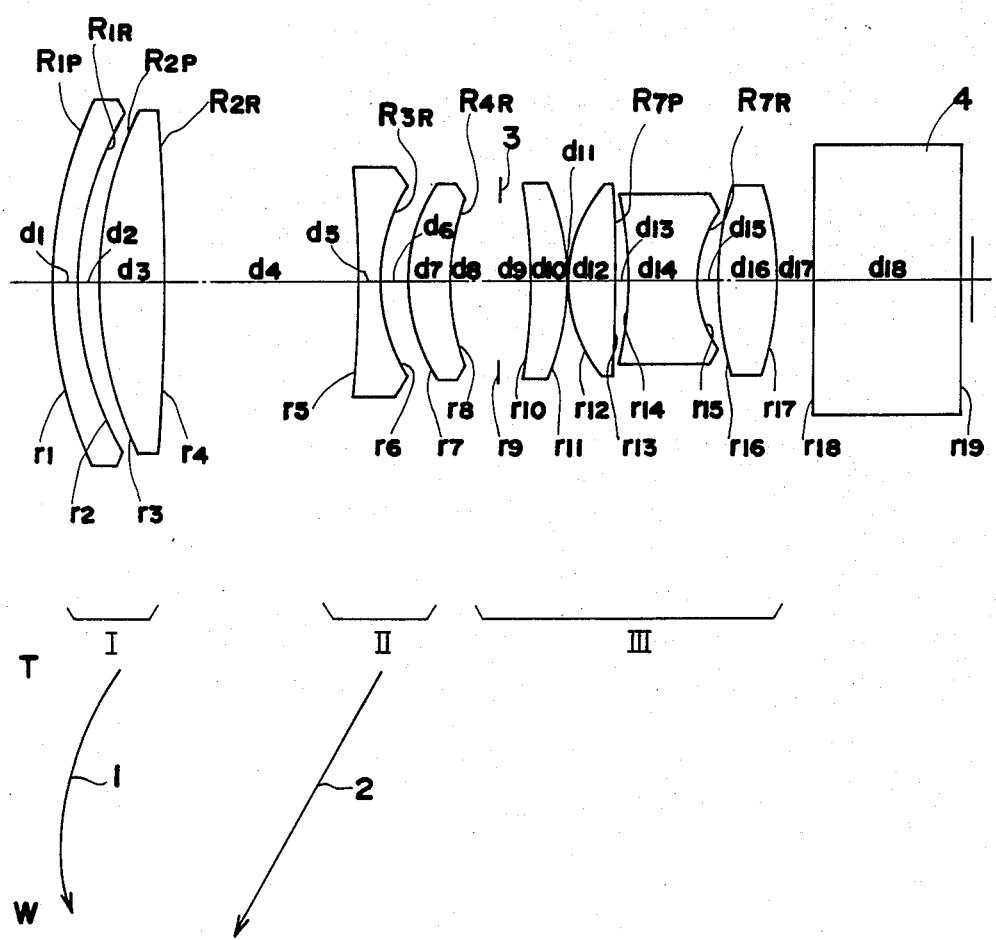
FIGS. 3 represents a cross sectional view of the lens system according to a ninth to fourteenth embodiments of the present invention in the longest focal length condition.
Figure 5:
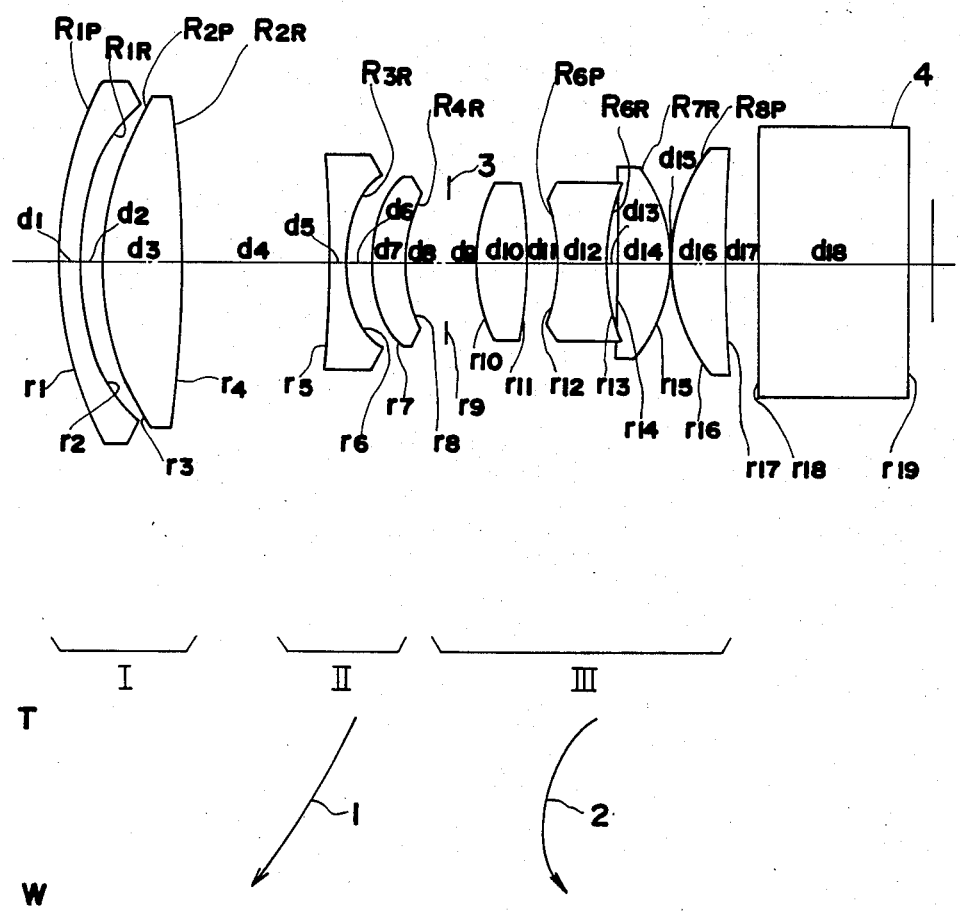
FIGS. 5 represents a cross sectional view of the lens system according to a sixteenth to twenty-first embodiments of the present invention in the longest focal length condition.
Figure 6:
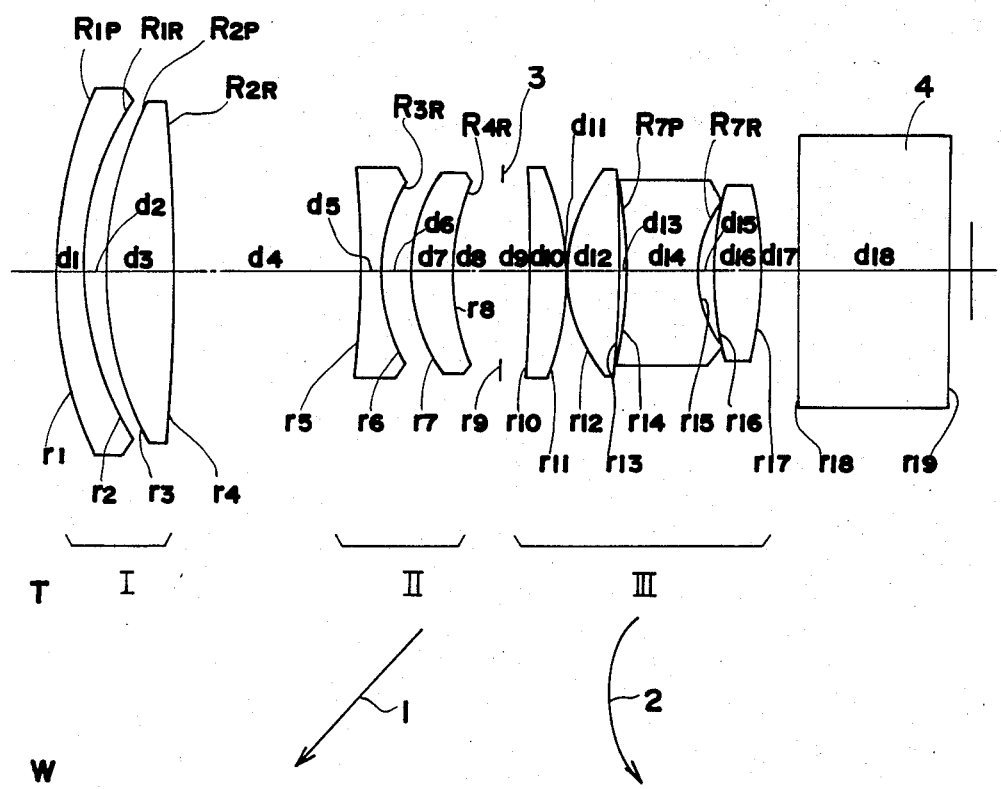
FIGS. 6 represents a cross sectional view of the lens system according to a twenty-second to twenty-fifth embodiments of the present invention in the longest focal length condition.
Figure 7:
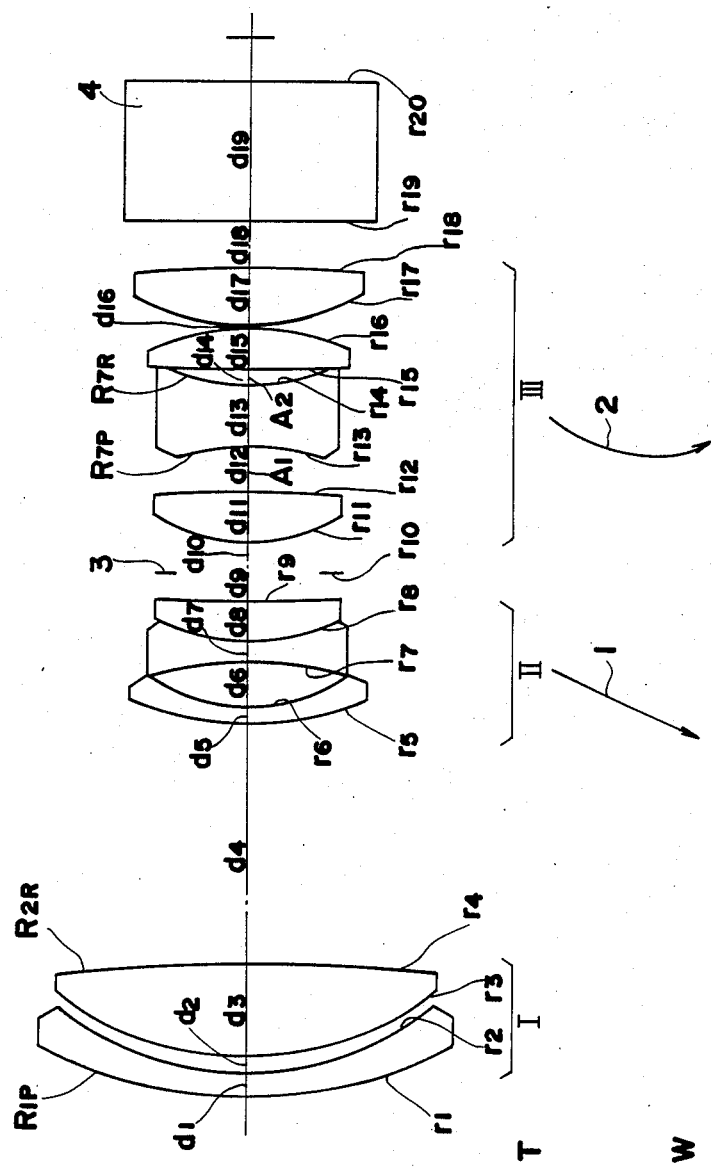
FIGS. 7 represents a cross sectional view of the lens system according to a twenty-sixth and a twenty-seventh embodiments of the present invention in the longest focal length condition.
Figure 8:
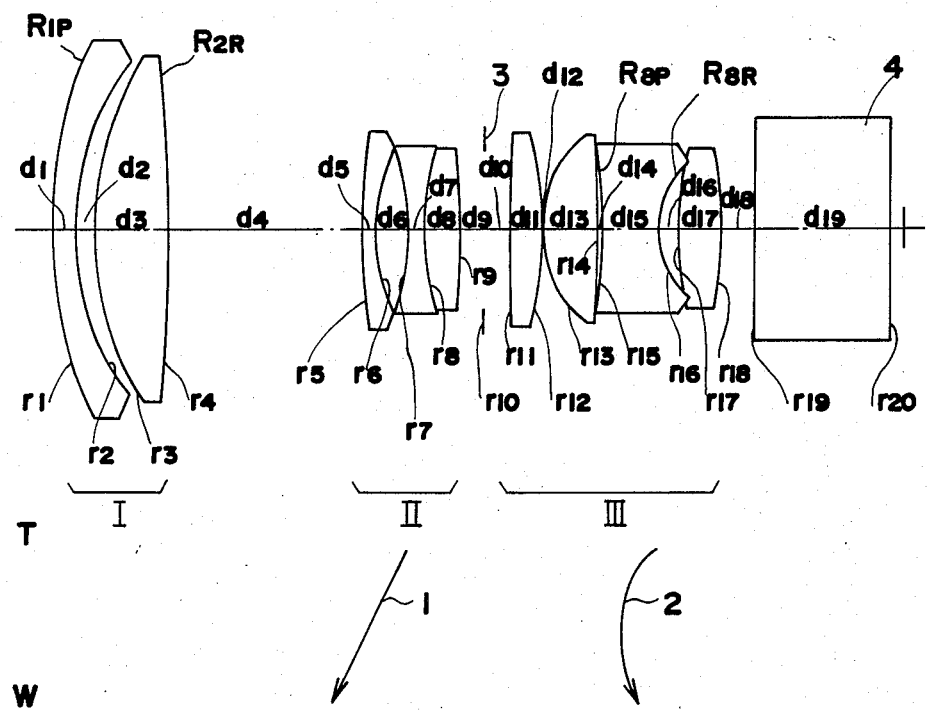
FIGS. 8 represents a cross sectional view of the lens system according to a twenty-sixth embodiment of the present invention in the longest focal length condition.
Figure 9:
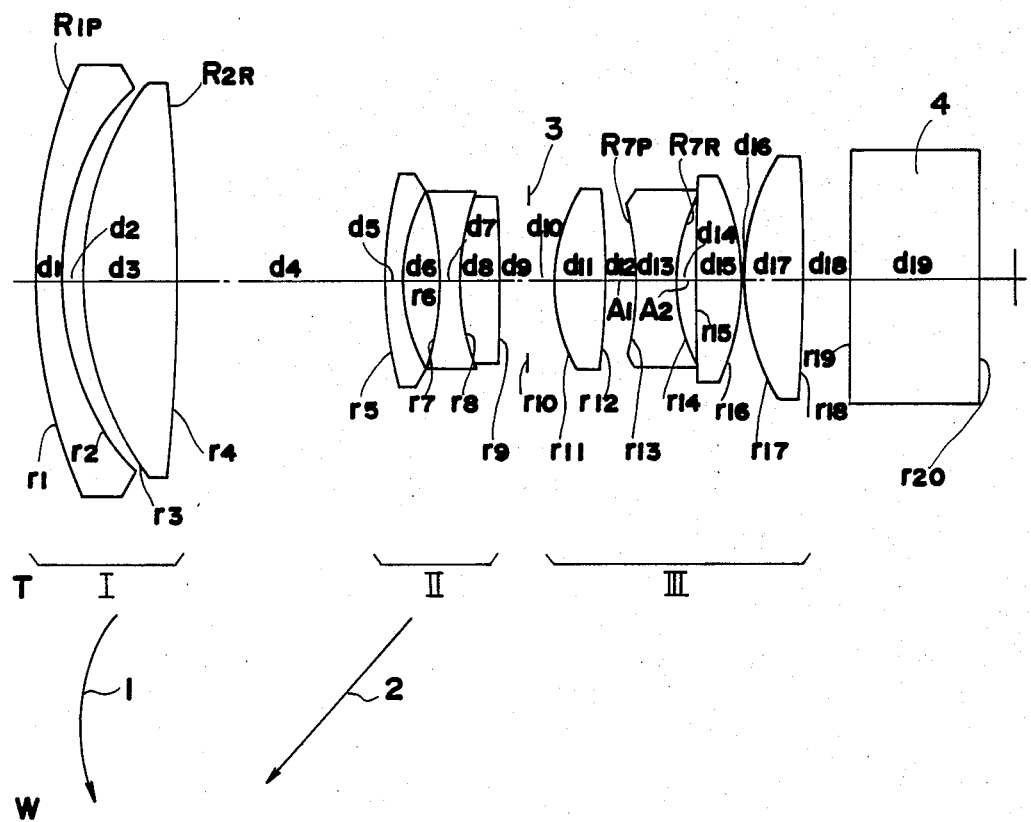
FIGS. 9 represents a cross sectional view of the lens system according to a twenty-ninth to thirty-second embodiments of the present invention in the longest focal length condition.
Figure 10:
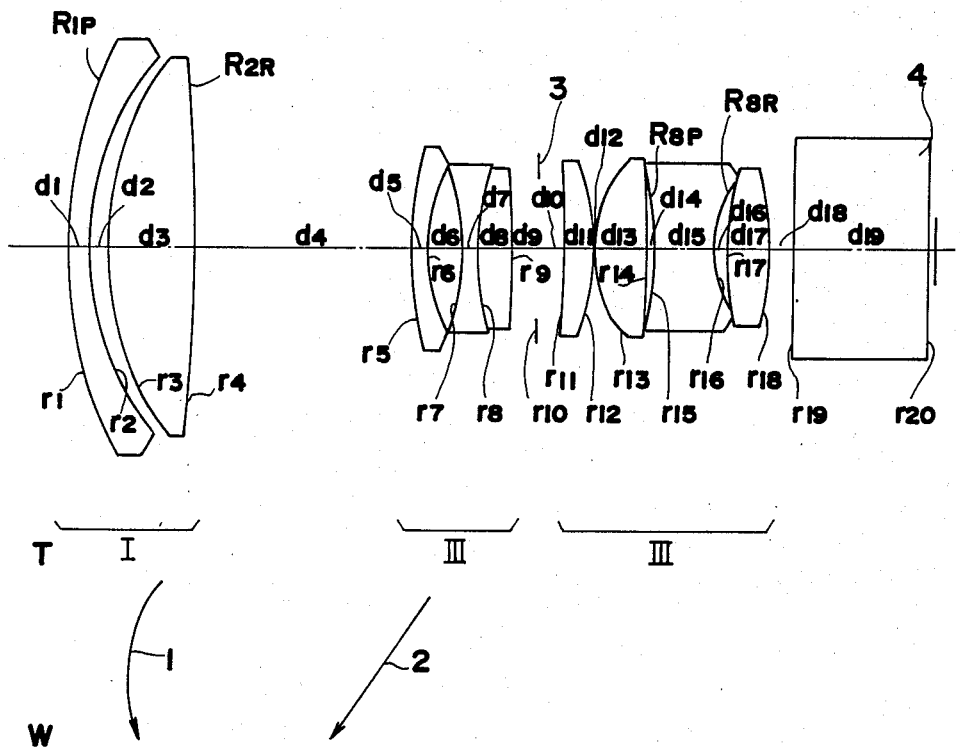
FIGS. 10 represents a cross sectional view of the lens system according to a thirty-third embodiment of the present invention in the longest focal length condition.
Figure 11A:
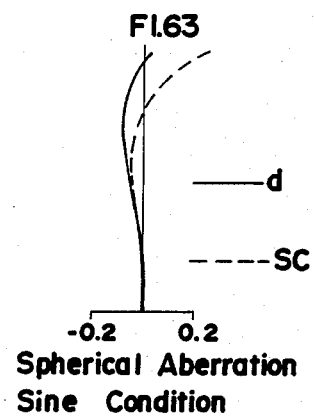
FIGS. 11a to 11c represent the aberration curves of the first embodiment for the longest focal length condition in the infinity focusing condition.
Figure 11B:
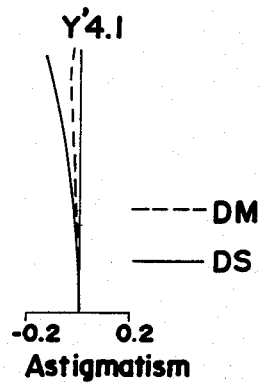
Figure 11C:
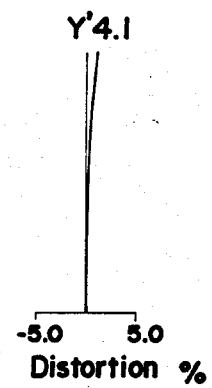
Figure 12A:
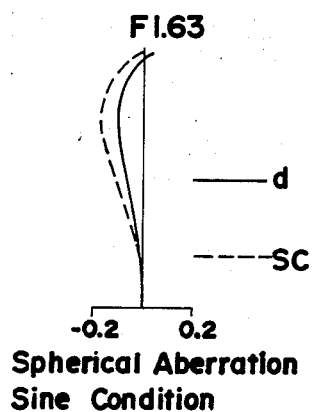
FIGS. 12a to 12c represent the aberration curves of the first embodiment for the medium focal length condition in the infinity focusing condition.
Figure 12B:
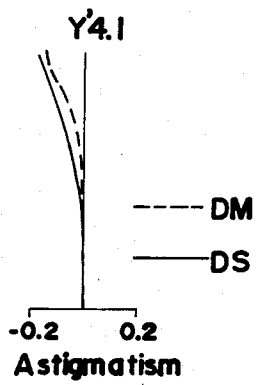
Figure 12C:
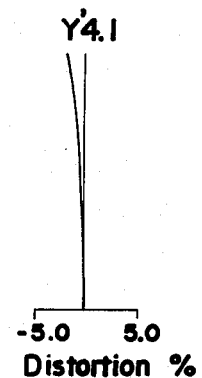
Figure 13A:
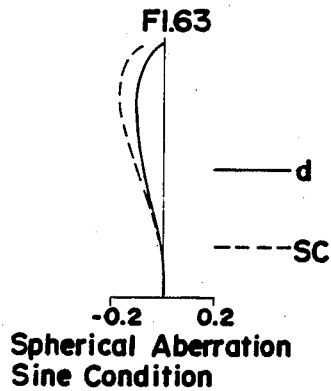
FIGS. 13a to 13c represent the aberration curves of the first embodiment for the shortest focal length condition in the infinity focusing condition.
Figure 13B:
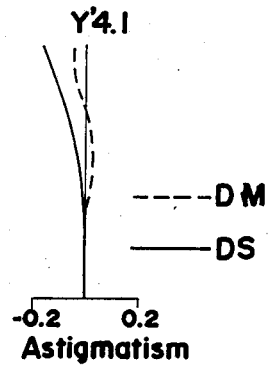
Figure 13C:
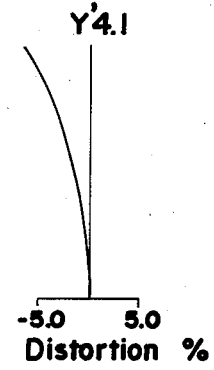
Figure 14A:
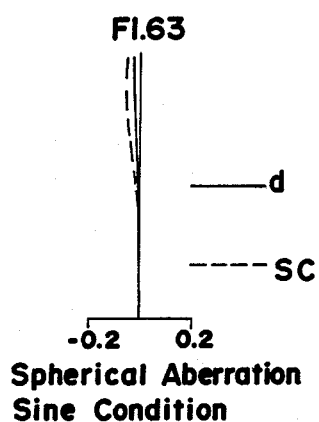
FIGS. 14a to 14c represent the aberration curves of the second embodiment for the longest focal length condition in the infinity focusing condition.
Figure 14B:
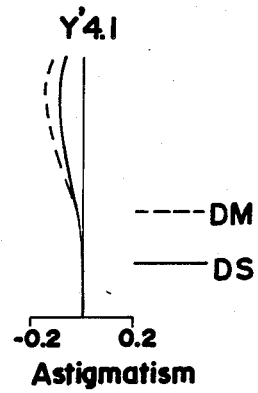
Figure 14C:
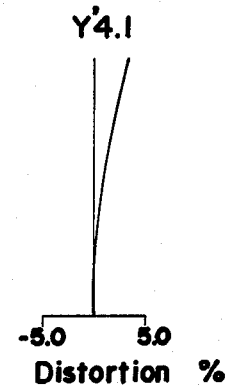
Figure 15A:
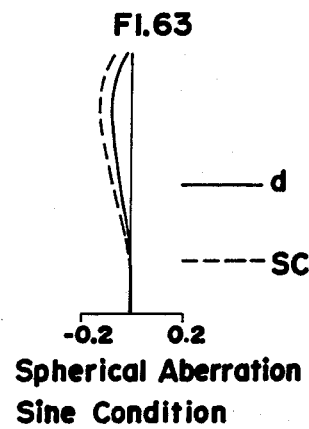
FIGS. 15a to 15c represent the aberration curves of the second embodiment for the medium focal length condition in the infinity focusing condition.
Figure 15B:
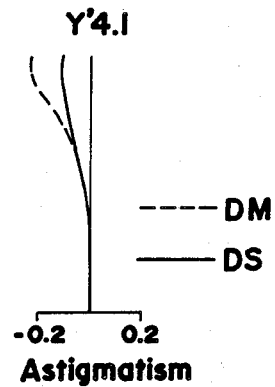
Figure 15C:
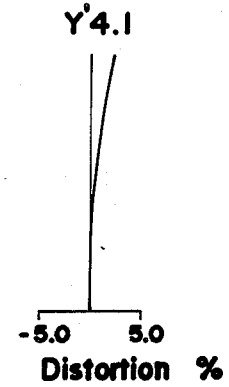
Figure 16A:
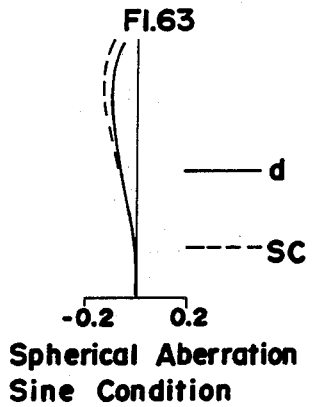
FIGS. 16a to 16c represent the aberration curves of the second embodiment for the shortest focal length condition in the infinity focusing condition.
Figure 16B:
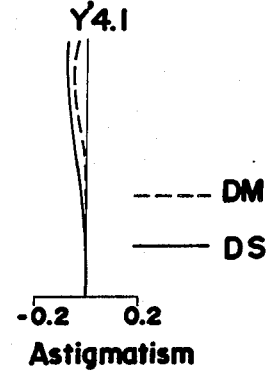
Figure 16C:
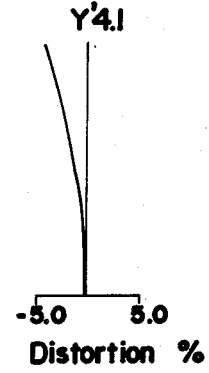
Figure 17A:
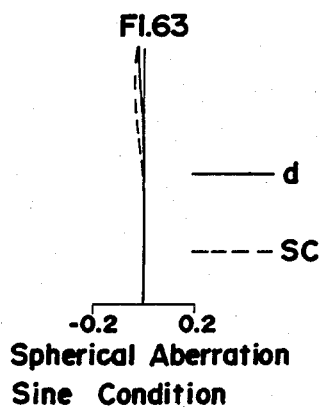
FIGS. 17a to 17c represent the aberration curves of the third embodiment for the longest focal length condition in the infinity focusing condition.
Figure 17B:
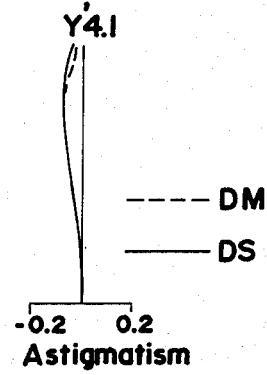
Figure 17C:
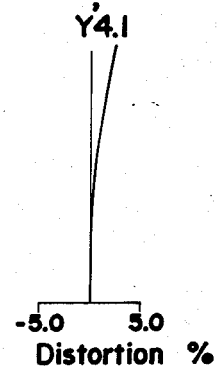
Figure 18A:
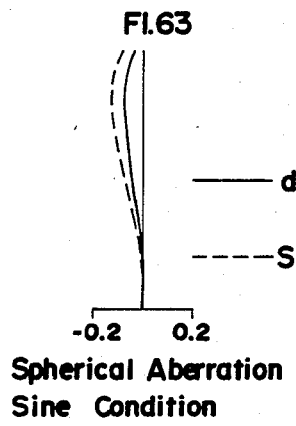
FIGS. 18a to 18c represent the aberration curves of the third embodiment for the medium focal length condition in the infinity focusing condition.
Figure 18B:
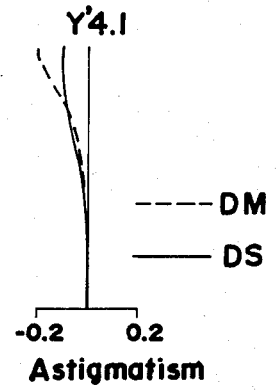
Figure 18C:
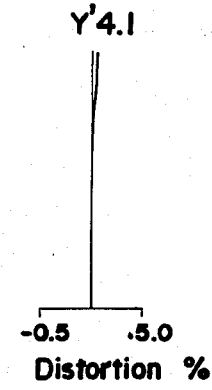
Figure 19A:
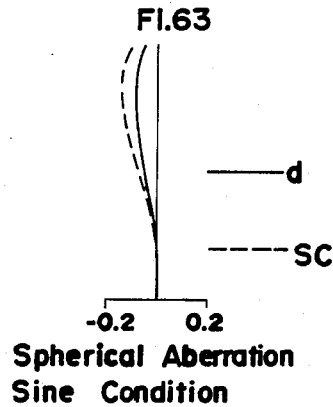
FIGS. 19a to 19c represent the aberration curves of the third embodiment for the shortest focal length condition in the infinity focusing condition.
Figure 19B:
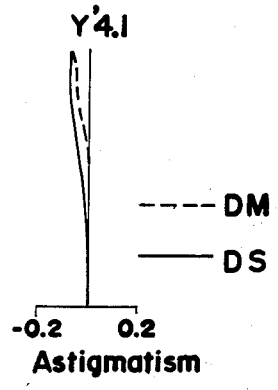
Figure 19C:
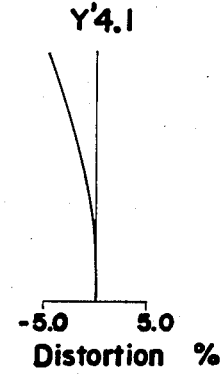
Figure 20A:
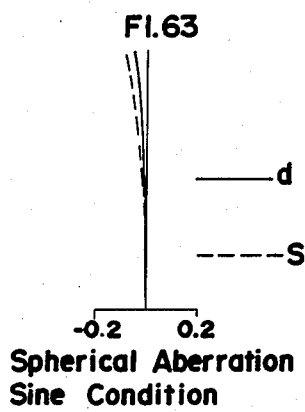
FIGS. 20a to 20c represent the aberration curves of the fourth embodiment for the longest focal length condition in the infinity focusing condition.
Figure 20B:
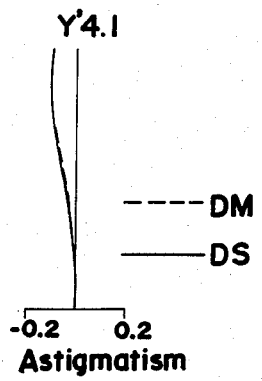
Figure 20C:
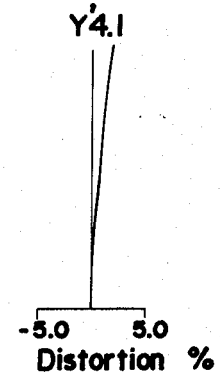
Figure 21A:
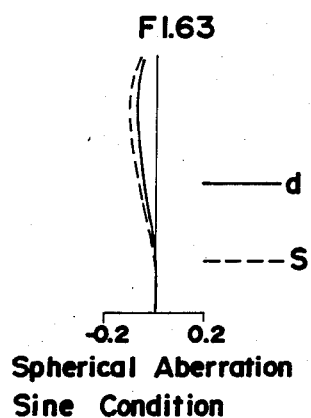
FIGS. 21a to 21c represent the aberration curves of the fourth embodiment for the medium focal length condition in the infinity focusing condition.
Figure 21B:
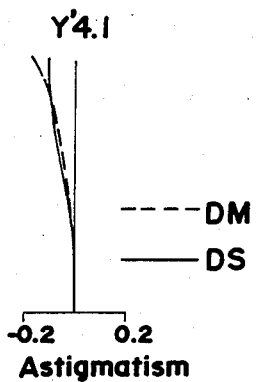
Figure 21C:
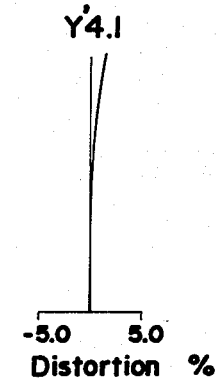
Figure 22A:
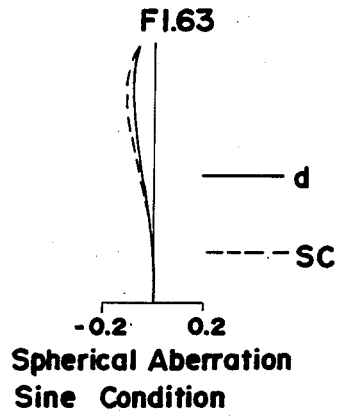
FIGS. 22a to 22c represent the aberration curves of the fourth embodiment for the shortest focal length condition in the infinity focusing condition.
Figure 22B:
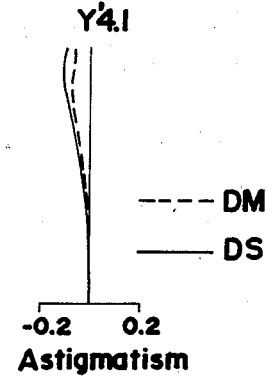
Figure 22C:
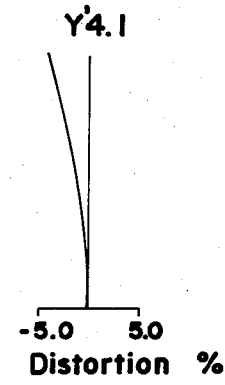
Figure 23A:
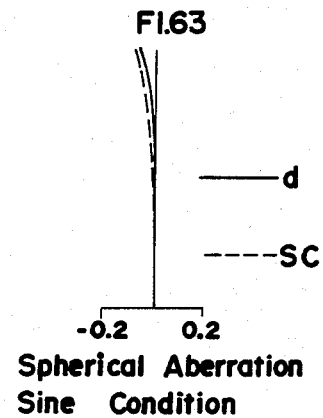
FIGS. 23a to 23c represent the aberration curves of the fifth embodiment for the longest focal length condition in the infinity focusing condition.
Figure 23B:
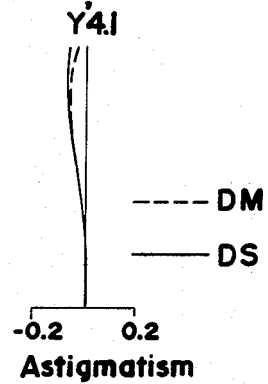
Figure 23C:
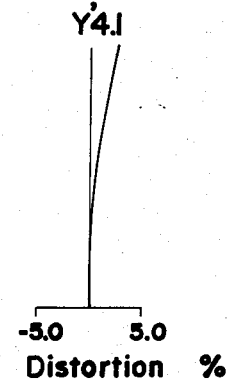
Figure 24A:
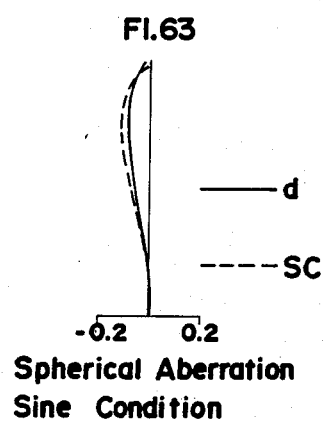
FIGS. 24a to 24c represent the aberration curves of the fifth embodiment for the medium focal length condition in the infinity focusing condition.
Figure 24B:
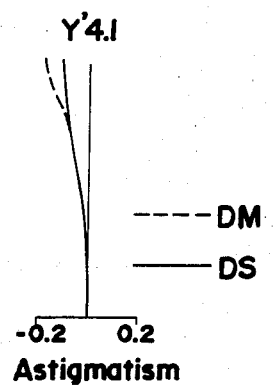
Figure 24C:
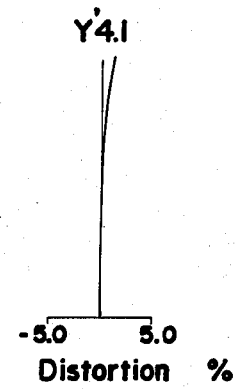
Figure 25A:
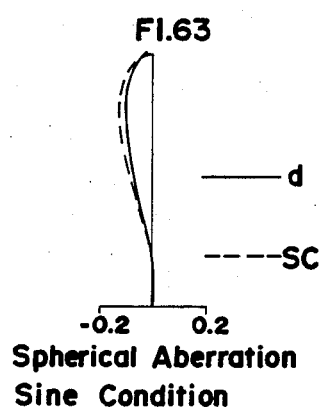
FIGS. 25a to 25c represent the aberration curves of the fifth embodiment for the shortest focal length condition in the infinity focusing condition.
Figure 25B:
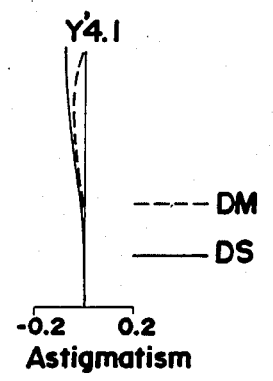
Figure 25C:
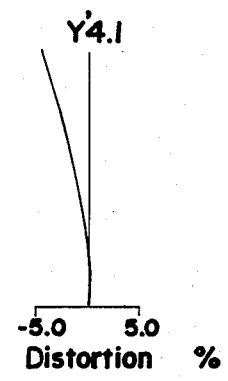
Figure 26A:
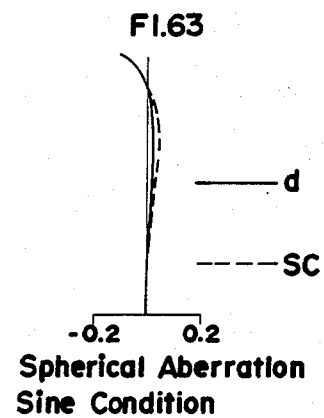
FIGS. 26a to 26c represent the aberration curves of the sixth embodiment for the longest focal length condition in the infinity focusing condition.
Figure 26B:
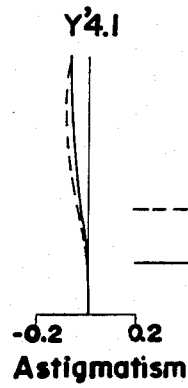
Figure 26C:
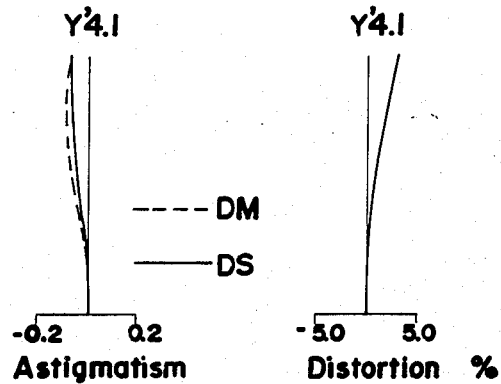
Figure 27A:
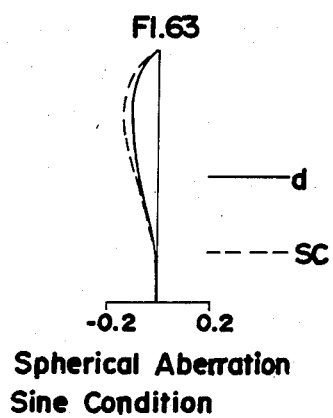
FIGS. 27a to 27c represent the aberration curves of the sixth embodiment for the medium focal length condition in the infinity focusing condition.
Figure 27B:
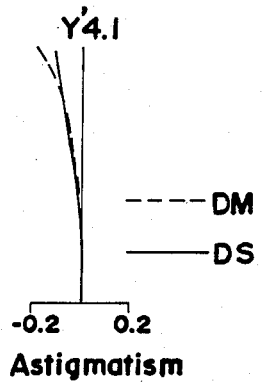
Figure 27C:
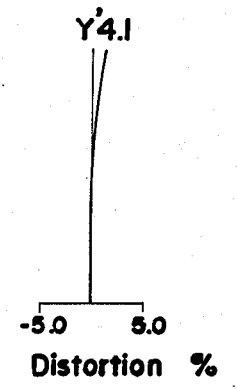
Figure 28A:
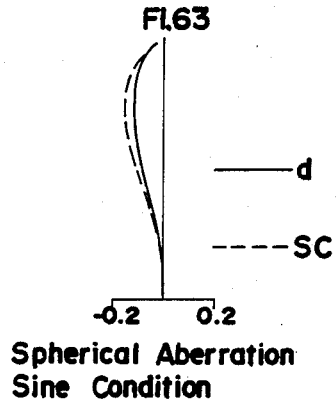
FIGS. 28a to 28c represent the aberration curves of the sixth embodiment for the shortest focal length condition in the infinity focusing condition.
Figure 28B:
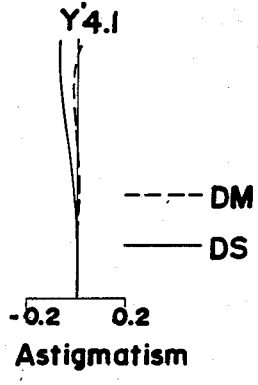
Figure 28C:
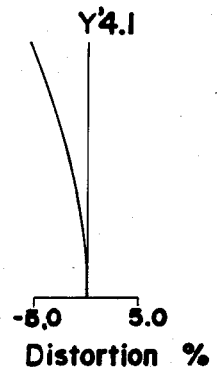
Figure 29A:
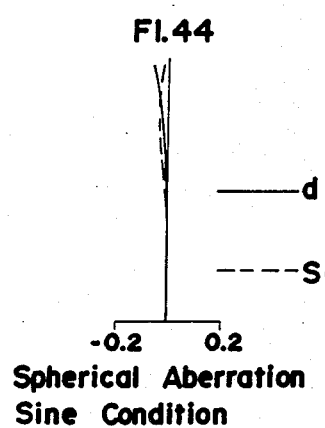
FIGS. 29a to 29c represent the aberration curves of the seventh embodiment for the longest focal length condition in the infinity focusing condition.
Figure 29B:
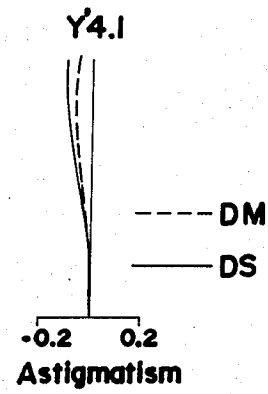
Figure 29C:
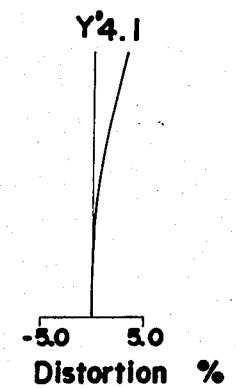
Figure 30A:
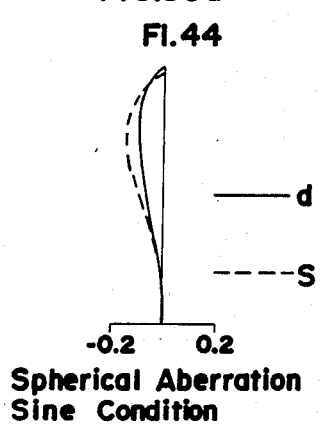
FIGS. 30a to 30c represent the aberration curves of the seventh embodiment for the medium focal length condition in the infinity focusing condition.
Figure 30B:
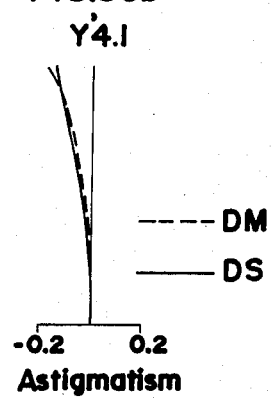
Figure 30C:
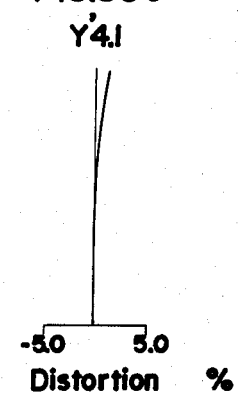
Figure 31A:
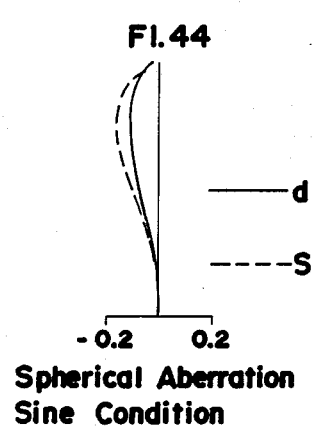
FIGS. 31a to 31c represent the aberration curves of the seventh embodiment for the shortest focal length condition in the infinity focusing condition.
Figure 31B:
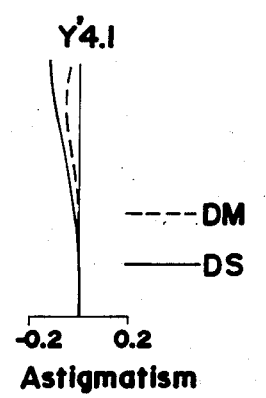
Figure 31C:
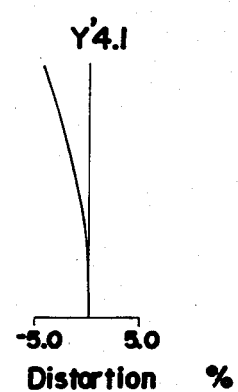
Figure 32A:
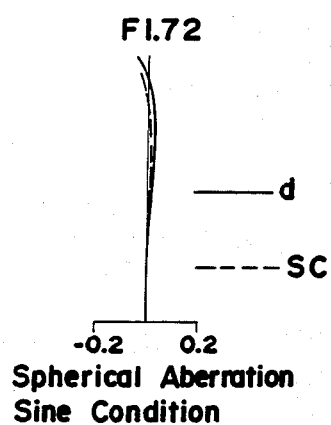
FIGS. 32a to 32c represent the aberration curves of the eighth embodiment for the longest focal length condition in the infinity focusing condition.
Figure 32B:
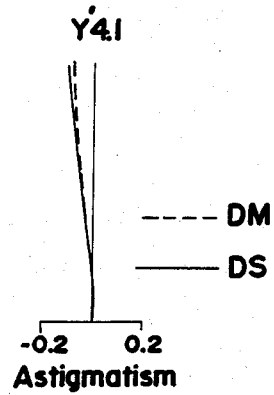
Figure 32C:
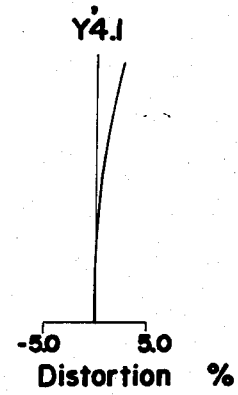
Figure 33A:
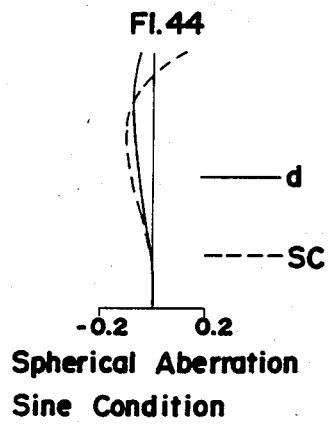
FIGS. 33a to 33c represent the aberration curves of the eighth embodiment for the medium focal length condition in the infinity focusing condition.
Figure 33B:
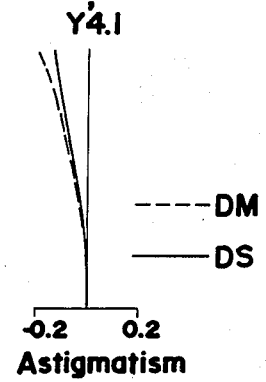
Figure 33C:
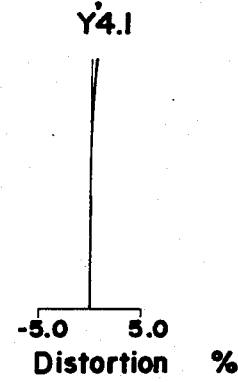
Figure 34A:
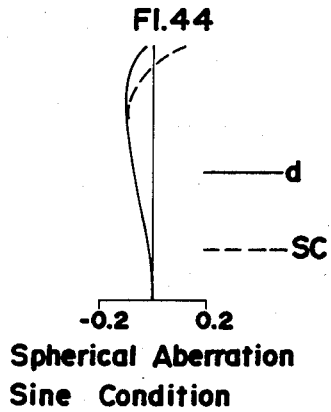
FIGS. 34a to 34c represent the aberration curves of the eighth embodiment for the shortest focal length condition in the infinity focusing condition.
Figure 34B:
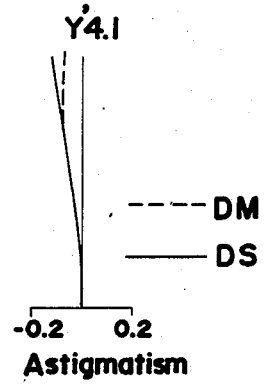
Figure 34C:
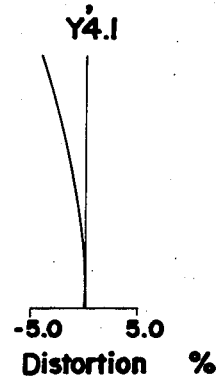
Figure 35A:
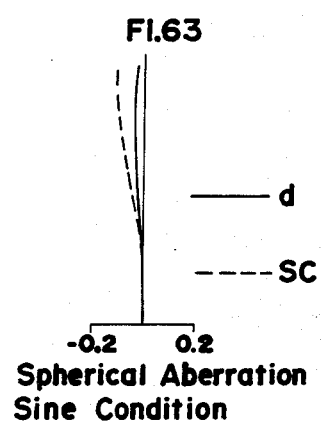
FIGS. 35a to 35c represent the aberration curves of the ninth embodiment for the longest focal length condition in the infinity focusing condition.
Figure 35B:
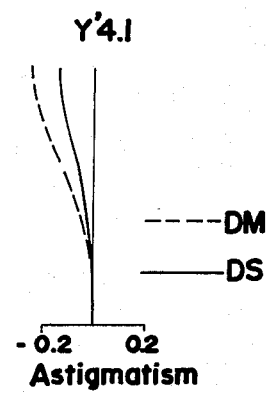
Figure 35C:
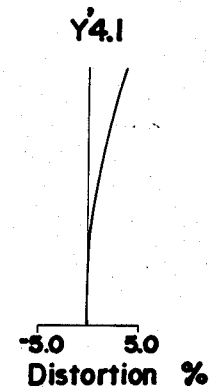
Figure 36A:
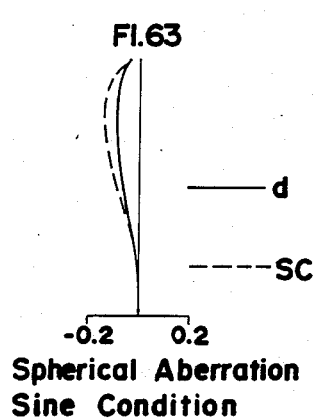
FIGS. 36a to 36c represent the aberration curves of the ninth embodiment for the medium focal length condition in the infinity focusing condition.
Figure 36B:
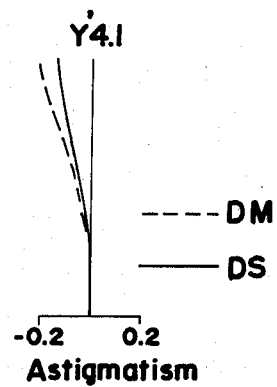
Figure 36C:
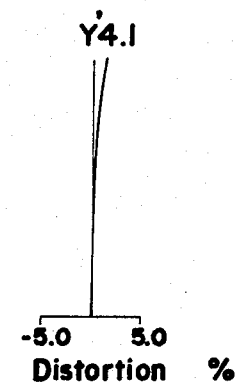
Figure 37A:
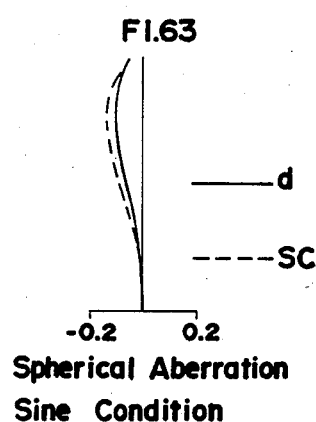
FIGS. 37a to 37c represent the aberration curves of the ninth embodiment for the shortest focal length condition in the infinity focusing condition.
Figure 37B:
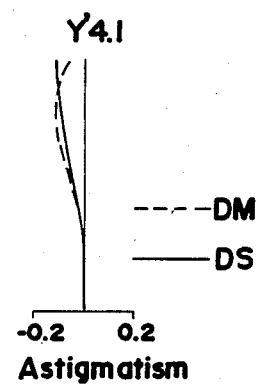
Figure 37C:
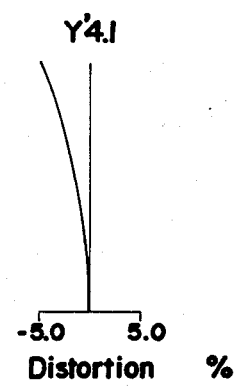
Figure 38A:
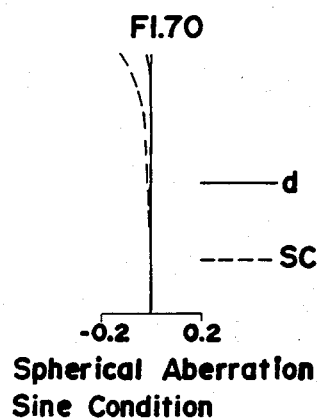
FIGS. 38a to 38c represent the aberration curves of the tenth embodiment for the longest focal length condition in the infinity focusing condition.
Figure 38B:
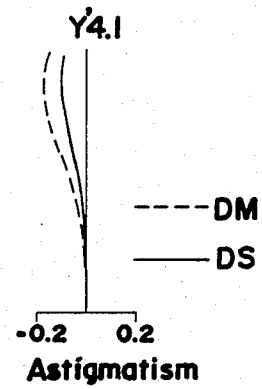
Figure 38C:
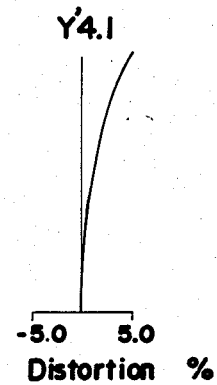
Figure 39A:
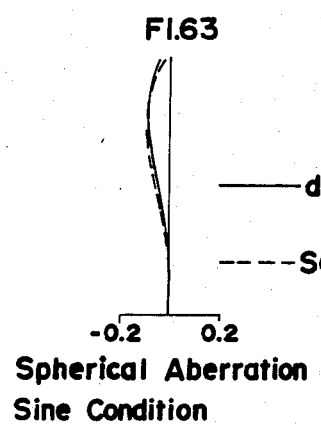
FIGS. 39a to 39c represent the aberration curves of the tenth embodiment for the medium focal length condition in the infinity focusing condition.
Figure 39B:
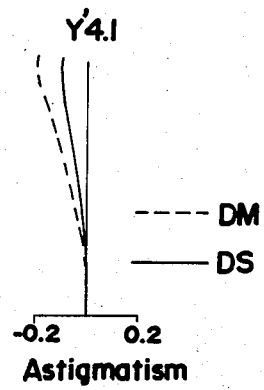
Figure 39C:
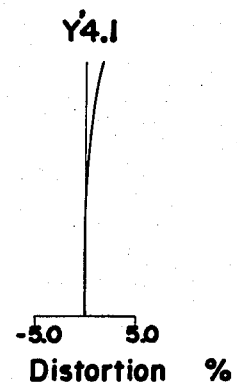
Figure 40A:
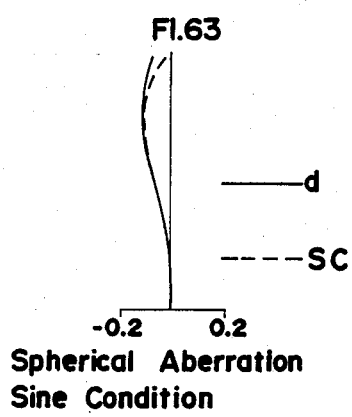
FIGS. 40a to 40c represent the aberration curves of the tenth embodiment for the shortest focal length condition in the infinity focusing condition.
Figure 40B:
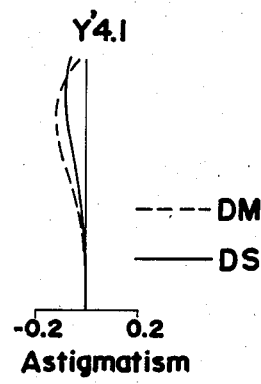
Figure 40C:
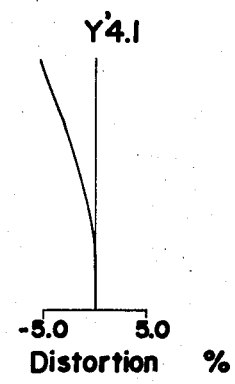
Figure 41A:
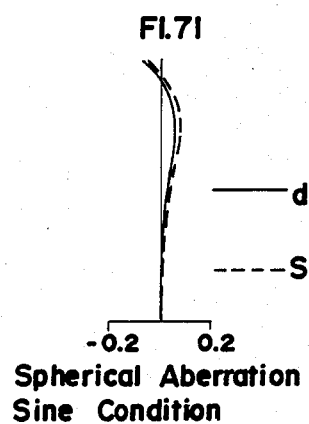
FIGS. 41a to 41c represent the aberration curves of the eleventh embodiment for the longest focal length condition in the infinity focusing condition.
Figure 41B:
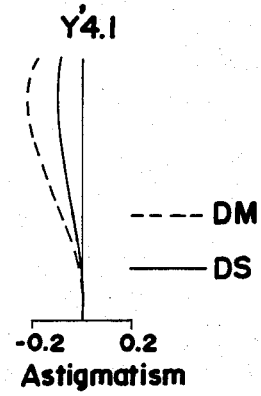
Figure 41C:
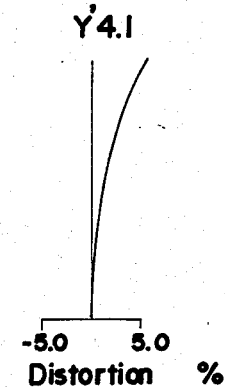
Figure 42A:
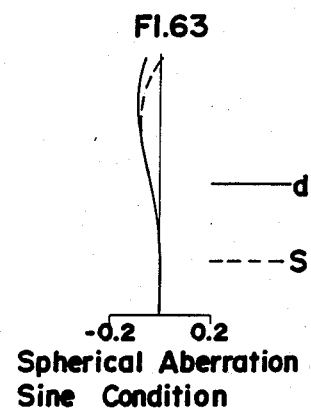
FIGS. 42a to 42c represent the aberration curves of the eleventh embodiment for the medium focal length condition in the infinity focusing condition.
Figure 42B:
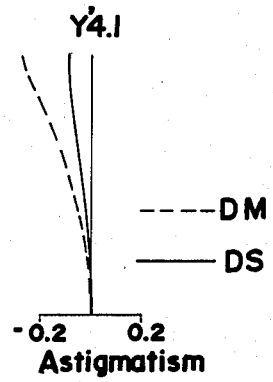
Figure 42C:
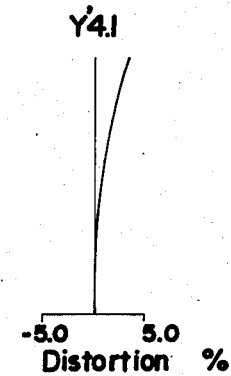
Figure 43A:
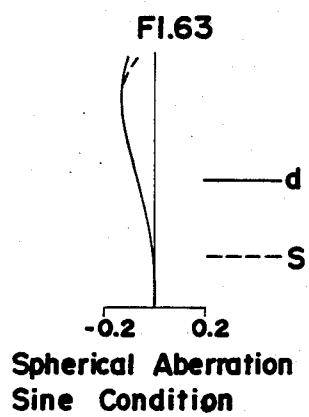
FIGS. 43a to 43c represent the aberration curves of the eleventh embodiment for the shortest focal length condition in the infinity focusing condition
Figure 43B:
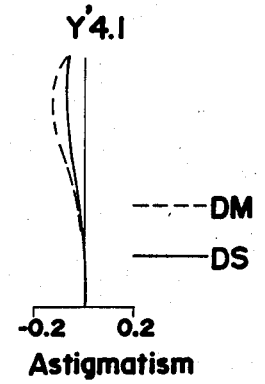
Figure 43C:
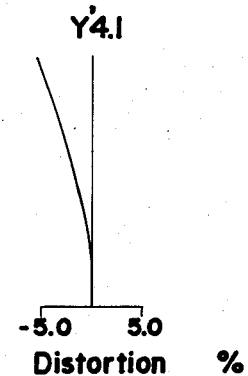
Figure 47A:
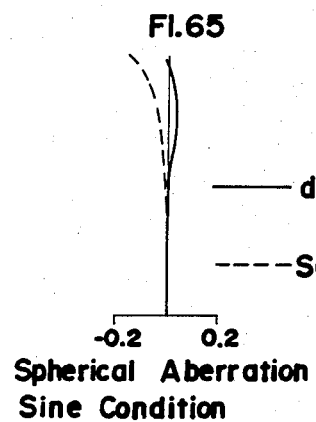
FIGS. 47a to 47c represent the aberration curves of the thirteenth embodiment for the longest focal length condition in the infinity focusing condition.
Figure 47B:
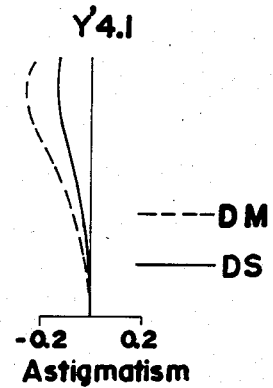
Figure 47C:
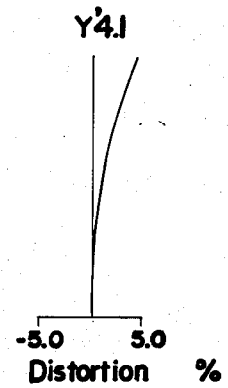
Figure 48A:
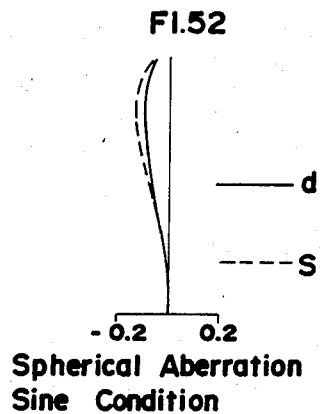
FIGS. 48a to 48c represent the aberration curves of the thirteenth embodiment for the medium focal length condition in the infinity focusing condition.
Figure 48B:
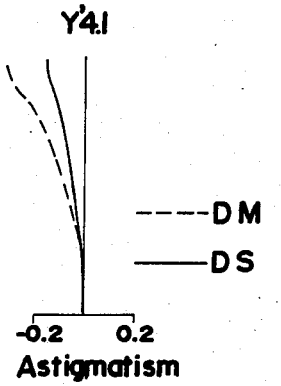
Figure 48C:
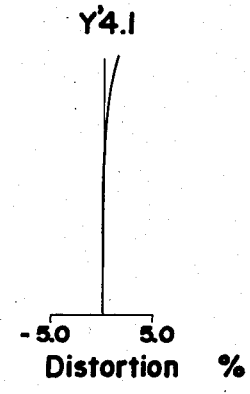
Figure 49A:
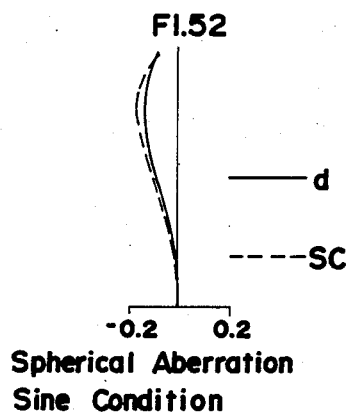
FIGS. 49a to 49c represent the aberration curves of the thirteenth embodiment for the shortest focal length condition in the infinity focusing condition.
Figure 49B:
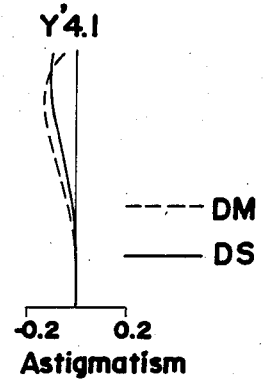
Figure 49C:
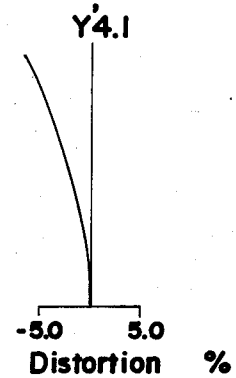
Figure 50A:
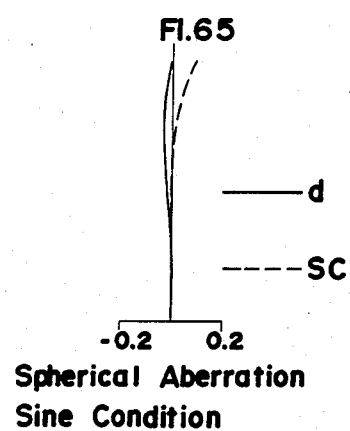
FIGS. 50a to 50c represent the aberration curves of the fourteenth embodiment for the longest focal length condition in the infinity focusing condition.
Figure 50B:
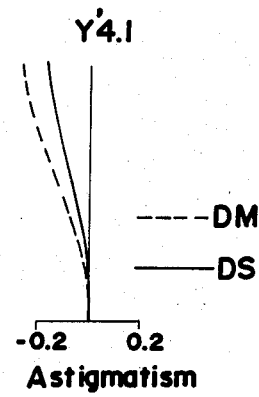
Figure 50C:
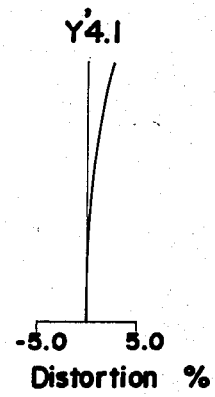
Figure 51A:
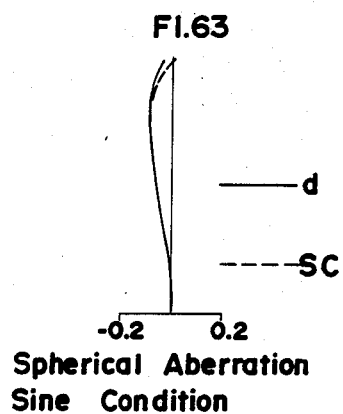
FIGS. 51a to 51c represent the aberration curves of the fourteenth embodiment for the medium focal length condition in the infinity focusing condition.
Figure 51B:
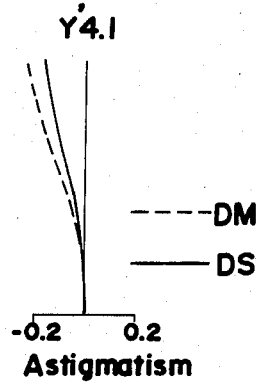
Figure 51C:
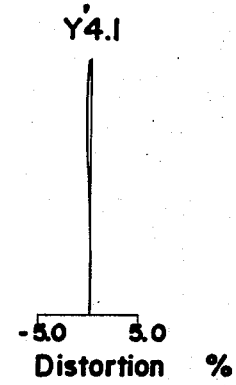
Figure 52A:
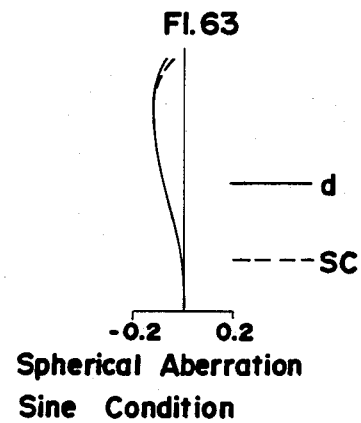
FIGS. 52a to 52c represent the aberration curves of the fourteenth embodiment for the shortest focal length condition in the infinity focusing condition.
Figure 52B:
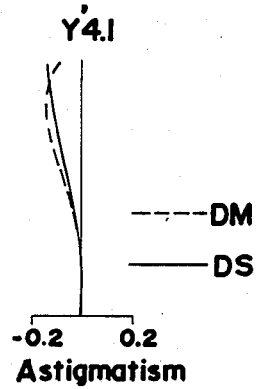
Figure 52C:
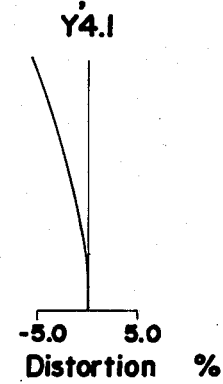
Figure 53A:
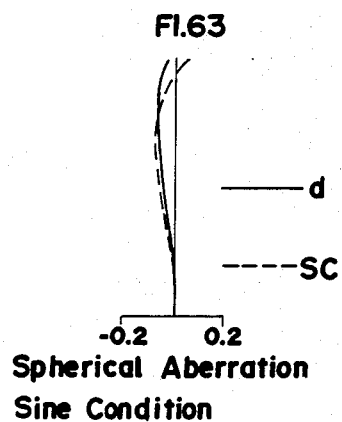
FIGS. 53a to 53c represent the aberration curves of the fifteenth embodiment for the longest focal length condition in the infinity focusing condition.
Figure 53B:
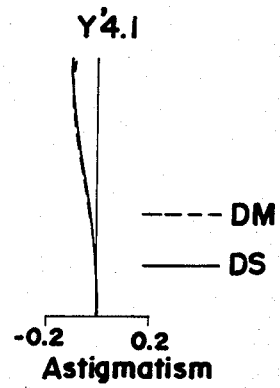
Figure 53C:
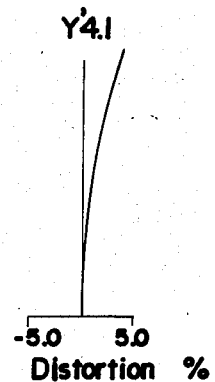
Figure 54A:
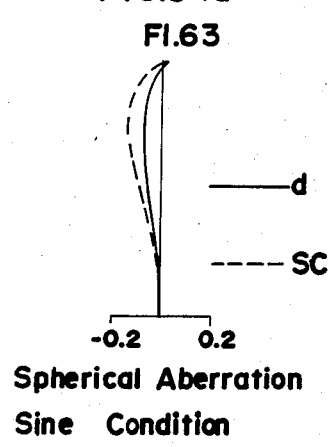
FIGS. 54a to 54c represent the aberration curves of the fifteenth embodiment for the medium focal length condition in the infinity focusing condition.
Figure 54B:
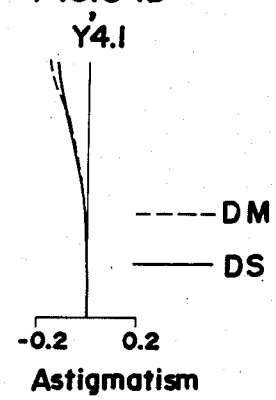
Figure 54C:
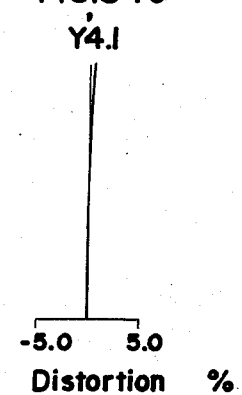
Figure 55A:
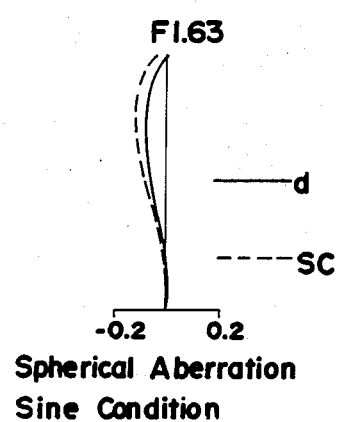
FIGS. 55a to 55c represent the aberration curves of the fifteenth embodiment for the shortest focal length condition in the infinity focusing condition.
Figure 55B:
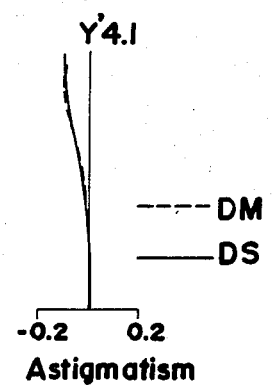
Figure 55C:
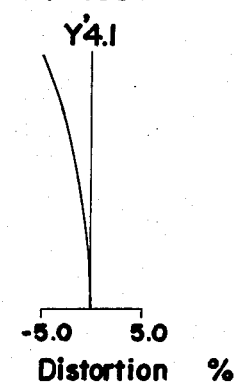
Figure 56A:
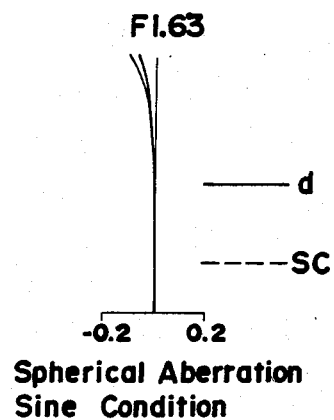
FIGS. 56a to 56c represent the aberration curves of the sixteenth embodiment for the longest focal length condition in the infinity focusing condition.
Figure 56B:
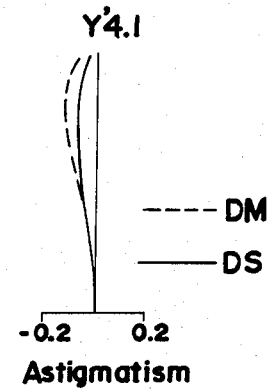
Figure 56C:
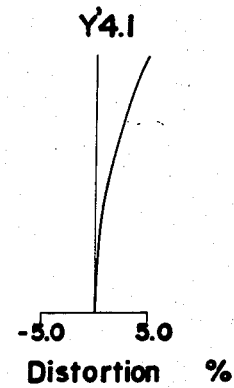
Figure 57A:
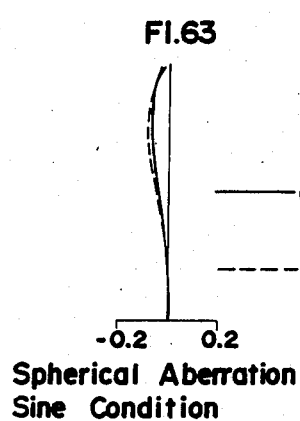
FIGS. 57a to 57c represent the aberration curves of the sixteenth embodiment for the medium focal length condition in the infinity focusing condition.
Figure 57B:
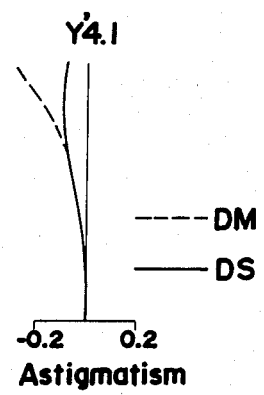
Figure 57C:
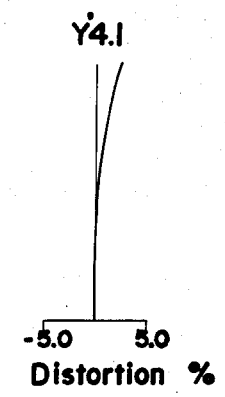
Figure 58A:
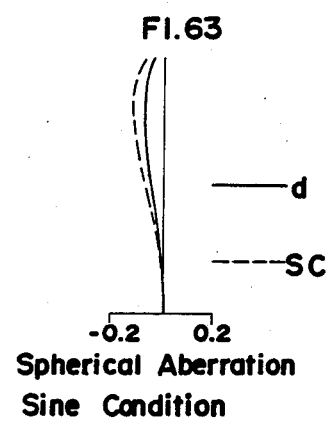
FIGS. 58a to 58c represent the aberration curves of the sixteenth embodiment for the shortest focal length condition in the infinity focusing condition.
Figure 58B:
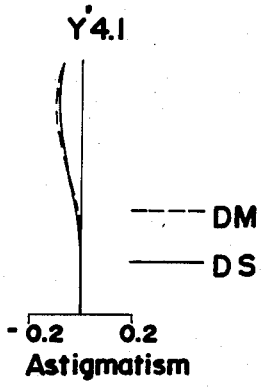
Figure 58C:
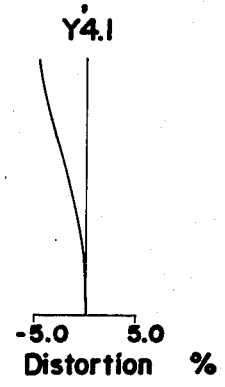
Figure 59A:
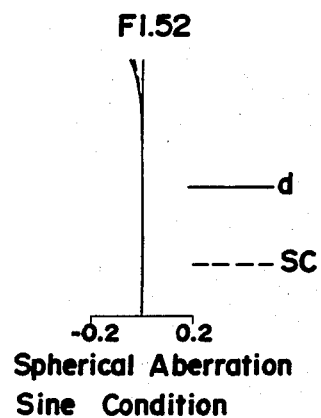
FIGS. 59a to 59c represent the aberration curves of the seventeenth embodiment for the longest focal length condition in the infinity focusing condition.
Figure 59B:
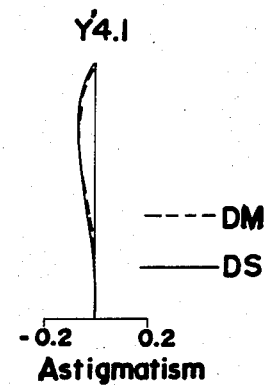
Figure 59C:
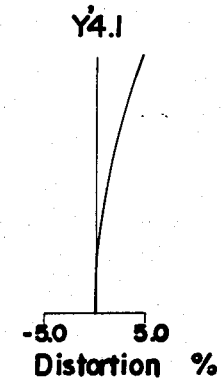
Figure 60A:
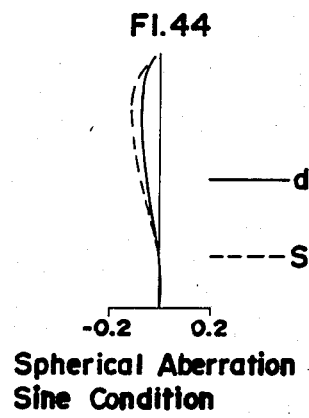
FIGS. 60a to 60c represent the aberration curves of the seventeenth embodiment for the medium focal length condition in the infinity focusing condition.
Figure 60B:
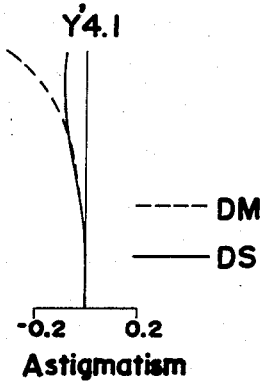
Figure 60C:
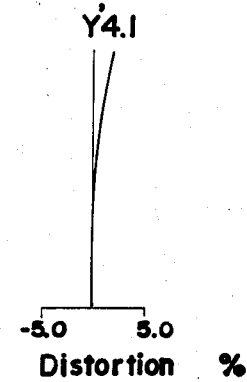
Figure 61A:
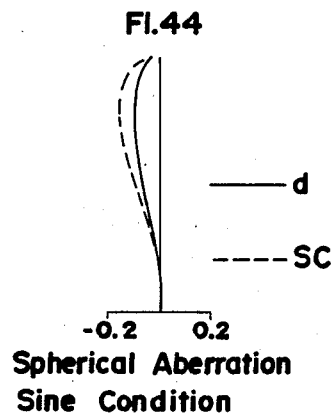
FIGS. 61a to 61c represent the aberration curves of the seventeenth embodiment for the shortest focal length condition In the infinity focusing condition.
Figure 61B:
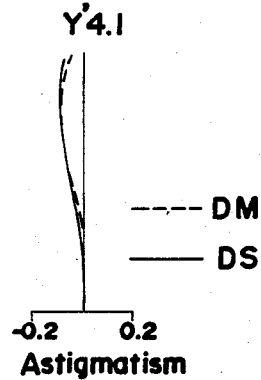
Figure 61C:
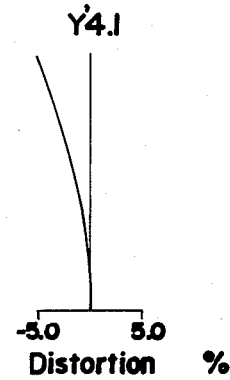
Figure 62A:
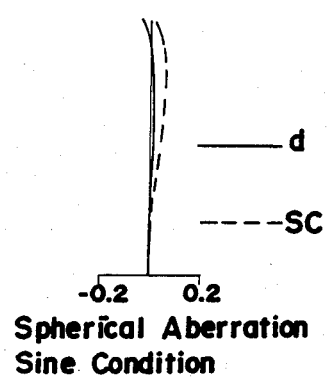
FIGS. 62a to 62c represent the aberration curves of the eighteenth embodiment for the longest focal length condition in the infinity focusing condition.
Figure 62B:
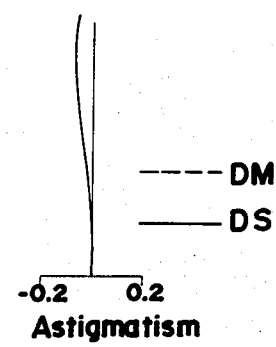
Figure 62C:
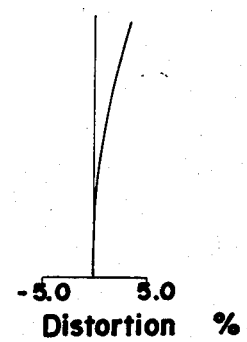
Figure 63A:
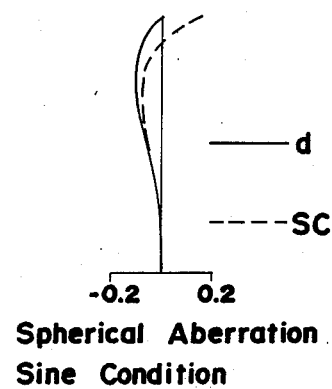
FIGS. 63a to 63c represent the aberration curves of the eighteenth embodiment for the medium focal length condition in the infinity focusing condition.
Figure 63B:
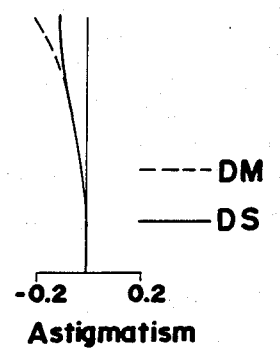
Figure 63C:
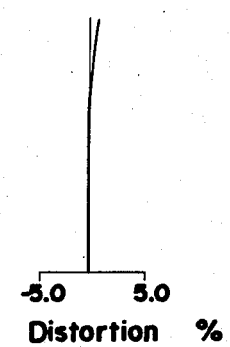
Figure 64A:
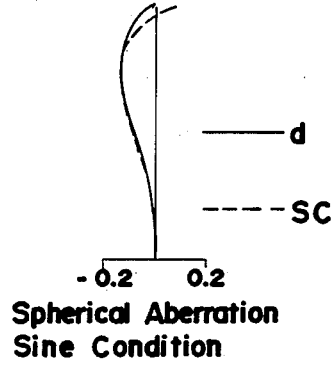
FIGS. 64a to 64c represent the aberration curves of the eighteenth embodiment for the shortest focal length condition in the infinity focusing condition.
Figure 64B:
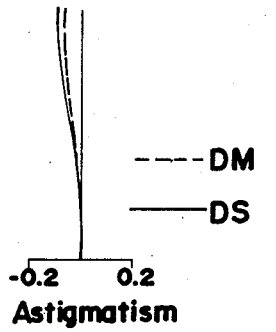
Figure 64C:
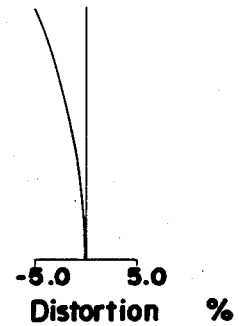
Figure 65A:
FIGS. 65a to 65c represent the aberration curves of the nineteenth embodiment for the longest focal length condition in the infinity focusing condition.
Figure 65B:
Figure 65C:
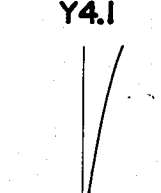
Figure 66A:
FIGS. 66a to 66c represent the aberration curves of the nineteenth embodiment for the medium focal length condition in the infinity focusing condition.
Figure 66B:
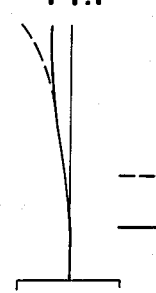
Figure 66C:
Figure 67A:
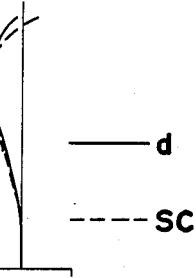
FIGS. 67a to 67c represent the aberration curves of the nineteenth embodiment for the shortest focal length condition in the infinity focusing condition.
Figure 67B:
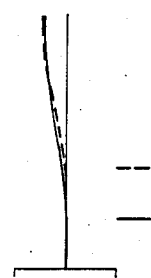
Figure 67C:
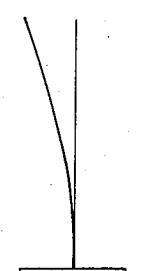
Figure 68A:
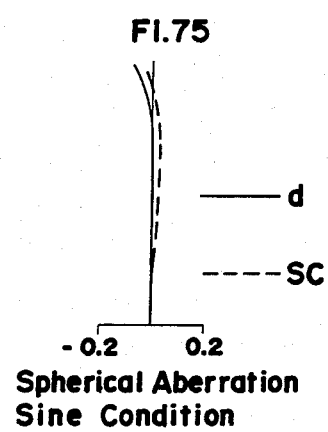
FIGS. 68a to 68c represent the aberration curves of the twentieth embodiment for the longest focal length condition in the infinity focusing condition.
Figure 68B:
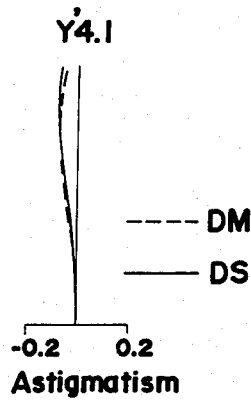
Figure 68C:
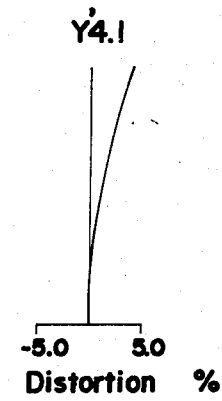
Figure 69A:
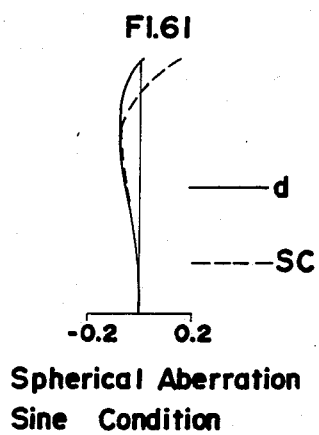
FIGS. 69a to 69c represent the aberration curves of the twentieth embodiment for the medium focal length condition in the infinity focusing condition.
Figure 69B:
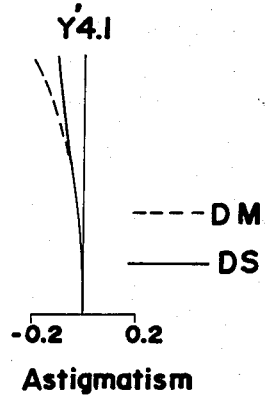
Figure 69C:
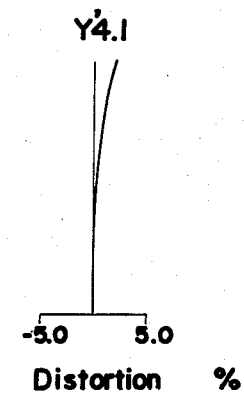
Figure 70A:
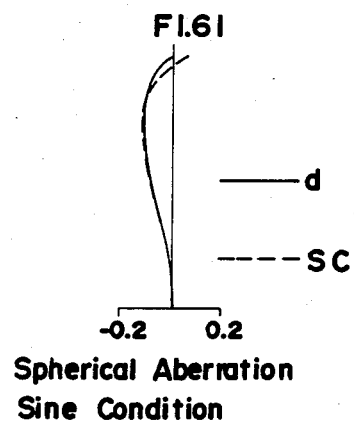
FIGS. 70a to 70c represent the aberration curves of the twentieth embodiment for the shortest focal length condition in the infinity focusing condition.
Figure 70B:
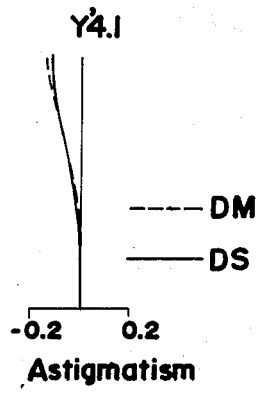
Figure 70C:
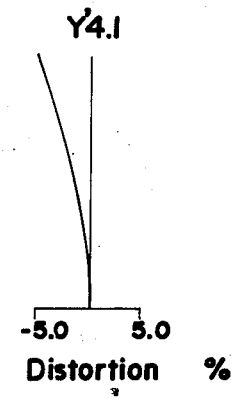
Figure 74A:
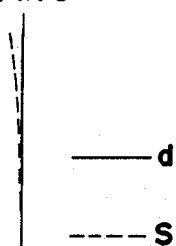
FIGS. 74a to 74c represent the aberration curves of the twenty-second embodiment for the longest focal length condition in the infinity focusing condition.
Figure 74B:
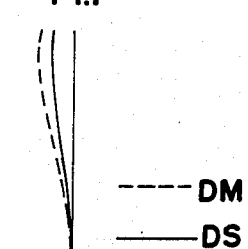
Figure 74C:
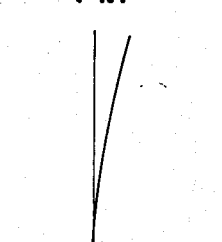
Figure 75A:
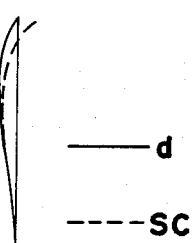
FIGS. 75a to 75c represent the aberration curves of the twenty-second embodiment for the medium focal length condition in the infinity focusing condition.
Figure 75B:
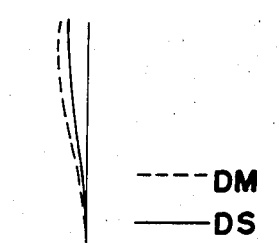
Figure 75C:
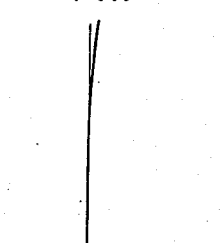
Figure 76A:
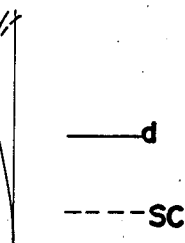
FIGS. 76a to 76c represent the aberration curves of the twenty-second embodiment for the shortest focal length condition in the infinity focusing condition.
Figure 76B:
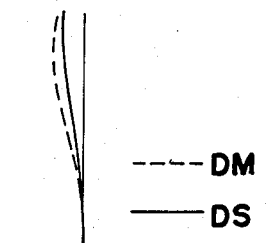
Figure 76C:
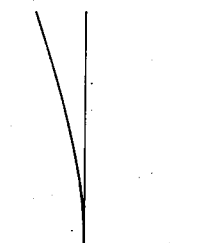
Figure 77A:
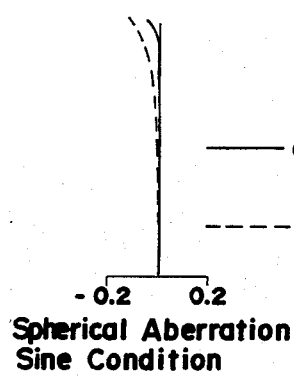
FIGS. 77a to 77c represent the aberration curves of the twenty-third embodiment for the longest focal length condition in the infinity focusing condition.
Figure 77B:
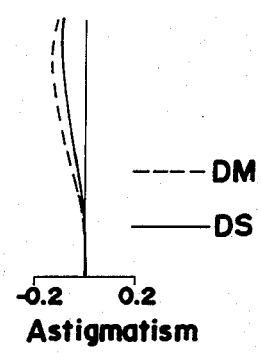
Figure 77C:
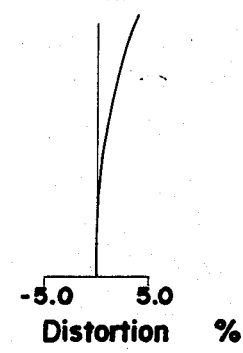
Figure 78A:
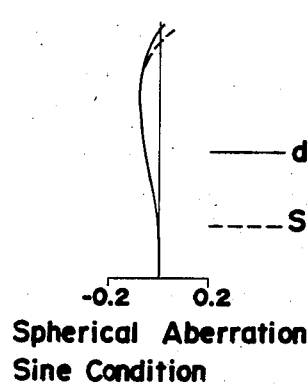
FIGS. 78a to 78c represent the aberration curves of the twenty-third embodiment for the medium focal length condition in the infinity focusing condition.
Figure 78B:
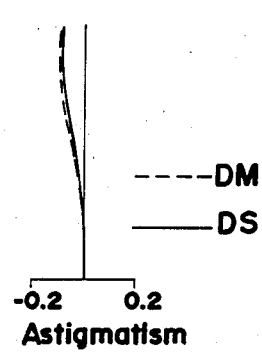
Figure 78C:
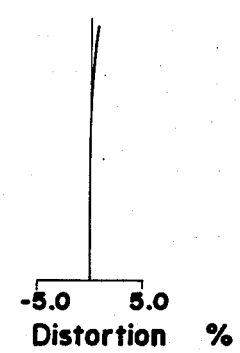
Figure 79A:
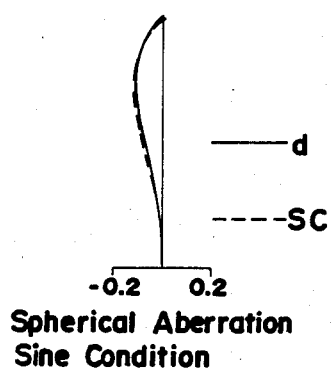
FIGS. 79a to 79c represent the aberration curves of the twenty-third embodiment for the shortest focal length condition in the infinity focusing condition.
Figure 79B:
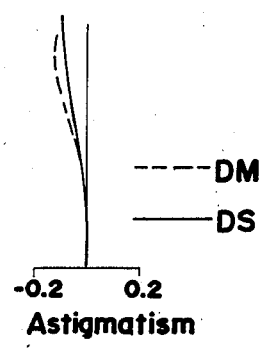
Figure 79C:
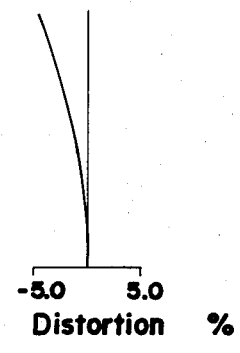
Figure 80A:
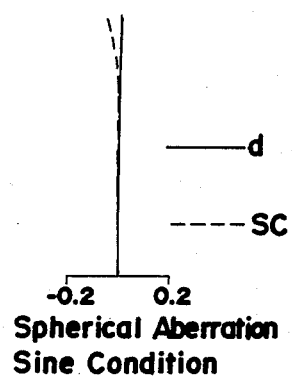
FIGS. 80a to 80c represent the aberration curves of the twenty-fourth embodiment for the longest focal length condition in the infinity focusing condition.
Figure 80B:
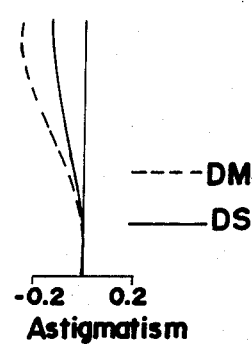
Figure 80C:
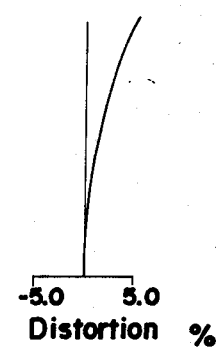
Figure 81A:
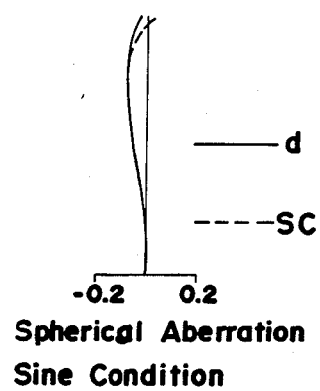
FIGS. 81a to 81c represent the aberration curves of the twenty-fourth embodiment for the medium focal length condition in the infinity focusing condition.
Figure 81B:
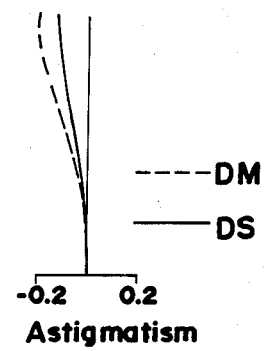
Figure 81C:
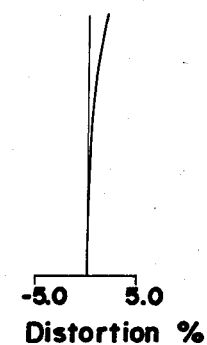
Figure 82A:
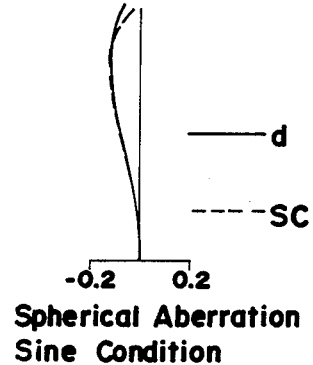
FIGS. 82a to 82c represent the aberration curves of the twenty-fourth embodiment for the shortest focal length condition in the infinity focusing condition.
Figure 82B:
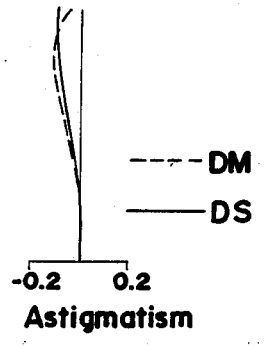
Figure 82C:
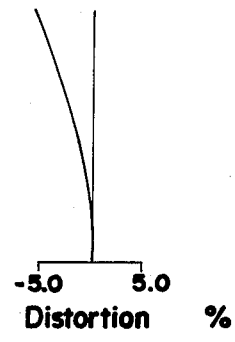
Figure 83A:
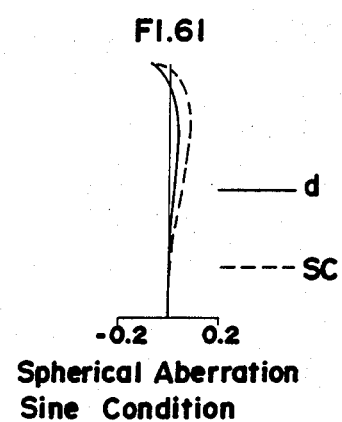
FIGS. 83a to 83c represent the aberration curves of the twenty-fifth embodiment for the longest focal length condition in the infinity focusing condition.
Figure 83B:
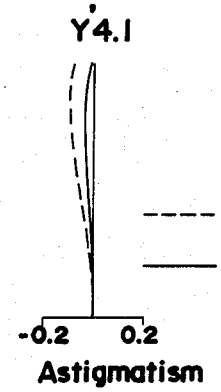
Figure 83C:
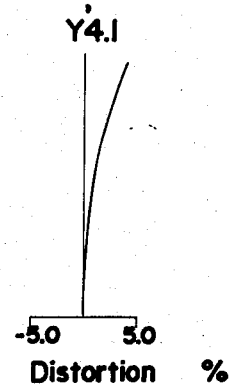
Figure 84A:
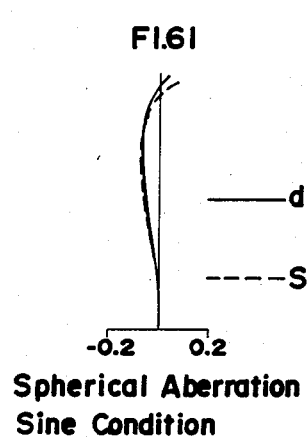
FIGS. 84a to 84c represent the aberration curves of the twenty-fifth embodiment for the medium focal length condition in the infinity focusing condition.
Figure 84B:
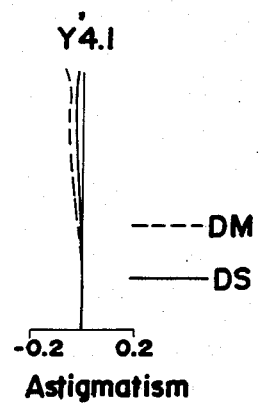
Figure 84C:
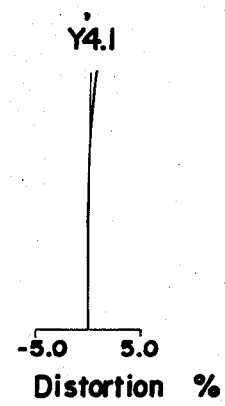
Figure 85A:
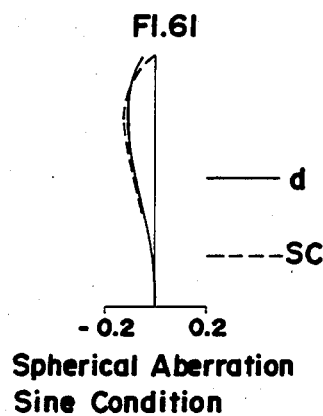
FIGS. 85a to 85c represent the aberration curves of the twenty-fifth embodiment for the shortest focal length condition in the infinity focusing condition.
Figure 85B:
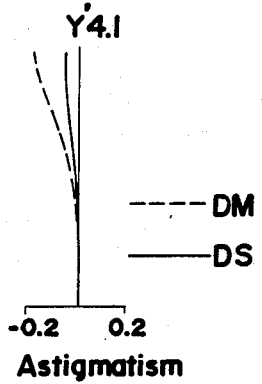
Figure 85C:
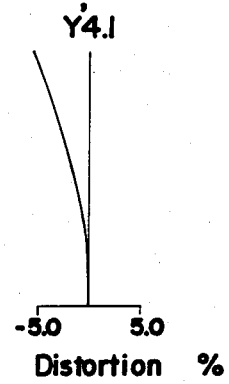
Figure 86A:
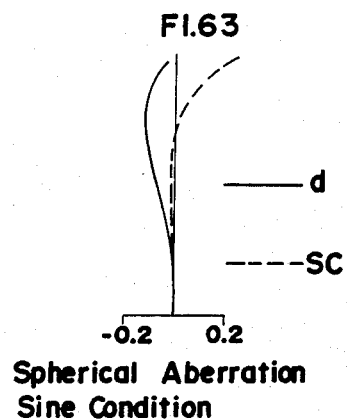
FIGS. 86a to 86c represent the aberration curves of the twenty-sixth embodiment for the longest focal length condition in the infinity focusing condition.
Figure 86B:
Figure 86C:
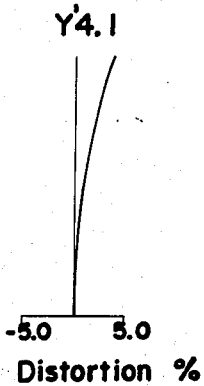
Figure 87A:
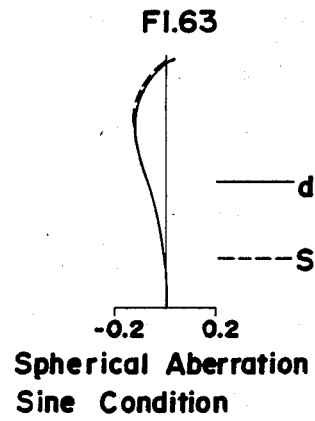
FIGS. 87a to 87c represent the aberration curves of the twenty-sixth embodiment for the medium focal length condition in the infinity focusing condition.
Figure 87B:
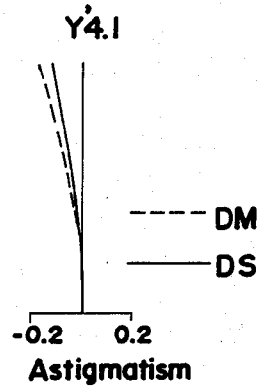
Figure 87C:
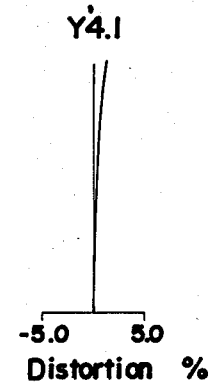
Figure 88A:
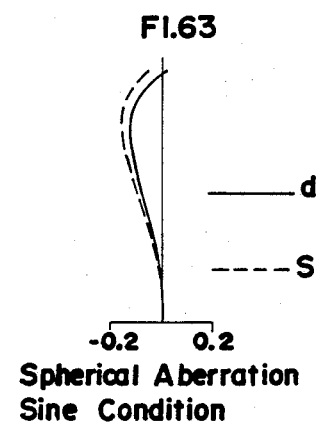
FIGS. 88a to 88c represent the aberration curves of the twenty-sixth embodiment for the shortest focal length condition in the infinity focusing condition.
Figure 88B:
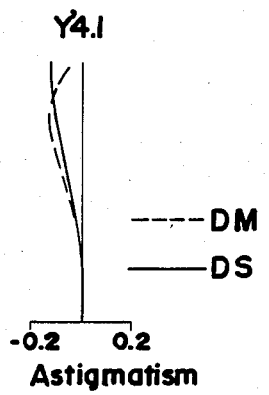
Figure 88C:
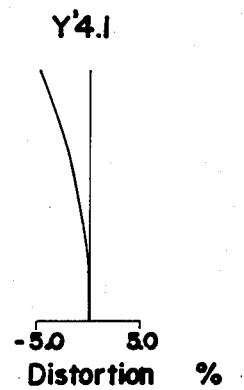
Figure 89A:
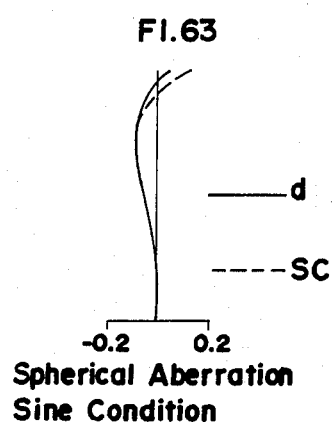
FIGS. 89a to 89c represent the aberration curves of the twenty-seventh embodiment for the longest focal length condition in the infinity focusing condition.
Figure 89B:
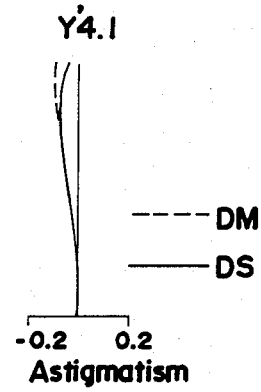
Figure 89C:
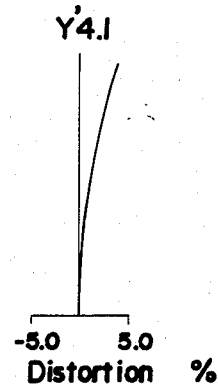
Figure 90A:
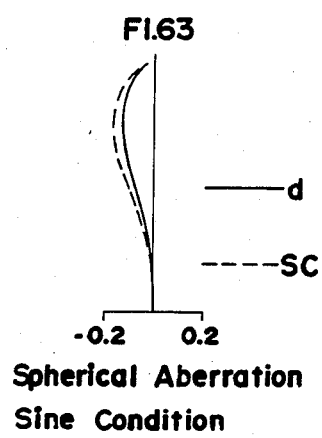
FIGS. 90a to 90c represent the aberration curves of the twenty-seventh embodiment for the medium focal length condition in the infinite focusing condition.
Figure 90B:
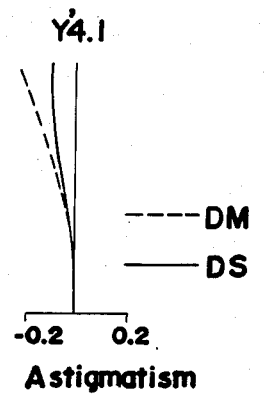
Figure 90C:
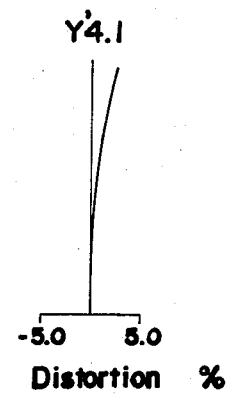
Figure 91A:
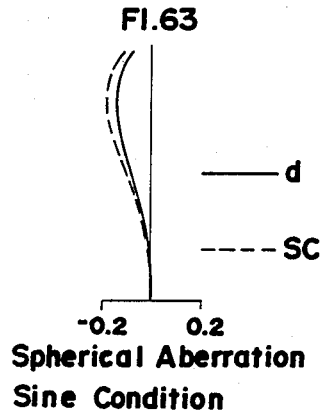
FIGS. 91a to 91c represent the aberration curves of the twenty-seventh embodiment for the shortest focal length condition in the infinity focusing condition.
Figure 91B:
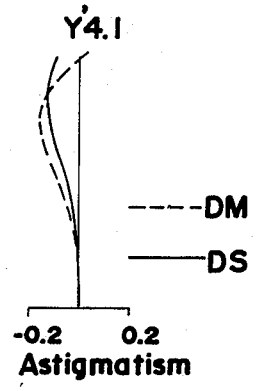
Figure 91C:
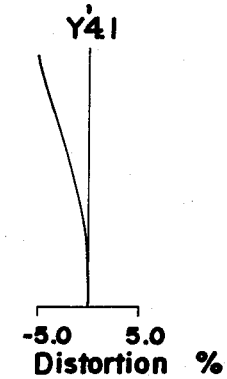
Figure 92A:
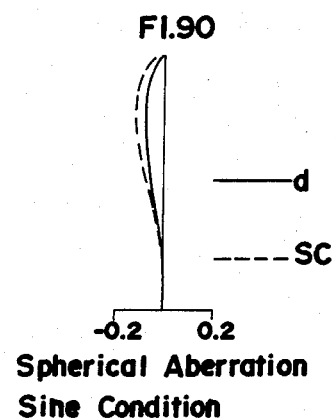
FIGS. 92a to 92c represent the aberration curves of the twenty-eighth embodiment for the longest focal length condition in the infinity focusing condition.
Figure 92B:
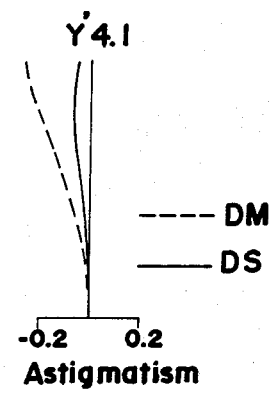
Figure 92C:
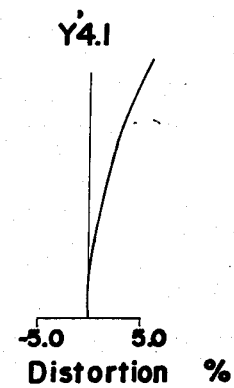
Figure 93A:
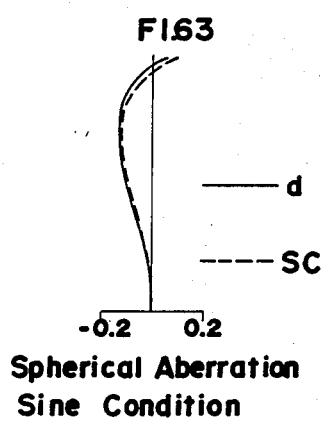
FIGS. 93a to 93c represent the aberration curves of the twenty-eighth embodiment for the medium focal length condition in the infinity focusing condition.
Figure 93B:
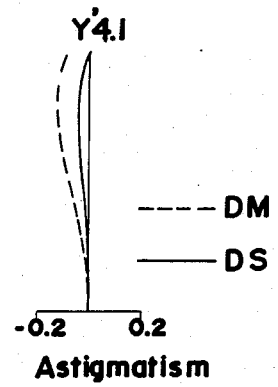
Figure 93C:
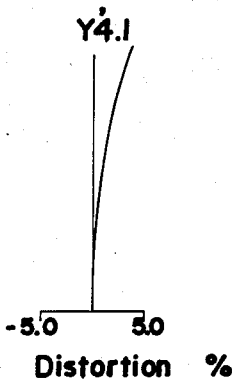
Figure 94A:
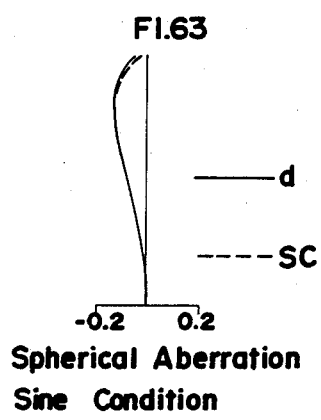
FIGS. 94a to 94c represent the aberration curves of the twenty-eighth embodiment for the shortest focal length condition in the infinity focusing condition.
Figure 94B:
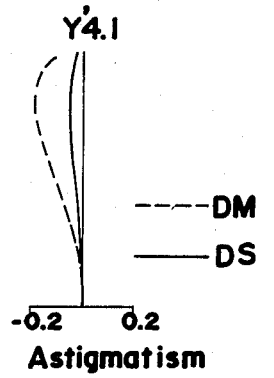
Figure 94C:
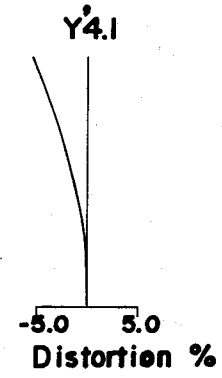
Figure 95A:
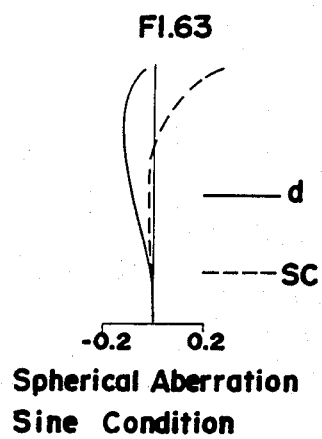
FIGS. 95a to 95c represent the aberration curves of the twenty-ninth embodiment for the longest focal length condition in the infinity focusing condition.
Figure 95B:
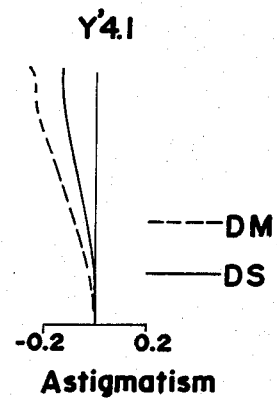
Figure 95C:
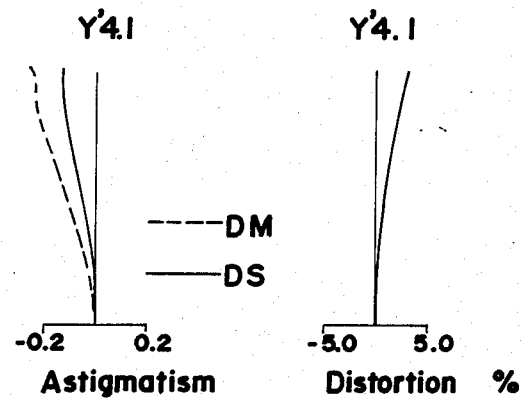
Figure 96A:
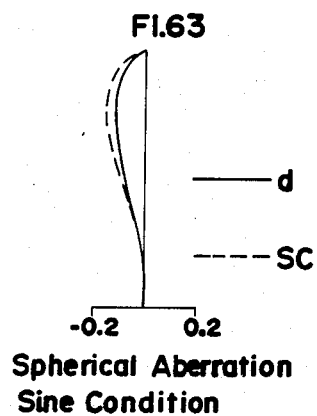
FIGS. 96a to 96c represent the aberration curves of the twenty-ninth embodiment for the medium focal length condition in the infinity focusing condition.
Figure 96B:
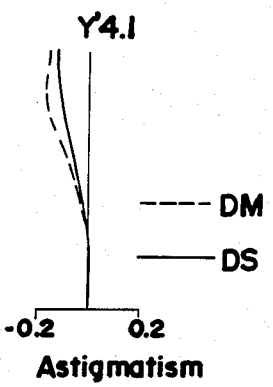
Figure 96C:
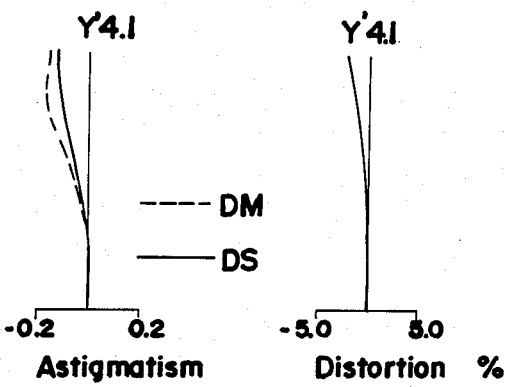
Figure 97A:
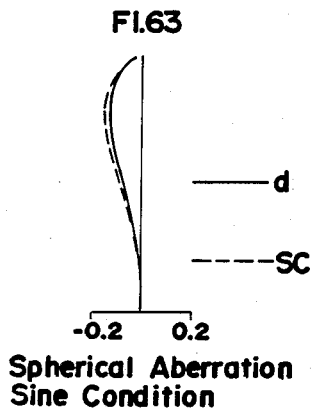
FIGS. 97a to 97c represent the aberration curves of the twenty-ninth embodiment for the shortest focal length condition in the infinity focusing condition.
Figure 97B:
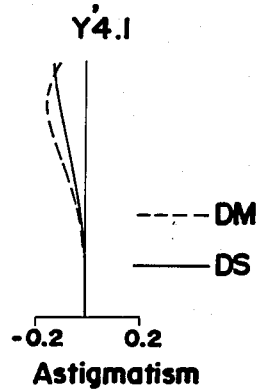
Figure 97C:
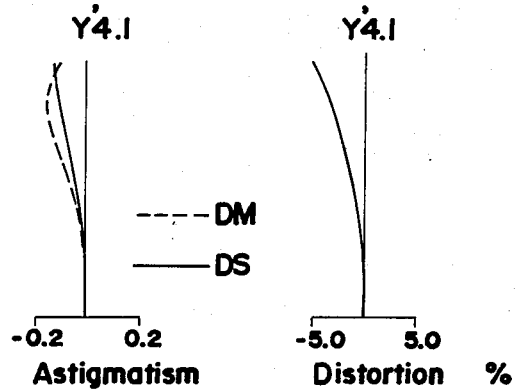
Figure 98A:
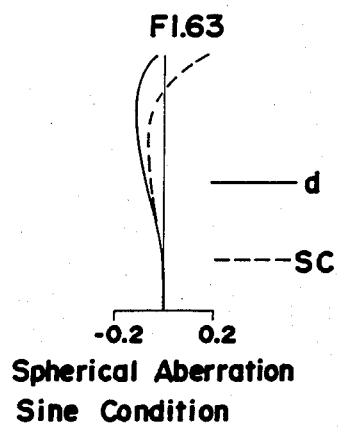
FIGS. 98a to 98c represent the aberration curves of the thirtieth embodiment for the longest focal length condition in the infinity focusing condition.
Figure 98B:
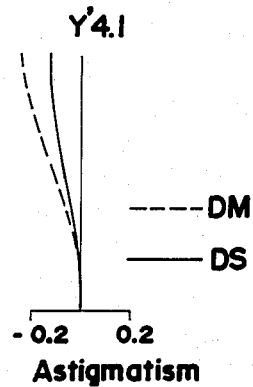
Figure 98C:
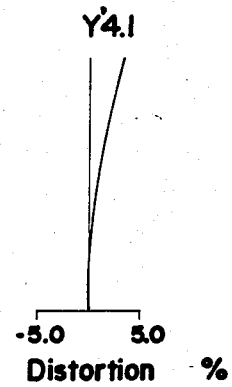
Figure 99A:
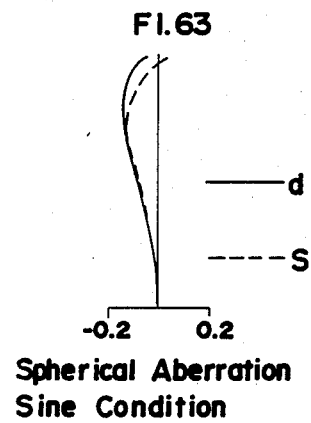
FIGS. 99a to 99c represent the aberration curves of the thirtieth embodiment for the medium focal length condition in the infinity focusing condition.
Figure 99B:
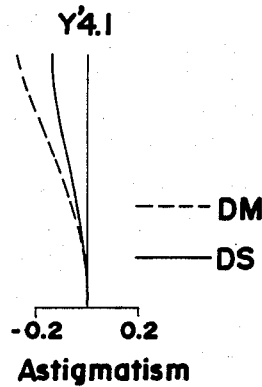
Figure 99C:
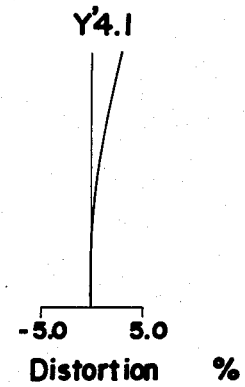
Figure 100A:
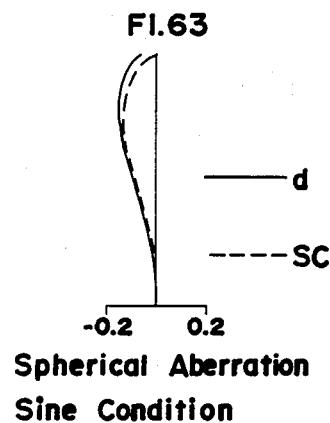
FIGS. 100a to 100c represent the aberration curves of the thirtieth embodiment for the shortest focal length condition in the infinity focusing condition.
Figure 100B:
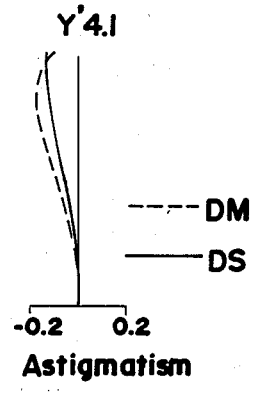
Figure 100C:
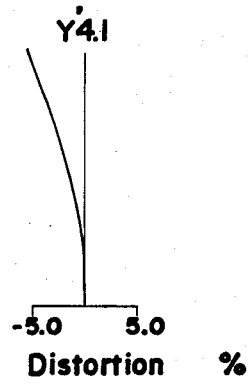
Figure 101A:
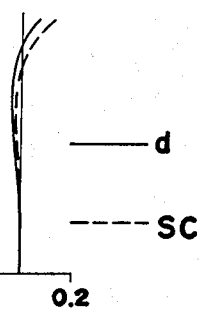
FIGS. 101a to 101c represent the aberration curves of the thirty-first embodiment for the longest focal length condition in the infinity focusing condition.
Figure 101B:
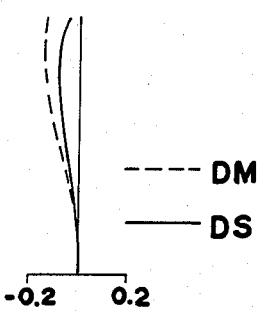
Figure 101C:
Figure 102A:
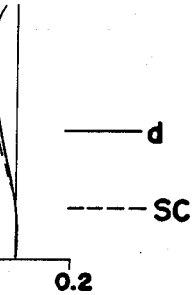
FIGS. 102a to 102c represent the aberration curves of the thirty-first embodiment for the medium focal length condition in the infinity focusing condition.
Figure 102B:
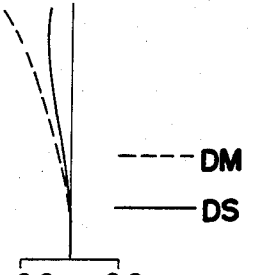
Figure 102C:
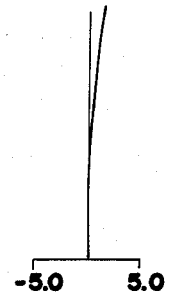
Figure 103A:
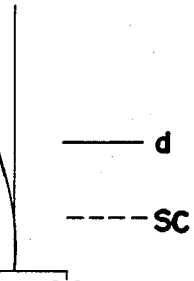
FIGS. 103a to 103c represent the aberration curves of the thirty-first embodiment for the shortest focal length condition in the infinity focusing condition.
Figure 103B:
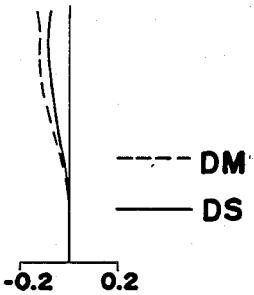
Figure 103C:
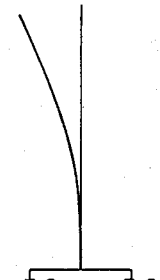
Figure 104A:
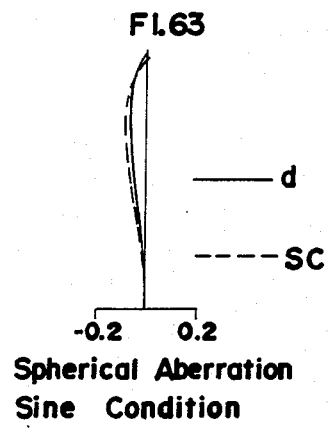
FIGS. 104a to 104c represent the aberration curves of the thirty-second embodiment for the longest focal length condition in the infinity focusing condition.
Figure 104B:
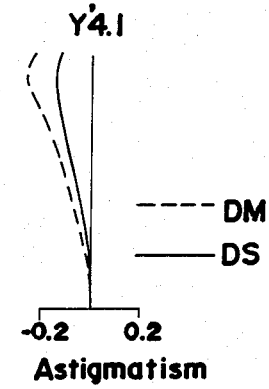
Figure 104C:
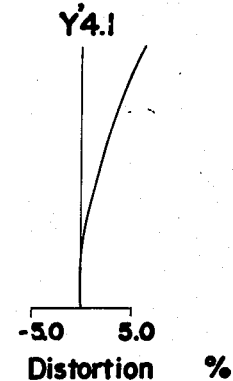
Figure 105A:
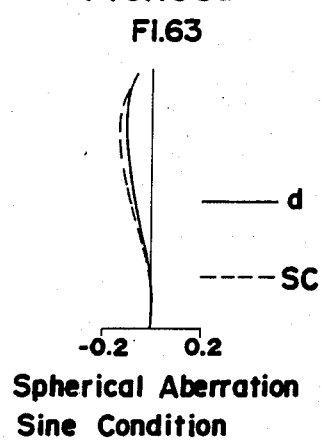
FIGS. 105a to 105c represent the aberration curves of the thirty-second embodiment for the medium focal length condition in the infinity focusing condition.
Figure 105B:
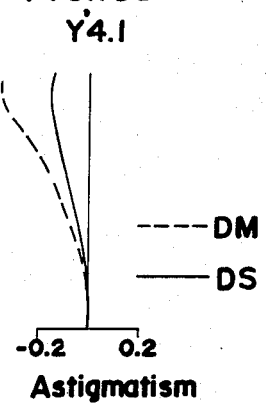
Figure 105C:
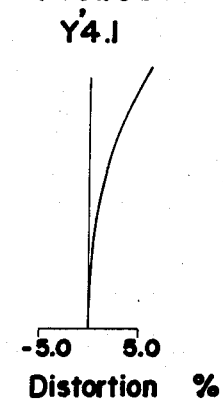
Figure 106A:
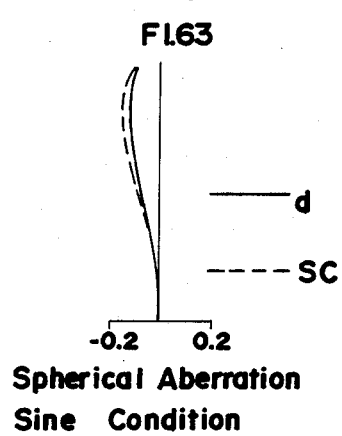
FIGS. 106a to 106c represent the aberration curves of the thirty-second embodiment for the shortest focal length condition in the infinity focusing condition.
Figure 106B:
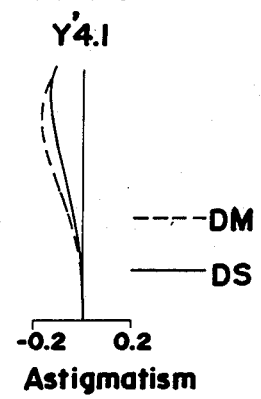
Figure 106C:
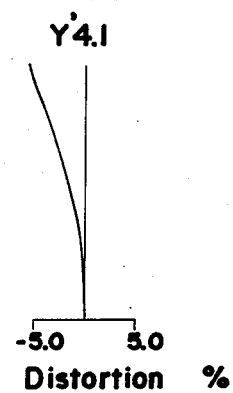
Figure 107A:
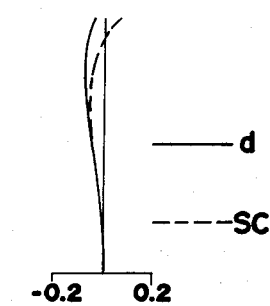
FIGS. 107a to 107c represent the aberration curves of the thirty-third embodiment for the longest focal length condition in the infinity focusing condition.
Figure 107B:
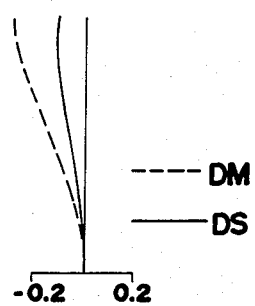
Figure 107C:
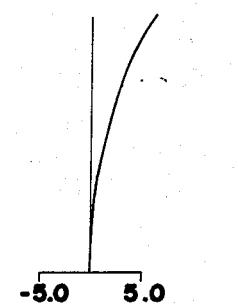
Figure 108A:
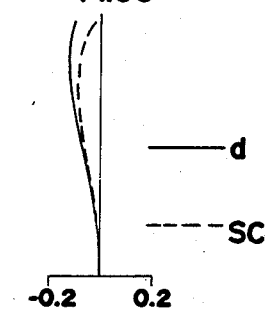
FIGS. 108a to 108c represent the aberration curves of the thirty-third embodiment for the medium focal length condition in the infinity focusing condition.
Figure 108B:
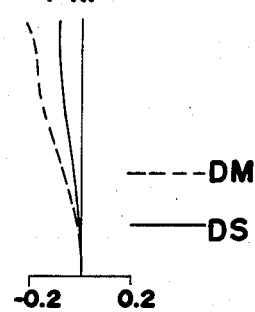
Figure 108C:
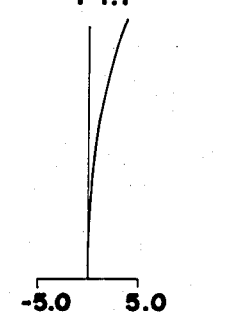
Figure 109A:
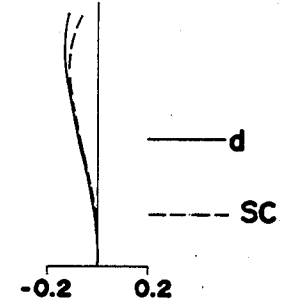
FIGS. 109a to 109c represent the aberration curves of the twenty-third embodiment for the shortest focal length condition in the infinity focusing condition.
Figure 109B:
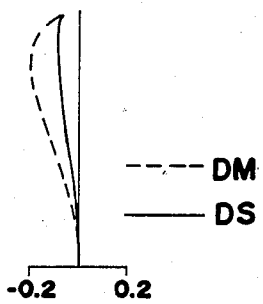
Figure 109C:
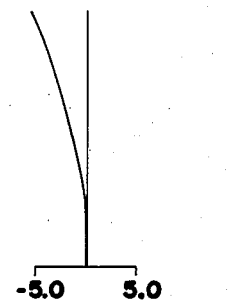

In the drawings, schematic cross sectional views disclose the position of the lens units and lens elements for the longest focal length(T). Especially as to the movable lens units, the movements for zooming toward the shortest focal length(W) are represented by the arrows 1 and 2. In front of a third lens unit (III) expained below, (3) represents a diaphragm, contrary behind the third lens unit (III), (4) represents a flat plate corresponding to a low-pass filter or a face plate. Moreover, in the FIGS. 11a to 109c, a solid line (d) represents an aberration against the d-line, a dotted line (SC) represents a sine condition, a dotted line (DM) represents an astigmatism on the meridional surface and a solid line (DS) represents an astigmatism on the sagittal surface, respectively.

Due to the number of lens elements involved, it was not deemed appropriate to include individual designation of the radii of curvature and axial distances for each lens element and air space. These values, however, are provided in the accompanying tables set forth herein, and the schematic cross sectional views of the respective embodiments follow the normal conventions of an object at the left-hand side of the drawing and the image plane at the right-hand side.

According to the present invention, a zoom lens system comprises from the object side to the image side: a first lens unit (I) of a positive refractive power, consisting of a negative meniscus lens element having an object side surface convex to the object side, and a bi-convex lens element whose object side surface has stronger refractive power than its image side surface has; a second lens unit (II) of a negative refractive power, consisting of a negative lens element whose object side surface has stronger refractive power than its image side surface has, and a positive meniscus lens element having an object side surface convex to the object side; and a third lens unit (III) of a negative refractive power; wherein the second lens unit (II) and one of the first and third lens units are shiftable along the optical axis of the lens system in the zooming operation while another thereof is stationary on the optical axis in the zooming operation.

In the present invention, negative lens elements are located at the object side in both of the first lens unit (I) and the second lens unit (II) respectively for decreasing incident angles of a paraxial light rays on the respective following lens elements. It is effective for controlling the generation of the coma aberration and the field curvature in the paraxial region, and also for compensating the spherical aberration in the axial region. Additionally, since both of the first and second lens units consists of a combination of one positive lens element and one negative lens element respectively, the fluctuation of the lateral chromatic aberration and that of the longituidal chromatic aberration in the zooming operation can be corrected well. The first and second lens units may consists of a compound lens component in which one positive lens element and one negative lens element are cemented with each other for making its manufacture simple, respectively. However, it is desirable for well compensating the aberrations that the first and second lens units consists of a separeted lens component in which one positive lens element and one negative lens element are separeted with each other.

According to one type of above mentioned zoom lens system, in which the first lens unit (I) is shiftable along the optical axis in the zooming operation while the third lens unit (III) is stationary on the optical axis to converge the divergent light projected through the second lens unit (II), a high optical performance of the whole lens system can be obtained, although the zooming part shftable in the zooming operation is composed of only four lens elements.

On the other hand, another type of zoom lens system, in which the first lens unit (I) is stationary on the optical axis while the third lens unit (III) is shiftable along the optical axis, corresponding to a shift of the second lens unit(II) is effective for preventing a radius of the front lens element from being long.

Moreover, maintaining the aberration compensated condition in the zooming operation, the lens system is required to fulfill the following conditions:

$$0.05 < R_{1P}/R_{2R} < 0.43 \ (R_{2R} \geq 0) \quad (1)$$

$$0.30 < R_{4R}/R_{1P} < 0.60 \quad (2)$$

$$0.28 < \phi_I/|\phi_{II}| < 0.45 \ (\phi_{II} < 0) \quad (3)$$

$$0.38 < R_{3R} \cdot |\phi_{II}| < 0.75 \ (\phi_{IIb} < 0) \quad (4)$$

$$0.65 < R_{1R}/R_{2P} < 1.00 \quad (5)$$

$$(n_1 + N_4)/2 < 1.78 \quad (6)$$

wherein; R represents the radius of curvature, wherein the first subscript thereof represents the lens number counted from the object side, and the second subscript thereof, that is P represents the object side surface and R represents the image side surface; $\phi_I$ represents the refractive power of the first lens unit; $\phi_{II}$ represents the refractive power of the second lens unit; and $n_i$ represents the refractive index of the i-th lens element counted from the object side.

The above described condition (1) defines, regarding the whole first lens unit as a single positive lens element, the ratio of the refractive power of the object side surface to that of the image side surface, and affects greatly the aberrations in the marginal region. If the lower limit of the condition (1) is violated, the coma aberration in the upper region is undesirably generated by the outer ray passing the outside the principal ray of the marginal ray especially in the longest focal length condition. Contrary, if the upper limit of the condition (1) is violated, the coma aberration in the upper region is undesirably generated. Thus, the good performance for correcting aberrations cannot be secured with violating the condition (1).

Condition (2) defines the meniscus shape, regarding the first lens unit (I) and the second lens unit(II) as one single negative meniscus lens element as a whole. As well as the condition (1), the condition (2) greatly influences on the coma aberration and the spherical aberration in the longest focal length condition. If the lower limit of the condition (2) is violated, the upper comatic aberration increases and the spherical aberration becomes in under-correcting condition. On the other hand, if the upper limit of the condition (2) is violated, the lower comatic aberration increases and the spherical aberration becomes in over-correcting condition. That is, a good performance for correcting the aberrations cannot be secured without fulfilling condition (2).

Condition (3) defines the ratio of refractive power of the first lens unit (I) to that of the second lens unit (II). If the lower limit of the condition (3) is violated, the optical performance is deteriorated greatly because of a higher degree aberration generated by the second lens unit (II), although it is possible to make the lens system compact. On the other hand, if the upper limit of the condition (3) is violated, it is required to extend the diameter of the front lens unit for maintaining the sufficient quantity of marginal light. Therefore, the compactness in size and the lightness in weight cannot be satisfied, and the Petzval sum becomes large to deteriorate the field curvature.

Condition (4) defines the refractive power of the strongest refractive surface of the negative lens element in the second lens unit (II), and affects especially the spherical aberration and the field curvature in the longest at focal length condition. The spherical aberration and the field curvature become in over-correcting condition if the lower limit of the condition (4) is violated, and become in under-correcting condition if the upper limit of the condition (4) is violated, so that the sufficient optical performance cannot he obtained without fulfilling the condition (4).

Condition (5) defines the ratio of radii of curvature of two surface faced to each other within the first lens unit (I). If the negative lens element and the positive lens element in the first lens unit (I) are cemented to each other, the above parameter becomes 1.0. Contrary, if the negative lens element is spaced from the positive lens element the radius of curvature of the surface of the negative lens element Is required to be smaller than that of the positive lens element side. If the upper limit of the condition (5) is violated, that is, the radius of curvature of the surface of the negative lens element side is larger than that of the positive lens element side, negative distortion becomes too large. On the other hand, it is unfavorable that the lower limit of the condition (5) is violated, that is, the radius of curvature of the surface of the negative lens element side becomes too small resulting in too much generation of lower comatic aberration in the longest focal length condition.

Condition (6) shows that the negative lens element of the first lens unit (I) and the positive lens element of the second lens unit (II) should be made of glass materials having an sufficient high refractive indice, respectively.

In case the condition (6) is not satisfied, the generation of high degree aberrations cannot be compensated well.

Provided the above mentioned conditions are fulfilled, the compactness of the whole lens system, the lightness thereof and low cost thereof are improved with well controlling the fluctuation of aberrations in the zooming operation and with well compensating the remaining aberrations even in the shortest focal length condition.

Furthermore, a low cost zoom lens system having a good aberration correction can be obtained by consisting of the third lens unit (111) of as follows in addition to the above mentioned zooming part consisting of the first lens unit (I) and the second lens unit (II).

That is, the third lens unit (III) consists of, from the object side to the image side, a positive lens element whose object side surface has stronger refractive power than its image side surface has, a bi-concave lens element, a positive lens element whose image side surface has stronger refractive power than its object side surface has, and a positive lens element whose object side surface has stronger refractive power than its image side surface has. This construction of the third lens unit(111) makes it possible to secure a compact zoom lens system having a sufficient back focal distance with making the correction of the various aberrations easy.

Moreover, a good performance can be also obtained by fulfilling the following conditions:

$$1.0 < A_1/A_2 \quad (7)$$

$$0.40 < |R_{6P}|R_{6R} < 1.20, (R_{6P} < 0) \quad (8)$$

$$0.60 < F_7 \cdot \phi_{7R} < 1.30 \text{ (wherein } \phi_{7R} = (n_7 - 1)/|R_{7R}| \quad (9)$$

$$0.70 < f_8 \cdot \phi_{8P} < 1.60, \text{ (wherein } \phi_{8P} = (n_8 - 1)/R_{8P}) \quad (10)$$

wherein; $A_1$ represents the axial air space between the fifth lens element and the sixth lens element counted from the object side; $A_2$ represents the axial air space between the sixth lens element and the seventh lens element counted from the object side; $f_i$ represents the focal length of the i-th lens element counted from the object side.

Condition (7) defines the axial air spaces in front of and behind the sixth lens element which is the only negative lens element in the third lens unit (III) as that the air space on the object side is larger than that on the image side. The distribution and the lateral chromatic aberration are greatly influenced by the arrangement of the sixth lens element. If the lower limit of the condition (7) is violated, the negative distortion is greatly generated as well as the lateral chromatic aberration is too large to be corrected.

Condition (8) defines the distribution of power between the object side surface and the rear side surface of the negative sixth lens element. The sixth lens element, which is the only negative lens element in the third lens unit (III), is so important as to cancel the various aberrations caused by the other three lens elements in the third lens unit (III). If the refractive power is concentrated on the object side surface of the sixth lens element with violating the lower limit of the condition (8), the negative distortion is undesirably generated and the field curvature is also deteriorated. Contrary, if the refractive power is concentrated on the image side surface of the sixth lens element with violating the upper limit of the condition (8), the deterioration in the optical performance is caused by the over generation of sagittal flare and aberration of higher degrees and it becomes difficult to maintain the sufficient back focal distance.

Condition (9) defines that the positive refractive power of the seventh lens element should be concentrated on the image side surface thereof, while condition (10) defines that the positive refractive power of the eighth lens element should be concentrated on the object side surface thereof. On each of these conditions (9) and (10), if the parameter in each of the conditions becomes smaller than 1.0, the lens element becomes a bi-convex lens element. On the other hand, if the parameter in each of the conditions becomes larger than 1.0, the lens element becomes a meniscus lens element. The most suitable shape for the both lens elements is determined in accordance with the balance among the spherical aberration, the field curvature in off-axial region, the distortion, and the coma aberration. If the lower limit of each of the conditions (9) and (10) is violated, the aberrations in the off-axial region is deteriorated although it is favorable to correct the spherical aberration. To the contrary, if the upper limit of each of the conditions (9) and (10) is violated, the spherical aberration and the distortion in the off-axial region are deteriorated.

Provided the third lens unit (III) is composed with fulfilling the above mentioned conditions, a compact-size, light-weight, and low-cost zoom lens system having a large aperture ratio and high optical performance can be realized by only eight lens elements.

As a second type of the third lens unit (III), the third lens unit (III) is capable of consisting of, from the object side to the image side, a positive lens element whose image side surface has stronger refractive power than its object side surface has, a positive lens element whose object side surface has stronger refractive power than its image side surface has, a bi-concave lens element whose image side surface has stronger refractive power than its object side surface has, and a bi-convex lens element. According to the second type of the third lens unit (III), it is possible to make the third lens unit (III) very compact. Additionally, the negative refractive power is located comparatively at the image side of the whole lens system, the Petzval sum can be enough small and a good forming performance can be obtained.

Further, the third lens unit (III) with a very good optical performance can be obtained by fulfilling the following conditions:

$$0.30 < f_6/f_5 < 0.60 \quad (11)$$

$$0.10 < R_{7R}/|R_{7P}| < 0.50 \ (R_{7P} < 0) \quad (12)$$

$$0.20 < T_7/f_W < 0.60 \quad (13)$$

wherein: $T_7$ represents the axial thickness of the seventh lens element counted from the object side; and $f_W$ represents the shortest focal length of the whole lens system.

Condition (11) defines a balance of refractive powers between the two lens elements preceding in the third lens unit (III). If the refractive power of the fifth lens element becomes weak with violating the lower limit of condition (11), the positive refractive power of the sixth lens element and that of the eighth lens element should be made stronger to deteriorate the spherical aberration On the other hand, if the upper limit of condition (11) is violated, it becomes difficult to obtain a sufficient back focal distance, so the lens system could not be put to a practical use.

Condition (12) refers to the balance of the refractive powers of the object side surface of the seventh lens element and the image side surface thereof If the refractive power of the image side surface becomes stronger with violating the lower limit of condition (12), the comatic aberration of the high degree is much generated. To the contrary, if the refractive power of the object side surface becomes stronger with violating the upper limit of condition (12), it would results in the over-correction of the spherical aberration and the generation of negative distortion.

Condition (13) defines the axial thickness of the seventh lens element. For well correcting the off-axial aberration and the field curvature, the axial thickness of the seventh lens element more than some extent is desirable. If the thickness of the seventh lens element becomes smaller with violating the lower limit of condition (13), the off-axial aberration and the field curvature would not be corrected well. If the thickness of the seventh lens element becomes larger with violating the upper limit of condition (13), a sufficient back focal distance could not be obtained though the optical performance of the lens system would be improved, so that the lens system could not be put to a practical use.

Provided the third lens unit (III) is composed fulfilling the above mentioned conditions (11) to (13), to some extent of the aberrations left uncorrected would be corrected well.

In the present invention, it is desirable that the focusing operation of the zoom lens system is performed by shifting one of the first lens unit (I) and the third lens unit (III) which is shiftable in the zooming operation. The above mentioned structure would have good results as follows.

Recently, an automatic focusing device is indispensable for the video camera system or other camera system, and therefore many kinds of automatic focusing devices are suggested and utilized. If such an automatic focusing device, in which the focusing condition of the lens system is detected by receiving light passed through the lens system, is adapted to the zoom lens system according to the present invention, a cam mechanism, provided for shifting the focusing lens unit in relation to the shifting the second lens unit (II) during the zooming operation, can be omitted.

That is, according to the present invention, the focusing lens unit (consisting of either of the first lens unit (I) and the third lens unit (III)) is shifted for the focusing of the whole lens system in the focusing operation and also for maintaining the image plane at a predetermined plane as a compensator lens unit in the zooming operation. In other words, the operation of a compensator in the zoom lens system can be regarded as one of the focusing operation. The lens elements and the lens-barrel can not be separated in considering the cost, size and weight of the zoom lens system. As for the lens-barrel of the zoom lens system, the shifting mechanism such as a cam mechanism or a helicoid mechanism requiring a high definition possess large rate in cost and in weight in whole lens-barrel body, so omitting the cam mechanism and the helicoid mechanism is a great advantage of the above identified through the lens automatic focusing operation. Moreover, according to the present invention, as only two lens units are shiftable during the zooming or the focusing operations, the deterioration of optical performance by unsteadiness of the shiftable lens units can be relaxed.

In the present invention, the zoom lens system in which the third lens unit (III) thereof is left stationary during the zooming operation and the first lens unit (I) thereof serves as a focusing lens unit, will be materialized effectively provided the following conditions are fulfilled:

$$0.28 < \phi_I / |\phi_{II}| < 0.43 \ (\phi_{II} < 0) \quad (14)$$

$$0.18 < \phi_I f_W < 0.32 \quad (15)$$

Condition (14) defines the ratio of the refractive powers between the first lens unit (I) and the second lens unit (II). A curve and amount of movement of the first lens unit (I) in the zooming operation are affected by the above mentioned ratio. If the ratio becomes small with violating the lower limit of condition (14), the first lens unit (I) would deviate to the object side in the longest focal length condition in comparison with in the shortest focal length condition and a sufficient quantity of marginal ray could not be secured in the longest focal length condition As well as, if the ratio becomes large with violating the upper limit of condition (14), the first lens unit (I) would deviate to the object side in the shortest focal length condition, and a sufficient quantity of marginal ray could not be secured in the shortest focal length condition. Both of the above cases make the first lens unit(1) larger, which possesses large rate in weight. Moreover, if the above mentioned ratio is outside of the limits of condition (14), it would be inconvenient for well correcting various aberrations in the zooming operation.

Condition (15) defines the refractive Power of the first lens unit(I). If the lower limit of condition (15) is violated, the first lens unit (I) would become larger in size, therefore the lightness in weight and the compactness in size thereof could not be achieved. On the other hand, the violating the upper limit of condition (15) would be advantageous to the compactness in size, but a sufficient back focal distance could not be secured as well as too much aberration of higher degrees would arise preventing simplification of the structure of the whole lens system and the lowering costs.

Further, without adapting the TTL automatic focusing operation, an effect that the shifting distance is invariable in any focal length condition could be expected provided the first lens unit (I) serves as a focusing lens unit.

Meanwhile, if the first lens unit (I) is left stationary during the zooming operation and the third lens unit (III) serves as a focusing lens unit, the following effects could be expected That is, the first positive lens unit (I) doesn't need to shift during the focusing operation, and so a sufficient quantity of marginal ray is secured even in a close-up condition. Therefore the diameter of the front lens element becomes quite short in comparison with the case that the first lens unit (I) serves as a focusing lens unit. The lightness in weight owing to a small diameter of the front lens element is very advantageous, because the front lens element possesses the majority of the weight of the whole lens system utilized for a video camera or a compact camera.

Moreover, the third lens unit (III) can possess quite strong refractive power compared with the first lens unit (I), and so the shifting distance of the third lens unit (III) as a compensator as well as the shifting distance of the third lens unit (III) for the focusing operation can be quite shorter in comparison with the case that the first lens unit (I) serves as a focusing lens unit. So far as the short shifting distance, a relatively distinct picture image is secured even during the focusing operation, thanks to a low variable power rate and a focal length range in the shortest focal length side. Therefore the zoom lens system with low cost and simple structure can he utilized.

In accordance with the present invention, the lens system is further recommended to fulfill the following conditions:

$$0.28 < \phi_I/|\phi_{II}| < 0.43 \ (\phi_{II}<0) \tag{16}$$

$$0.85 < \phi_{III} \cdot f_W < 1.70 \ (\text{wherein } f_M=(f_W \cdot f_T)^{\frac{1}{2}}) \tag{17}$$

wherein: $\phi_{III}$ represents the refractive power of the third lens unit; and $f_T$ represents the longest focal length of the whole lens system.

Condition (16) defines the ratio of the refractive powers between the first lens unit (I) and the second lens unit (II). A curve and an amount of movement of the third lens unit (III) as a compensator are affected by the above mentioned ratio. If the ratio becomes smaller with violating the lower limit of condition (16), the third lens unit (III) would deviate to the image side in the shortest focal length condition in comparison with in the longest focal length condition, and the cam mechanism could not be omitted, nor a sufficient quantity of marginal ray could not be secured in the longest focal length condition. As well as, if the ratio becomes larger with violating the upper limit of condition (16), the third lens unit (III) would deviate to the image side in the longest focal length condition, and a sufficient quantity of marginal ray could not be secured in the longest focal length condition.

Condition (17) defines the refractive power of the third lens unit (III). if the lower limit of condition (17) is violated, the third lens unit (III) would shift too much during the focusing operation. On the other hand, if the upper limit of condition (17) is violated, the shifting distance of the third lens unit (III) would become smaller, but a sufficientb back focal distance could not be secured.

Provided that the above mentioned conditions (16) and (17) on the focusing operation, a concrete structure of the first, second and third lens units (I), (II) and (III) can adapt the above mentioned structure of the zoom lens system. But the extent of conditions (1), (3) and (5) are further recommended to be the following conditions:

$$0.05 < R_{1P}/|R_{2R}| < 0.45 \ (R_{2R}<0) \tag{1'}$$

$$0.43 < R_{3R} \cdot |\phi_{II}| < 0.75 \ (\phi_{II}<0) \tag{3'}$$

$$0.60 < R_{1R}/R_{2P} < 1.00 \tag{5'}$$

In the present invention, the second lens unit (II) of the above mentioned zoom lens system can comprise three lens elements, that is, from the object side to the image side, a negative lens element whose image side surface having a stronger refractive power than its object side surface has, a negative lens component in which a negative lens element and a positive lens element are cemented to each other. The above construction is for securing enough optical performance even in the shortest focal length condition as well as reducing moderately the fluctuation of the aberrations during the zooming operation. In this case, the lens system is recommended to further fulfill the following conditions:

$$0 < R_{1P}/|R_{2R}| < 0.5 \ (R_{2R}<0) \tag{1''}$$

$$0.27 < \phi_I/|\phi_{II}| < 0.40 \ (\phi_{II}<0) \tag{3''}$$

$$1.0 < A_1/A_2 \tag{7''}$$

$$0.40 < |R''_{7P}|/R''_{7R} < 1.20 \ (R_{7P}<0) \tag{8''}$$

$$0.30 < f''_7/f''_6 < 0.6 \tag{11''}$$

$$0.05 < R''_{8R}/R''_{8P} < 0.5 \ (R_{8P}<0) \tag{12''}$$

$$0.18 < \phi_I \cdot f_W < 0.35 \tag{15''}$$

$$0.85 < \phi_{III} \cdot f_M < 1.70 \tag{17''}$$

wherein; $R''_{7P}$ and $R''_{7R}$ in the condition (8)'' represent $R_{6P}$ and $R_{6R}$ in the condition (8), respectively: $R''_{8P}$ and $R''_{8R}$ in the condition (12)'' represent $R_{7P}$ and $R_{7R}$ in the condition (12), respectively; and $f''_7$ and $f''_6$ in the condition (11) represent $f_6$ and $f_5$ in the condition (11) respectively The respective conditions are similar in the problems caused by the violating the upper or the lower limit thereof to the condition (1),(3),(7),(8),(11),(12),(15) and (17).

Condition (15)'' is effective based on the construction of the zoom lens system in which the first and the second lens units (I) and (II) are movable during the zooming operation, while the third lens unit (Ill) is left stationary. On the other hand, condition (17)'' is effective based on the construction of the zoom lens system in which the first lens unit (I) is left stationary, while the second and the third lens units (II) and (III) are movable during the zooming operation.

Moreover, condition (7)'' and (8)'' are effective, provided that the third lens unit (III) is composed of four lens elements, from the object side to the image side, a positive lens element whose object side surface has a stronger refractive power than its image side surface has, a bi-concave lens, a positive lens element whose image side surface has a stronger refractive power than its object side surface has, and a positive lens element whose object side surface has a stronger refractive power than its image side surface has.

Meanwhile, condition (11)'' and (12)'' are effective, provided that the third lens unit (III) is composed of four lens elements, from the object side to the image side, a positive lens element whose image side surface has a stronger refractive power than its object side surface has, a positive lens element whose object side surface has a stronger refractive power than its image side surface has, a bi-concave lens whose image side surface has a stronger refractive power than its object side surface has, and a bi-convex lens.

The following Tables 1 to 33 disclose, respectively, the first to thirty-third embodiments of the present invention in the Tables, f equals the focal length; r is radius of curvature with respective sub number indicating the surfaces from the object side to the image side along the optical axis; d represents the axial distance and includes both the air spaces and the actual thickness of the lens elements along the optical axis; Nd equals the refractive index and again, the sub numbers refer to the particular optical element from the object side to the image side; and finally, d equals the Abbe number and the sub numbers refer to the particular optical elements from the object side to the image side. In the first to thirty-third embodiments of the present invention, respectively, a flat board corresponding to a low-pass filter or a face plate is inserted at the end of the each embodiment. The air space distances in the Tables provided with three separate values correspond to the values for the shortest, medium and longest focal length conditions, respectively.

TABLE 1

Embodiment 1
$f = 25.0-12.3$ $F = 1.63-1.63$

| Radius of Curvature | Axial Distance | Refractive Index(Nd) | Abbe Number (νd) |
|---|---|---|---|
| $r_1$ 39.064 | | | |
| | $d_1$ 1.200 | $N_1$ 1.80518 | $\nu_1$ 25.43 |
| $r_2$ 23.030 | | | |
| | $d_2$ 4.100 | $N_2$ 1.69100 | $\nu_2$ 54.75 |
| $r_3$ −199.877 | | | |
| | $d_3$ 14.635 | $N_3$ 1.00000 | |
| $r_4$ −51.773 | | | |
| | $d_4$ 1.000 | $N_4$ 1.69350 | $\nu_4$ 50.29 |
| $r_5$ 8.957 | | | |
| | $d_5$ 3.200 | $N_5$ 1.80518 | $\nu_5$ 25.43 |
| $r_6$ 16.871 | | | |
| | $d_6$ 3.000 | $N_6$ 1.00000 | |
| $r_7$ ∞ | | | |
| | $d_7$ 1.500 | $N_7$ 1.00000 | |
| $r_8$ 14.100 | | | |
| | $d_8$ 3.100 | $N_8$ 1.71300 | $\nu_8$ 53.93 |
| $r_9$ −42.404 | | | |
| | $d_9$ 2.624 | $N_9$ 1.00000 | |
| $r_{10}$ −13.251 | | | |
| | $d_{10}$ 4.931 | $N_{10}$ 1.75520 | $\nu_{10}$ 27.51 |
| $r_{11}$ 17.883 | | | |
| | $d_{11}$ 1.611 | $N_{11}$ 1.00000 | |
| $r_{12}$ 65.100 | | | |
| | $d_{12}$ 4.466 | $N_{12}$ 1.67000 | $\nu_{12}$ 57.07 |
| $r_{13}$ −14.473 | | | |
| | $d_{13}$ 0.100 | $N_{13}$ 1.00000 | |
| $r_{14}$ 18.071 | | | |
| | $d_{14}$ 4.001 | $N_{14}$ 1.67000 | $\nu_{14}$ 57.07 |
| $r_{15}$ −112.445 | | | |
| | $d_{15}$ 2.000 | $N_{15}$ 1.00000 | |
| $r_{16}$ ∞ | | | |
| | $d_{16}$ 3.000 | $N_{16}$ 1.51680 | $\nu_{16}$ 64.12 |
| $r_{17}$ ∞ | | | |

$d_3 = 14.635-8.649-1.500$
$d_6 = 3.000-13.476-19.631$

TABLE 2

Embodiment 2
$f = 17.8-9.2$ $F = 1.63-1.63$

| Radius of Curvature | Axial Distance | Refractive Index(Nd) | Abbe Number (νd) |
|---|---|---|---|
| $r_1$ 28.571 | | | |
| | $d_1$ 1.300 | $N_1$ 1.80518 | $\nu_1$ 25.43 |
| $r_2$ 18.510 | | | |
| | $d_2$ 1.200 | $N_2$ 1.00000 | |
| $r_3$ 21.945 | | | |
| | $d_3$ 4.600 | $N_3$ 1.77250 | $\nu_3$ 49.77 |
| $r_4$ −131.591 | | | |
| | $d_4$ 10.929 | $N_4$ 1.00000 | |
| $r_5$ −398.359 | | | |
| | $d_5$ 1.000 | $N_5$ 1.77250 | $\nu_5$ 49.77 |
| $r_6$ 8.312 | | | |
| | $d_6$ 1.700 | $N_6$ 1.00000 | |
| $r_7$ 8.645 | | | |
| | $d_7$ 2.400 | $N_7$ 1.80518 | $\nu_7$ 25.43 |
| $r_8$ 10.669 | | | |
| | $d_8$ 2.800 | $N_8$ 1.00000 | |
| $r_9$ ∞ | | | |
| | $d_9$ 1.500 | $N_9$ 1.00000 | |
| $r_{10}$ 9.525 | | | |
| | $d_{10}$ 3.200 | $N_{10}$ 1.77250 | $\nu_{10}$ 49.77 |
| $r_{11}$ −44.793 | | | |
| | $d_{11}$ 2.200 | $N_{11}$ 1.00000 | |
| $r_{12}$ −10.396 | | | |
| | $d_{12}$ 3.400 | $N_{12}$ 1.80518 | $\nu_{12}$ 25.43 |

TABLE 2-continued

Embodiment 2
$f = 17.8-9.2$ $F = 1.63-1.63$

| Radius of Curvature | Axial Distance | Refractive Index(Nd) | Abbe Number (νd) |
|---|---|---|---|
| $r_{13}$ 11.678 | | | |
| | $d_{13}$ 0.800 | $N_{13}$ 1.00000 | |
| $r_{14}$ 83.678 | | | |
| | $d_{14}$ 3.500 | $N_{14}$ 1.77250 | $\nu_{14}$ 49.77 |
| $r_{15}$ −10.533 | | | |
| | $d_{15}$ 0.100 | $N_{15}$ 1.00000 | |
| $r_{16}$ 9.889 | | | |
| | $d_{16}$ 3.600 | $N_{16}$ 1.77250 | $\nu_{16}$ 49.77 |
| $r_{17}$ 28.070 | | | |
| | $d_{17}$ 2.000 | $N_{17}$ 1.00000 | |
| $r_{18}$ ∞ | | | |
| | $d_{18}$ 8.600 | $N_{18}$ 1.51680 | $\nu_{18}$ 64.12 |
| $r_{19}$ ∞ | | | |

$d_4 = 10.929-6.054-1.500$  $d_8 = 2.800-8.862-11.788$

TABLE 3

Embodiment 3
$f = 17.8-9.2$ $F = 1.63-1.63$

| Radius of Curvature | Axial Distance | Refractive Index(Nd) | Abbe Number (νd) |
|---|---|---|---|
| $r_1$ 26.466 | | | |
| | $d_1$ 1.300 | $N_1$ 1.84666 | $\nu_1$ 23.83 |
| $r_2$ 18.584 | | | |
| | $d_2$ 1.00 | $N_2$ 1.00000 | |
| $r_3$ 22.040 | | | |
| | $d_3$ 4.600 | $N_3$ 1.77250 | $\nu_3$ 49.77 |
| $r_4$ −203.157 | | | |
| | $d_4$ 10.688 | $N_4$ 1.00000 | |
| $r_5$ 440.748 | | | |
| | $d_5$ 1.000 | $N_5$ 1.77250 | $\nu_5$ 49.77 |
| $r_6$ 8.122 | | | |
| | $d_6$ 1.700 | $N_6$ 1.00000 | |
| $r_7$ 8.415 | | | |
| | $d_7$ 2.400 | $N_7$ 1.84666 | $\nu_7$ 23.8 |
| $r_8$ 9.922 | | | |
| | $d_8$ 2.800 | $N_8$ 1.00000 | |
| $r_9$ ∞ | | | |
| | $d_9$ 1.500 | $N_9$ 1.00000 | |
| $r_{10}$ 9.298 | | | |
| | $d_{10}$ 3.200 | $N_{10}$ 1.77250 | $\nu_{10}$ 49.77 |
| $r_{11}$ −44.119 | | | |
| | $d_{11}$ 2.200 | $N_{11}$ 1.00000 | |
| $r_{12}$ −10.315 | | | |
| | $d_{12}$ 3.400 | $N_{12}$ 1.84666 | $\nu_{12}$ 23.8 |
| $r_{13}$ 11.873 | | | |
| | $d_{13}$ 0.800 | $N_{13}$ 1.00000 | |
| $r_{14}$ 91.680 | | | |
| | $d_{14}$ 3.500 | $N_{14}$ 1.77250 | $\nu_{14}$ 49.77 |
| $r_{15}$ −10.432 | | | |
| | $d_{15}$ 0.100 | $N_{15}$ 1.00000 | |
| $r_{16}$ 10.076 | | | |
| | $d_{16}$ 3.600 | $N_{16}$ 1.77250 | $\nu_{16}$ 49.77 |
| $r_{17}$ 36.475 | | | |
| | $d_{17}$ 2.000 | $N_{17}$ 1.00000 | |
| $r_{18}$ ∞ | | | |
| | $d_{18}$ 8.600 | $N_{18}$ 1.51680 | $\nu_{18}$ 64.12 |
| $r_{19}$ ∞ | | | |

$d_4 = 10.688-5.679-1.000$  $d_8 = 2.800-8.700-11.548$

TABLE 4

Embodiment 4
$f = 17.8-7.2$ $F = 1.63$

| Radius of Curvature | Axial Distance | Refractive Index(Nd) | Abbe Number (νd) |
|---|---|---|---|
| $r_1$ 25.958 | | | |
| | $d_1$ 1.300 | $N_1$ 1.84666 | $\nu_1$ 23.8 |
| $r_2$ 17.704 | | | |
| | $d_2$ 1.200 | $N_2$ 1.00000 | |
| $r_3$ 21.399 | | | |
| | $d_3$ 5.100 | $N_3$ 1.71300 | $\nu_3$ 53.93 |
| $r_4$ −111.598 | | | |
| | $d_4$ 10.380 | $N_4$ 1.00000 | |

TABLE 4-continued

Embodiment 4 f = 17.8–7.2    F = 1.63

| Radius of Curvature | Axial Distance | Refractive Index(Nd) | Abbe Number (νd) |
|---|---|---|---|
| $r_5$ −760.919 | | | |
| | $d_5$ 1.000 | $N_5$ 1.71300 | $\nu_5$ 53.93 |
| $r_6$ 8.274 | | | |
| | $d_6$ 1.700 | $N_6$ 1.00000 | |
| $r_7$ 8.643 | | | |
| | $d_7$ 2.400 | $N_7$ 1.84666 | $\nu_7$ 23.8 |
| $r_8$ 10.570 | | | |
| | $d_8$ 2.800 | $N_8$ 1.00000 | |
| $r_9$ ∞ | | | |
| | $d_9$ 1.500 | $N_9$ 1.00000 | |
| $r_{10}$ 9.740 | | | |
| | $d_{10}$ 3.200 | $N_{10}$ 1.77250 | $\nu_{10}$ 49.77 |
| $r_{11}$ −37.466 | | | |
| | $d_{11}$ 2.100 | $N_{11}$ 1.00000 | |
| $r_{12}$ −10.765 | | | |
| | $d_{12}$ 3.200 | $N_{12}$ 1.84666 | $\nu_{12}$ 23.8 |
| $r_{13}$ 12.107 | | | |
| | $d_{13}$ 0.800 | $N_{13}$ 1.00000 | |
| $r_{14}$ 233.851 | | | |
| | $d_{14}$ 3.500 | $N_{14}$ 1.77250 | $\nu_{14}$ 49.77 |
| $r_{15}$ −10.402 | | | |
| | $d_{15}$ 0.100 | $N_{15}$ 1.00000 | |
| $r_{16}$ 10.030 | | | |
| | $d_{16}$ 3.600 | $N_{16}$ 1.77250 | $\nu_{16}$ 49.77 |
| $r_{17}$ 32.993 | | | |
| | $d_{17}$ 2.000 | $N_{17}$ 1.00000 | |
| $r_{18}$ ∞ | | | |
| | $d_{18}$ 8.600 | $N_{18}$ 1.51680 | $\nu_{18}$ 64.12 |
| $r_{19}$ ∞ | | | |

$d_4$ = 10.380–5.530–1.000    $d_8$ = 2.800–10.728–14.555

TABLE 5

Embodiment 5 f = 19.8–10.2    F = 1.63–1.63

| Radius of Curvature | Axial Distance | Refractive Index(Nd) | Abbe Number (νd) |
|---|---|---|---|
| $r_1$ 25.257 | | | |
| | $d_1$ 1.300 | $N_1$ 1.84666 | $\nu_1$ 23.8 |
| $r_2$ 17.622 | | | |
| | $d_2$ 1.200 | $N_2$ 1.00000 | |
| $r_3$ 22.411 | | | |
| | $d_3$ 4.000 | $N_3$ 1.71300 | $\nu_3$ 53.93 |
| $r_4$ −93.886 | | | |
| | $d_4$ 10.986 | $N_4$ 1.00000 | |
| $r_5$ −92.158 | | | |
| | $d_5$ 1.000 | $N_5$ 1.71300 | $\nu_5$ 53.93 |
| $r_6$ 8.784 | | | |
| | $d_6$ 1.700 | $N_6$ 1.00000 | |
| $r_7$ 8.968 | | | |
| | $d_7$ 2.300 | $N_7$ 1.84666 | $\nu_7$ 23.8 |
| $r_8$ 10.778 | | | |
| | $d_8$ 2.900 | $N_8$ 1.00000 | |
| $r_9$ ∞ | | | |
| | $d_9$ 1.500 | $N_9$ 1.00000 | |
| $r_{10}$ 9.969 | | | |
| | $d_{10}$ 3.500 | $N_{10}$ 1.78831 | $\nu_{10}$ 47.32 |
| $r_{11}$ −40.726 | | | |
| | $d_{11}$ 2.200 | $N_{11}$ 1.00000 | |
| $r_{12}$ −11.211 | | | |
| | $d_{12}$ 3.400 | $N_{12}$ 1.84666 | $\nu_{12}$ 23.8 |
| $r_{13}$ 12.178 | | | |
| | $d_{13}$ 0.800 | $N_{13}$ 1.00000 | |
| $r_{14}$ 88.258 | | | |
| | $d_{14}$ 3.200 | $N_{14}$ 1.78831 | $\nu_{14}$ 47.32 |
| $r_{15}$ −11.860 | | | |
| | $d_{15}$ 0.100 | $N_{15}$ 1.00000 | |
| $r_{16}$ 11.261 | | | |
| | $d_{16}$ 3.100 | $N_{16}$ 1.78831 | $\nu_{16}$ 23.8 |
| $r_{17}$ 38.959 | | | |
| | $d_{17}$ 2.000 | $N_{17}$ 1.00000 | |
| $r_{18}$ ∞ | | | |
| | $d_{18}$ 8.600 | $N_{18}$ 1.51680 | $\nu_{18}$ 64.12 |
| $r_{19}$ ∞ | | | |

TABLE 5-continued

Embodiment 5 f = 19.8–10.2    F = 1.63–1.63

$d_4$ = 10.986–6.035–1.000    $d_8$ = 2.900–9.199–12.498

TABLE 6

Embodiment 6 f = 24.6–10.25    F = 1.63–1.63

| Radius of Curvature | Axial Distance | Refractive Index(Nd) | Abbe Number (νd) |
|---|---|---|---|
| $r_1$ 28.367 | | | |
| | $d_1$ 1.300 | $N_1$ 1.84666 | $\nu_1$ 23.8 |
| $r_2$ 18.677 | | | |
| | $d_2$ 1.200 | $N_2$ 1.00000 | |
| $r_3$ 21.798 | | | |
| | $d_3$ 4.600 | $N_3$ 1.71300 | $\nu_3$ 53.93 |
| $r_4$ −103.356 | | | |
| | $d_4$ 13.504 | $N_4$ 1.00000 | |
| $r_5$ −67.611 | | | |
| | $d_5$ 1.000 | $N_5$ 1.71300 | $\nu_5$ 53.93 |
| $r_6$ 9.766 | | | |
| | $d_6$ 1.700 | $N_6$ 1.00000 | |
| $r_7$ 9.581 | | | |
| | $d_7$ 2.300 | $N_7$ 1.84666 | $\nu_7$ 23.8 |
| $r_8$ 11.184 | | | |
| | $d_8$ 3.200 | $N_8$ 1.00000 | |
| $r_9$ ∞ | | | |
| | $d_9$ 1.500 | $N_9$ 1.00000 | |
| $r_{10}$ 10.900 | | | |
| | $d_{10}$ 3.500 | $N_{10}$ 1.78831 | $\nu_{10}$ 47.32 |
| $r_{11}$ −53.032 | | | |
| | $d_{11}$ 2.900 | $N_{11}$ 1.00000 | |
| $r_{12}$ −11.953 | | | |
| | $d_{12}$ 4.300 | $N_{12}$ 1.84666 | $\nu_{12}$ 23.8 |
| $r_{13}$ 13.464 | | | |
| | $d_{13}$ 0.800 | $N_{13}$ 1.00000 | |
| $r_{14}$ 64.746 | | | |
| | $d_{14}$ 3.100 | $N_{14}$ 1.78831 | $\nu_{14}$ 47.32 |
| $r_{15}$ −13.641 | | | |
| | $d_{15}$ 0.100 | $N_{15}$ 1.00000 | |
| $r_{16}$ 12.387 | | | |
| | $d_{16}$ 3.000 | $N_{16}$ 1.78831 | $\nu_{16}$ 47.32 |
| $r_{17}$ 52.570 | | | |
| | $d_{17}$ 2.000 | $N_{17}$ 1.00000 | |
| $r_{18}$ ∞ | | | |
| | $d_{18}$ 8.600 | $N_{18}$ 1.51680 | $\nu_{18}$ 61.12 |
| $r_{19}$ ∞ | | | | d4 = 13.504–6.742–1.000    $d_8$ = 3.200–13.695–17.408

TABLE 7

Embodiment 7 f = 19.7–10.2    F = 1.44–1.44

| Radius of Curvature | Axial Distance | Refractive Index(Nd) | Abbe Number (νd) |
|---|---|---|---|
| $r_1$ 27.778 | | | |
| | $d_1$ 1.400 | $N_1$ 1.84666 | $\nu_1$ 23.8 |
| $r_2$ 18.868 | | | |
| | $d_2$ 1.200 | $N_2$ 1.00000 | |
| $r_3$ 22.955 | | | |
| | $d_3$ 4.200 | $N_3$ 1.71300 | $\nu_3$ 53.93 |
| $r_4$ −100.876 | | | |
| | $d_4$ 11.414 | $N_4$ 1.00000 | |
| $r_5$ −82.740 | | | |
| | $d_5$ 1.000 | $N_5$ 1.71300 | $\nu_5$ 53.93 |
| $r_6$ 9.729 | | | |
| | $d_6$ 1.700 | $N_6$ 1.00000 | |
| $r_7$ 9.737 | | | |
| | $d_7$ 2.500 | $N_7$ 1.84666 | $\nu_7$ 23.8 |
| $r_8$ 11.429 | | | |
| | $d_8$ 3.100 | $N_8$ 1.00000 | |
| $r_9$ ∞ | | | |
| | $d_9$ 1.500 | $N_9$ 1.00000 | |
| $r_{10}$ 10.873 | | | |
| | $d_{10}$ 3.900 | $N_{10}$ 1.78831 | $\nu_{10}$ 47.32 |
| $r_{11}$ −35.301 | | | |

TABLE 7-continued

Embodiment 7
f = 19.7–10.2    F = 1.44–1.44

| Radius of Curvature | Axial Distance | Refractive Index(Nd) | Abbe Number (νd) |
|---|---|---|---|
| | $d_{11}$ 2.600 | $N_{11}$ 1.00000 | |
| $r_{12}$ −10.552 | | | |
| | $d_{12}$ 4.700 | $N_{12}$ 1.84666 | $\nu_{12}$ 23.8 |
| $r_{13}$ 14.410 | | | |
| | $d_{13}$ 0.900 | $N_{13}$ 1.00000 | |
| $r_{14}$ 106.550 | | | |
| | $d_{14}$ 3.300 | $N_{14}$ 1.77250 | $\nu_{14}$ 49.77 |
| $r_{15}$ −12.358 | | | |
| | $d_{15}$ 0.100 | $N_{15}$ 1.00000 | |
| $r_{16}$ 12.235 | | | |
| | $d_{16}$ 3.900 | $N_{16}$ 1.77250 | $\nu_{16}$ 49.77 |
| $r_{17}$ 123.957 | | | |
| | $d_{17}$ 2.000 | $N_{17}$ 1.00000 | |
| $r_{18}$ ∞ | | | |
| | $d_{18}$ 8.600 | $N_{18}$ 1.51680 | $\nu_{18}$ 64.12 |
| $r_{19}$ ∞ | | | |

$d_4 = 11.414 – 6.279 – 1.000$   $d_8 = 3.100 – 9.601 – 13.062$

TABLE 8

Embodiment 8
f = 21.7–11.2    F = 1.72–1.44

| Radius of Curvature | Axial Distance | Refractive Index(Nd) | Abbe Number (νd) |
|---|---|---|---|
| $r_1$ 27.778 | | | |
| | $d_1$ 1.400 | $N_1$ 1.84666 | $\nu_1$ 23.8 |
| $r_2$ 19.455 | | | |
| | $d_2$ 1.500 | $N_2$ 1.00000 | |
| $r_3$ 25.369 | | | |
| | $d_3$ 3.800 | $N_3$ 1.69680 | $\nu_3$ 56.47 |
| $r_4$ −92.901 | | | |
| | $d_4$ 12.879 | $N_4$ 1.00000 | |
| $r_5$ −69.237 | | | |
| | $d_5$ 1.100 | $N_5$ 1.69680 | $\nu_5$ 56.47 |
| $r_6$ 10.184 | | | |
| | $d_6$ 1.900 | $N_6$ 1.00000 | |
| $r_7$ 10.012 | | | |
| | $d_7$ 2.300 | $N_7$ 1.84666 | $\nu_7$ 23.8 |
| $r_8$ 11.660 | | | |
| | $d_8$ 3.300 | $N_8$ 1.00000 | |
| $r_9$ ∞ | | | |
| | $d_9$ 1.500 | $N_9$ 1.00000 | |
| $r_{10}$ 11.651 | | | |
| | $d_{10}$ 4.300 | $N_{10}$ 1.77250 | $\nu_{10}$ 49.77 |
| $r_{11}$ −34.395 | | | |
| | $d_{11}$ 3.200 | $N_{11}$ 1.00000 | |
| $r_{12}$ −10.200 | | | |
| | $d_{12}$ 6.500 | $N_{12}$ 1.84666 | $\nu_{12}$ 23.8 |
| $r_{13}$ 16.579 | | | |
| | $d_{13}$ 0.800 | $N_{13}$ 1.00000 | |
| $r_{14}$ 86.928 | | | |
| | $d_{14}$ 3.300 | $N_{14}$ 1.77250 | $\nu_{14}$ 49.77 |
| $r_{15}$ −13.784 | | | |
| | $d_{15}$ 0.100 | $N_{15}$ 1.00000 | |
| $r_{16}$ 12.794 | | | |
| | $d_{16}$ 3.900 | $N_{16}$ 1.77250 | $\nu_{16}$ 49.77 |
| $r_{17}$ 154.764 | | | |
| | $d_{17}$ 2.000 | $N_{17}$ 1.00000 | |
| $r_{18}$ ∞ | | | |
| | $d_{18}$ 8.600 | $N_{18}$ 1.51680 | $\nu_{18}$ 64.12 |
| $r_{19}$ ∞ | | | |

$d_4 = 12.879 – 6.587 – 1.000$   $d_8 = 3.300 – 9.815 – 12.801$

TABLE 9

Embodiment 9
f = 10.2–19.8    F = 1.63–1.63

| Radius of Curvature | Axial Distance | Refractive Index(Nd) | Abbe Number (νd) |
|---|---|---|---|
| $r_1$ 26.667 | | | |
| | $d_1$ 1.300 | $N_1$ 1.84666 | $\nu_1$ 23.8 |
| $r_2$ 18.416 | | | |
| | $d_2$ 1.200 | $N_2$ 1.00000 | |
| $r_3$ 21.997 | | | |

TABLE 9-continued

Embodiment 9
f = 10.2–19.8    F = 1.63–1.63

| Radius of Curvature | Axial Distance | Refractive Index(Nd) | Abbe Number (νd) |
|---|---|---|---|
| | $d_3$ 3.800 | $N_3$ 1.71300 | $\nu_3$ 53.9 |
| $r_4$ −123.452 | | | |
| | $d_4$ 11.434 | $N_4$ 1.00000 | |
| $r_5$ −56.919 | | | |
| | $d_5$ 1.000 | $N_5$ 1.71300 | $\nu_5$ 53.9 |
| $r_6$ 9.489 | | | |
| | $d_6$ 1.700 | $N_6$ 1.00000 | |
| $r_7$ 9.877 | | | |
| | $d_7$ 2.300 | $N_7$ 1.84666 | $\nu_7$ 23.8 |
| $r_8$ 12.643 | | | |
| | $d_8$ 2.900 | $N_8$ 1.00000 | |
| $r_9$ ∞ | | | |
| | $d_9$ 1.700 | $N_9$ 1.00000 | |
| $r_{10}$ −44.421 | | | |
| | $d_{10}$ 2.100 | $N_{10}$ 1.77250 | $\nu_{10}$ 49.8 |
| $r_{11}$ −15.558 | | | |
| | $d_{11}$ 0.100 | $N_{11}$ 1.00000 | |
| $r_{12}$ 8.472 | | | |
| | $d_{12}$ 2.700 | $N_{12}$ 1.77250 | $\nu_{12}$ 49.8 |
| $r_{13}$ −222.090 | | | |
| | $d_{13}$ 0.600 | $N_{13}$ 1.00000 | |
| $r_{14}$ −28.988 | | | |
| | $d_{14}$ 4.007 | $N_{14}$ 1.80518 | $\nu_{14}$ 25.4 |
| $r_{15}$ 7.070 | | | |
| | $d_{15}$ 1.280 | $N_{15}$ 1.00000 | |
| $r_{16}$ 17.346 | | | |
| | $d_{16}$ 3.500 | $N_{16}$ 1.78831 | $\nu_{16}$ 47.3 |
| $r_{17}$ −16.442 | | | |
| | $d_{17}$ 2.000 | $N_{17}$ 1.00000 | |
| $r_{18}$ ∞ | | | |
| | $d_{18}$ 8.600 | $N_{18}$ 1.51680 | $\nu_{18}$ 64.1 |
| $r_{19}$ ∞ | | | |

$d_4 = 11.434 – 6.261 – 1.000$   $d_8 = 2.900 – 9.569 – 13.063$

TABLE 10

Embodiment 10
f = 9.2–17.8    F = 1.63–1.70

| Radius of Curvature | Axial Distance | Refractive Index(Nd) | Abbe Number (νd) |
|---|---|---|---|
| $r_1$ 23.051 | | | |
| | $d_1$ 1.200 | $N_1$ 1.80518 | $\nu_1$ 25.4 |
| $r_2$ 15.500 | | | |
| | $d_2$ 1.200 | $N_2$ 1.00000 | |
| $r_3$ 19.468 | | | |
| | $d_3$ 3.800 | $N_3$ 1.69680 | $\nu_3$ 56.5 |
| $r_4$ −89.943 | | | |
| | $d_4$ 10.456 | $N_4$ 1.00000 | |
| $r_5$ −54.506 | | | |
| | $d_5$ 0.900 | $N_5$ 1.69680 | $\nu_5$ 56.5 |
| $r_6$ 7.875 | | | |
| | $d_6$ 1.600 | $N_6$ 1.00000 | |
| $r_7$ 8.642 | | | |
| | $d_7$ 2.300 | $N_7$ 1.80518 | $\nu_7$ 25.4 |
| $r_8$ 11.093 | | | |
| | $d_8$ 2.600 | $N_8$ 1.00000 | |
| $r_9$ ∞ | | | |
| | $d_9$ 1.600 | $N_9$ 1.00000 | |
| $r_{10}$ −45.904 | | | |
| | $d_{10}$ 2.000 | $N_{10}$ 1.77250 | $\nu_{10}$ 49.8 |
| $r_{11}$ −13.741 | | | |
| | $d_{11}$ 0.100 | $N_{11}$ 1.00000 | |
| $r_{12}$ 7.716 | | | |
| | $d_{12}$ 2.700 | $N_{12}$ 1.77250 | $\nu_{12}$ 49.8 |
| $r_{13}$ −143.394 | | | |
| | $d_{13}$ 0.550 | $N_{13}$ 1.00000 | |
| $r_{14}$ −26.296 | | | |
| | $d_{14}$ 2.849 | $N_{14}$ 1.80518 | $\nu_{14}$ 25.4 |
| $r_{15}$ 6.193 | | | |
| | $d_{15}$ 1.200 | $N_{15}$ 1.00000 | |
| $r_{16}$ 15.035 | | | |
| | $d_{16}$ 3.100 | $N_{16}$ 1.78831 | $\nu_{16}$ 47.3 |
| $r_{17}$ −18.193 | | | |
| | $d_{17}$ 1.500 | $N_{17}$ 1.00000 | |
| $r_{18}$ ∞ | | | |
| | $d_{18}$ 8.500 | $N_{18}$ 1.51680 | $\nu_{18}$ 64.1 |

TABLE 10-continued

Embodiment 10 f = 9.2-17.8    F = 1.63-1.70

| Radius of Curvature | Axial Distance | Refractive Index(Nd) | Abbe Number (νd) |
|---|---|---|---|
| $r_{19}$ ∞ | | | |

$d_4 = 10.456-5.567-1.000$    $d_8 = 2.600-8.388-11.182$

TABLE 11

Embodiment 11 f = 9.2-22.2    F = 1.63-1.71

| Radius of Curvature | | Axial Distance | | Refractive Index(Nd) | | Abbe Number (νd) | |
|---|---|---|---|---|---|---|---|
| $r_1$ | 25.974 | | | | | | |
| | | $d_1$ | 1.300 | $N_1$ | 1.84666 | $\nu_1$ | 23.8 |
| $r_2$ | 16.978 | | | | | | |
| | | $d_2$ | 1.200 | $N_2$ | 1.00000 | | |
| $r_3$ | 19.394 | | | | | | |
| | | $d_3$ | 4.900 | $N_3$ | 1.71300 | $\nu_3$ | 53.9 |
| $r_4$ | −119.470 | | | | | | |
| | | $d_4$ | 13.316 | $N_4$ | 1.00000 | | |
| $r_5$ | −85.161 | | | | | | |
| | | $d_5$ | 0.900 | $N_5$ | 1.77250 | $\nu_5$ | 49.8 |
| $r_6$ | 8.127 | | | | | | |
| | | $d_6$ | 1.500 | $N_6$ | 1.00000 | | |
| $r_7$ | 8.753 | | | | | | |
| | | $d_7$ | 2.400 | $N_7$ | 1.84666 | $\nu_7$ | 23.8 |
| $r_8$ | 11.363 | | | | | | |
| | | $d_8$ | 2.700 | $N_8$ | 1.00000 | | |
| $r_9$ | ∞ | | | | | | |
| | | $d_9$ | 1.600 | $N_9$ | 1.00000 | | |
| $r_{10}$ | −84.542 | | | | | | |
| | | $d_{10}$ | 2.300 | $N_{10}$ | 1.77250 | $\nu_{10}$ | 49.8 |
| $r_{11}$ | −16.024 | | | | | | |
| | | $d_{11}$ | 0.100 | $N_{11}$ | 1.00000 | | |
| $r_{12}$ | 8.265 | | | | | | |
| | | $d_{12}$ | 2.900 | $N_{12}$ | 1.77250 | $\nu_{12}$ | 49.8 |
| $r_{13}$ | −273.002 | | | | | | |
| | | $d_{13}$ | 0.400 | $N_{13}$ | 1.00000 | | |
| $r_{14}$ | −38.094 | | | | | | |
| | | $d_{14}$ | 3.500 | $N_{14}$ | 1.80518 | $\nu_{14}$ | 25.4 |
| $r_{15}$ | 6.241 | | | | | | |
| | | $d_{15}$ | 1.000 | $N_{15}$ | 1.00000 | | |
| $r_{16}$ | 13.884 | | | | | | |
| | | $d_{16}$ | 2.900 | $N_{16}$ | 1.78831 | $\nu_{16}$ | 47.3 |
| $r_{17}$ | −27.012 | | | | | | |
| | | $d_{17}$ | 1.500 | $N_{17}$ | 1.00000 | | |
| $r_{18}$ | ∞ | | | | | | |
| | | $d_{18}$ | 8.500 | $N_{18}$ | 1.51680 | $\nu_{18}$ | 64.1 |
| $r_{19}$ | ∞ | | | | | | |

$d_4 = 13.316-8.211-1.000$    $d_8 = 2.700-9.666-13.743$

TABLE 12

Embodiment 12 f = 9.2−17.8    F = 1.52−1.61

| Radius Curvature | | Axial Distance | | Refractive Index (Nd) | | Abbe Number (νd) | |
|---|---|---|---|---|---|---|---|
| $r_1$ | 25.886 | $d_1$ | 1.200 | $N_1$ | 1.80518 | $\nu_1$ | 25.4 |
| $r_2$ | 16.437 | $d_2$ | 1.550 | $N_2$ | 1.00000 | | |
| $r_3$ | 19.397 | $d_3$ | 3.800 | $N_3$ | 1.69680 | $\nu_3$ | 56.5 |
| $r_4$ | −99.352 | $d_4$ | 11.688 | $N_4$ | 1.00000 | | |
| $r_5$ | −43.601 | $d_5$ | 0.900 | $N_5$ | 1.69680 | $\nu_5$ | 56.5 |
| $r_6$ | 7.705 | $d_6$ | 1.400 | $N_6$ | 1.00000 | | |
| $r_7$ | 8.550 | $d_7$ | 2.500 | $N_7$ | 1.80518 | $\nu_7$ | 25.4 |
| $r_8$ | 11.690 | $d_8$ | 2.600 | $N_8$ | 1.00000 | | |
| $r_9$ | ∞ | $d_9$ | 1.600 | $N_9$ | 1.00000 | | |
| $r_{10}$ | −39.214 | $d_{10}$ | 2.100 | $N_{10}$ | 1.77250 | $\nu_{10}$ | 49.8 |
| $r_{11}$ | −13.591 | $d_{11}$ | 0.100 | $N_{11}$ | 1.00000 | | |
| $r_{12}$ | 8.543 | $d_{12}$ | 2.800 | $N_{12}$ | 1.77250 | $\nu_{12}$ | 49.8 |
| $r_{13}$ | −38.610 | $d_{13}$ | 0.700 | $N_{13}$ | 1.00000 | | |
| $r_{14}$ | −17.753 | $d_{14}$ | 3.400 | $N_{14}$ | 1.80518 | $\nu_{14}$ | 25.4 |
| $r_{15}$ | 7.121 | $d_{15}$ | 0.900 | $N_{15}$ | 1.00000 | | |
| $r_{16}$ | 17.264 | $d_{16}$ | 3.100 | $N_{16}$ | 1.78831 | $\nu_{16}$ | 47.3 |
| $r_{17}$ | −15.192 | $d_{17}$ | 1.500 | $N_{17}$ | 1.00000 | | |
| $r_{18}$ | ∞ | $d_{18}$ | 8.500 | $N_{18}$ | 1.51680 | $\nu_{18}$ | 64.1 |
| $r_{19}$ | ∞ | | | | | | |

TABLE 12-continued

Embodiment 12 f = 9.2−17.8    F = 1.52−1.61

$d_4 = 11.688 − 6.162 − 1.000$    $d_8 = 2.600 − 7.321 − 9.599$

TABLE 13

Embodiment 13 f = 9.2 − 17.8    F = 1.52 − 1.65

| Radius of Curvature | | Axial Distance | | Refractive Index (Nd) | | Abbe Number (νd) | |
|---|---|---|---|---|---|---|---|
| $r_1$ | 25.886 | $d_1$ | 1.200 | $N_1$ | 1.80518 | $\nu_1$ | 25.4 |
| $r_2$ | 16.437 | $d_2$ | 1.550 | $N_2$ | 1.00000 | | |
| $r_3$ | 20.247 | $d_3$ | 3.800 | $N_3$ | 1.69680 | $\nu_3$ | 56.5 |
| $r_4$ | −81.416 | $d_4$ | 11.726 | $N_4$ | 1.00000 | | |
| $r_5$ | −47.194 | $d_5$ | 0.900 | $N_5$ | 1.69680 | $\nu_5$ | 56.5 |
| $r_6$ | 7.676 | $d_6$ | 1.400 | $N_6$ | 1.00000 | | |
| $r_7$ | 8.472 | $d_7$ | 2.500 | $N_7$ | 1.80518 | $\nu_7$ | 25.4 |
| $r_8$ | 11.395 | $d_8$ | 2.600 | $N_8$ | 1.00000 | | |
| $r_9$ | ∞ | $d_9$ | 1.600 | $N_9$ | 1.00000 | | |
| $r_{10}$ | −42.162 | $d_{10}$ | 2.200 | $N_{10}$ | 1.77250 | $\nu_{10}$ | 49.8 |
| $r_{11}$ | −13.321 | $d_{11}$ | 0.100 | $N_{11}$ | 1.00000 | | |
| $r_{12}$ | 8.173 | $d_{12}$ | 2.800 | $N_{12}$ | 1.77250 | $\nu_{12}$ | 49.8 |
| $r_{13}$ | −78.403 | $d_{13}$ | 0.600 | $N_{13}$ | 1.00000 | | |
| $r_{14}$ | −23.791 | $d_{14}$ | 3.400 | $N_{14}$ | 1.80518 | $\nu_{14}$ | 25.4 |
| $r_{15}$ | 6.337 | $d_{15}$ | 2.100 | $N_{15}$ | 1.00000 | | |
| $r_{16}$ | 14.630 | $d_{16}$ | 3.100 | $N_{16}$ | 1.78831 | $\nu_{16}$ | 47.3 |
| $r_{17}$ | −15.984 | $d_{17}$ | 1.500 | $N_{17}$ | 1.00000 | | |
| $r_{18}$ | ∞ | $d_{18}$ | 1.500 | | | | |
| $r_{19}$ | ∞ | | | | | | |

$d_4 = 11.726 − 6.180 − 1.000$    $d_8 = 2.600 − 7.304 − 9.574$

TABLE 14

Embodiment 14 f = 10.2 − 19.8    F = 1.63 − 1.65

| Radius of Curvature | | Axial Distance | | Refractive Index (Nd) | | Abbe Number (νd) | |
|---|---|---|---|---|---|---|---|
| $r_1$ | 26.316 | $r_1$ | 1.300 | $N_1$ | 1.84666 | $\nu_1$ | 23.8 |
| $r_2$ | 18.182 | $d_2$ | 1.200 | $N_2$ | 1.00000 | | |
| $r_3$ | 20.063 | $d_3$ | 3.900 | $N_3$ | 1.71300 | $\nu_3$ | 53.9 |
| $r_4$ | −225.240 | $d_4$ | 10.792 | $N_4$ | 1.00000 | | |
| $r_5$ | −97.351 | $d_5$ | 0.900 | $N_5$ | 1.71300 | $\nu_5$ | 53.9 |
| $r_6$ | 8.911 | $d_6$ | 1.500 | $N_6$ | 1.00000 | | |
| $r_7$ | 9.466 | $d_7$ | 2.200 | $N_7$ | 1.84666 | $\nu_7$ | 23.8 |
| $r_8$ | 12.066 | $d_8$ | 2.700 | $N_8$ | 1.00000 | | |
| $r_9$ | ∞ | $d_9$ | 2.000 | $N_9$ | 1.00000 | | |
| $r_{10}$ | −56.792 | $d_{10}$ | 2.200 | $N_{10}$ | 1.77250 | $\nu_{10}$ | 49.8 |
| $r_{11}$ | −16.301 | $d_{11}$ | 0.100 | $N_{11}$ | 1.00000 | | |
| $r_{12}$ | 8.548 | $d_{12}$ | 2.600 | $N_{12}$ | 1.77250 | $\nu_{12}$ | 49.8 |
| $r_{13}$ | −2584.881 | $d_{13}$ | 0.500 | $N_{13}$ | 1.00000 | | |
| $r_{14}$ | −32.555 | $d_{14}$ | 2.600 | $N_{14}$ | 1.80518 | $\nu_{14}$ | 25.4 |
| $r_{15}$ | 7.337 | $d_{15}$ | 1.500 | $N_{15}$ | 1.00000 | | |
| $r_{16}$ | 20.249 | $d_{16}$ | 3.600 | $N_{16}$ | 1.78831 | $\nu_{16}$ | 47.3 |
| $r_{17}$ | −16.112 | $d_{17}$ | 2.000 | $N_{17}$ | 1.00000 | | |
| $r_{18}$ | ∞ | $d_{18}$ | 8.600 | $N_{18}$ | 1.51680 | $\nu_{18}$ | 64.1 |
| $r_{19}$ | ∞ | | | | | | |

$d_4 = 0.792 − 5.937 − 1.000$    $d_8 = 2.700 − 10.029 − 13.867$

TABLE 15

Embodiment 15 f = 12.3 − 25.0    F = 1.63 − 1.63

| Radius of Curvature | | Axial Distance | | Refractive Index (Nd) | | Abbe Number (νd) | |
|---|---|---|---|---|---|---|---|
| $r_1$ | 37.410 | $d_1$ | 1.300 | $N_1$ | 1.80518 | $\nu_1$ | 25.4 |
| $r_2$ | 20.361 | $d_2$ | 3.800 | $N_2$ | 1.69100 | $\nu_2$ | 54.8 |
| $r_3$ | −218.664 | $d_3$ | 15.027 | $N_3$ | 1.00000 | | |
| $r_4$ | −39.715 | $d_4$ | 1.000 | $N_4$ | 1.69750 | $\nu_4$ | 48.3 |
| $r_5$ | 8.436 | $d_5$ | 2.900 | $N_5$ | 1.8.518 | $\nu_5$ | 25.4 |
| $r_6$ | 18.078 | $d_6$ | 2.900 | $N_6$ | 1.00000 | | |
| $r_7$ | ∞ | $d_7$ | 1.500 | $N_7$ | 1.00000 | | |
| $r_8$ | 94.840 | $d_8$ | 2.100 | $N_8$ | 1.77250 | $\nu_8$ | 49.8 |
| $r_9$ | −27.214 | $d_9$ | 0.100 | $N_9$ | 1.00000 | | |

TABLE 15-continued

Embodiment 15 f = 12.3 − 25.0    F = 1.63 − 1.63

| Radius of Curvature | Axial Distance | Refractive Index (Nd) | Abbe Number (νd) |
|---|---|---|---|
| $r_{10}$ 9.372 | $d_{10}$ 2.900 | $N_{10}$ 1.77250 | $\nu_{10}$ 49.8 |
| $r_{11}$ 956.700 | $d_{11}$ 0.500 | $N_{11}$ 1.00000 | |
| $r_{12}$ −42.350 | $d_{12}$ 3.900 | $N_{12}$ 1.80518 | $\nu_{12}$ 25.4 |
| $r_{13}$ 7.258 | $d_{13}$ 1.400 | $N_{13}$ 1.00000 | |
| $r_{14}$ 39.904 | $d_{14}$ 3.400 | $N_{14}$ 1.78831 | $\nu_{14}$ 47.3 |
| $r_{15}$ −14.918 | $d_{15}$ 2.000 | $N_{15}$ 1.00000 | |
| $r_{16}$ ∞ | $d_{16}$ 8.600 | $N_{16}$ 1.51680 | $\nu_{16}$ 64.1 |
| $r_{17}$ ∞ | | | |

$d_3 = 15.027 − 8.862 − 1.500$   $d_6 = 2.900 − 12.670 − 18.410$

TABLE 16

Embodiment 16 f = 8.2 − 15.8    F = 1.63 − 1.63

| Radius of Curvature | Axial Distance | Refractive Index (Nd) | Abbe Number (νd) |
|---|---|---|---|
| $r_1$ 21.053 | $d_1$ 1.200 | $N_1$ 1.84666 | $\nu_1$ 23.8 |
| $r_2$ 14.706 | $d_2$ 1.200 | $N_2$ 1.00000 | |
| $r_3$ 17.065 | $d_3$ 4.400 | $N_3$ 1.71300 | $\nu_3$ 53.9 |
| $r_4$ −102.184 | $d_4$ 8.420 | $N_4$ 1.00000 | |
| $r_5$ −111.124 | $d_5$ 0.900 | $N_5$ 1.71300 | $\nu_5$ 53.9 |
| $r_6$ 6.982 | $d_6$ 1.500 | $N_6$ 1.00000 | |
| $r_7$ 6.976 | $d_7$ 2.000 | $N_7$ 1.84600 | $\nu_7$ 23.8 |
| $r_8$ 7.805 | $d_8$ 2.500 | $N_8$ 1.00000 | |
| $r_9$ ∞ | $d_9$ 1.600 | $N_9$ 1.00000 | |
| $r_{10}$ 8.831 | $d_{10}$ 3.000 | $N_{10}$ 1.78831 | $\nu_{10}$ 47.3 |
| $r_{11}$ −27.694 | $d_{11}$ 1.900 | $N_{11}$ 1.00000 | |
| $r_{12}$ −8.498 | $d_{12}$ 2.700 | $N_{12}$ 1.84666 | $\nu_{12}$ 23.8 |
| $r_{13}$ 12.290 | $d_{13}$ 0.700 | $N_{13}$ 1.00000 | |
| $r_{14}$ −1269.454 | $d_{14}$ 3.000 | $N_{14}$ 1.78831 | $\nu_{14}$ 47.3 |
| $r_{15}$ −9.120 | $d_{15}$ 0.100 | $N_{15}$ 1.00000 | |
| $r_{16}$ 10.662 | $d_{16}$ 3.100 | $N_{16}$ 1.78831 | $\nu_{16}$ 47.3 |
| $r_{17}$ 86.436 | $d_{17}$ 2.000 | $N_{17}$ 1.00000 | |
| $r_{18}$ ∞ | $d_{18}$ 8.600 | $N_{18}$ 1.51680 | $\nu_{18}$ 64.1 |
| $r_{19}$ ∞ | | | |

$d_4 = 8.420 − 4.386 − 1.000$   $d_8 = 2.500 − 6.534 − 9.919$
$d_9 = 1.600 − 1.417 − 1.602$   $d_{17} = 2.000 − 2.183 − 1.998$

TABLE 17

Embodiment 17 f = 8.2 − 15.8    F = 1.44 − 1.52

| Radius of Curvature | Axial Distance | Refractive Index (Nd) | Abbe Number |
|---|---|---|---|
| $r_1$ 21.865 | $d_1$ 1.200 | $N_1$ 1.84666 | $\nu_1$ 23.8 |
| $r_2$ 15.309 | $d_2$ 1.200 | $N_2$ 1.00000 | |
| $r_3$ 18.469 | $d_3$ 4.600 | $N_3$ 1.71300 | $\nu_4$ 53.9 |
| $r_4$ −87.899 | $d_4$ 8.663 | $N_4$ 1.00000 | |
| $r_5$ −96.202 | $d_5$ 0.900 | $N_5$ 1.71300 | $\nu_5$ 53.9 |
| $r_6$ 7.610 | $d_6$ 1.800 | $N_6$ 1.00000 | |
| $r_7$ 7.573 | $d_7$ 2.300 | $N_7$ 1.84666 | $\nu_7$ 23.8 |
| $r_8$ 8.174 | $d_8$ 2.600 | $N_8$ 1.00000 | |
| $r_9$ ∞ | $d_9$ 1.600 | $N_9$ 1.00000 | |
| $r_{10}$ 9.203 | $d_{10}$ 3.200 | $N_{10}$ 1.77250 | $\nu_{10}$ 49.8 |
| $r_{11}$ −30.213 | $d_{11}$ 2.000 | $N_{11}$ 1.00000 | |
| $r_{12}$ −9.498 | $d_{12}$ 2.900 | $N_{12}$ 1.84666 | $\nu_{12}$ 23.8 |
| $r_{13}$ 11.899 | $d_{13}$ 0.900 | $N_{13}$ 1.00000 | |
| $r_{14}$ 155.257 | $d_{14}$ 3.400 | $N_{14}$ 1.77250 | $\nu_{14}$ 49.8 |
| $r_{15}$ −10.430 | $d_{15}$ 0.100 | $N_{15}$ 1.00000 | |
| $r_{16}$ 11.492 | $d_{16}$ 4.200 | $N_{16}$ 1.77250 | $\nu_{16}$ 49.8 |
| $r_{17}$ −188.336 | $d_{17}$ 2.000 | $N_{17}$ 1.00000 | |
| $r_{18}$ ∞ | $d_{17}$ 2.000 | | |
| $r_{19}$ ∞ | | | |

$d_4 = 8.663 − 4.533 − 1.000$   $d_8 = 2.600 − 6.730 − 10.263$
$d_9 = 1.600 − 1.498 − 1.718$   $d_{17} = 2.000 − 2.102 − 1.882$

TABLE 18

Embodiment 18 f = 9.2 − 17.8    F = 1.44 − 1.69

| Radius of Curvature | Axial Distance | Refractive Index (Nd) | Abbe Number (νd) |
|---|---|---|---|
| $r_1$ 22.523 | $d_1$ 1.300 | $N_1$ 1.84666 | $\nu_1$ 23.8 |
| $r_2$ 16.313 | $d_2$ 1.400 | $N_2$ 1.00000 | |
| $r_3$ 22.834 | $d_3$ 4.000 | $N_3$ 1.71300 | $\nu_3$ 53.9 |
| $r_4$ −73.034 | $d_4$ 9.639 | $N_4$ 1.00000 | |
| $r_5$ −74.054 | $d_5$ 1.000 | $N_5$ 1.71300 | $\nu_5$ 53.9 |
| $r_6$ 8.398 | $d_6$ 1.900 | $N_6$ 1.00000 | |
| $r_7$ 8.527 | $d_7$ 2.200 | $N_7$ 1.84666 | $\nu_7$ 23.8 |
| $r_8$ 9.738 | $d_8$ 2.700 | $N_8$ 1.00000 | |
| $r_9$ ∞ | $d_9$ 1.500 | $N_9$ 1.00000 | |
| $r_{10}$ 10.039 | $d_{10}$ 3.800 | $N_{10}$ 1.78831 | $\nu_{10}$ 47.3 |
| $r_{11}$ −27.952 | $d_{11}$ 1.700 | $N_{11}$ 1.00000 | |
| $r_{12}$ −11.342 | $d_{12}$ 3.100 | $N_{12}$ 1.84666 | $\nu_{12}$ 23.8 |
| $r_{13}$ 11.656 | $d_{13}$ 0.900 | $N_{13}$ 1.00000 | |
| $r_{14}$ 103.090 | $d_{14}$ 2.800 | $N_{14}$ 1.78831 | $\nu_{14}$ 47.3 |
| $r_{15}$ −13.056 | $d_{15}$ 0.100 | $N_{15}$ 1.00000 | |
| $r_{16}$ 12.383 | $d_{16}$ 3.700 | $N_{16}$ 1.77250 | $\nu_{16}$ 49.8 |
| $r_{17}$ −1026.032 | $d_{17}$ 2.000 | $N_{17}$ 1.00000 | |
| $r_{18}$ ∞ | $d_{18}$ 8.600 | $N_{18}$ 1.51680 | $\nu_{18}$ 64.1 |
| $r_{19}$ ∞ | | | |

$d_4 = 8.639 − 4.560 − 1.000$   $d_8 = 2.700 − 7.779 − 11.339$
$d_9 = 1.500 − 1.581 − 1.905$   $d_{17} = 2.000 − 1.919 − 1.595$

TABLE 19

Embodiment 19 f = 9.2 − 17.8    F = 1.61 − 1.74

| Radius of Curvature | Axial Distance | Refractive Index (Nd) | Abbe Number (νd) |
|---|---|---|---|
| $r_1$ 23.810 | $d_1$ 1.200 | 1.80518 | $\nu_1$ 25.4 |
| $r_2$ 16.129 | $d_2$ 1.300 | $N_2$ 1.00000 | |
| $r_3$ 22.297 | $d_3$ 3.800 | $N_3$ 1.71300 | $\nu_3$ 53.9 |
| $r_4$ −65.151 | $d_4$ 9.466 | $N_4$ 1.00000 | |
| $r_5$ −57.191 | $d_5$ 1.000 | $N_5$ 1.71300 | $\nu_5$ 53.9 |
| $r_6$ 8.421 | $d_6$ 1.800 | $N_6$ 1.00000 | |
| $r_7$ 8.465 | $d_7$ 2.200 | $N_7$ 1.84666 | $\nu_7$ 23.8 |
| $r_8$ 9.830 | $d_8$ 2.600 | $N_8$ 1.00000 | |
| $r_9$ ∞ | $d_9$ 1.500 | $N_9$ 1.00000 | |
| $r_{10}$ 9.231 | $d_{10}$ 3.600 | $N_{10}$ 1.77250 | $\nu_{10}$ 49.8 |
| $r_{11}$ −26.549 | $d_{11}$ 1.900 | $N_{11}$ 1.00000 | |
| $r_{12}$ −9.520 | $d_{12}$ 2.800 | $N_{12}$ 1.80518 | $\nu_{12}$ 25.4 |
| $r_{13}$ 11.086 | $d_{13}$ 0.900 | $N_{13}$ 1.00000 | |
| $r_{14}$ 158.556 | $d_{14}$ 2.700 | $N_{14}$ 1.77250 | $\nu_{14}$ 49.8 |
| $r_{15}$ −12.130 | $d_{15}$ 0.100 | $N_{15}$ 1.00000 | |
| $r_{16}$ 12.569 | $d_{16}$ 3.400 | $N_{16}$ 1.77250 | $\nu_{16}$ 49.8 |
| $r_{17}$ −567.082 | $d_{17}$ 2.000 | $N_{17}$ 1.00000 | |
| $r_{18}$ ∞ | $d_{18}$ 8.600 | $N_{18}$ 1.51680 | $\nu_{18}$ 64.1 |
| $r_{19}$ ∞ | | | |

$d_4 = 9.466 − 4.498 − 1.000$   $d_8 = 2.600 − 7.569 − 11.067$
$d_9 = 1.500 − 1.721 − 2.110$   $d_{17} = 2.000 − 1.779 − 1.390$

TABLE 20

Embodiment 20 f = 9.2 − 20.3    F = 1.61 − 1.75

| Radius of Curvature | Axial Distance | Refractive Index (Nd) | Abbe Number (νd) |
|---|---|---|---|
| $r_1$ 25.598 | $d_1$ 1.200 | $N_1$ 1.80518 | $\nu_1$ 25.4 |
| $r_2$ 16.831 | $d_2$ 1.100 | $N_2$ 1.00000 | |
| $r_3$ 21.347 | $d_3$ 4.200 | $N_3$ 1.71300 | $\nu_3$ 53.9 |
| $r_4$ −73.662 | $d_4$ 11.334 | $N_4$ 1.00000 | |
| $r_5$ −60.811 | $d_5$ 1.000 | $N_5$ 1.71300 | $\nu_5$ 53.9 |
| $r_6$ 8.651 | $d_6$ 1.900 | $N_6$ 1.00000 | |
| $r_7$ 8.457 | $d_7$ 2.200 | $N_7$ 1.84666 | $\nu_7$ 23.8 |
| $r_8$ 9.546 | $d_8$ 2.600 | $N_8$ 1.00000 | |
| $r_9$ ∞ | $d_9$ 1.500 | $N_9$ 1.00000 | |
| $r_{10}$ 9.944 | $d_{10}$ 3.900 | $N_{10}$ 1.78831 | $\nu_{10}$ 47.3 |
| $r_{11}$ −23.192 | $d_{11}$ 1.600 | $N_{11}$ 1.00000 | |
| $r_{12}$ −10.234 | $d_{12}$ 4.000 | $N_{12}$ 1.80518 | $\nu_{12}$ 25.4 |
| $r_{13}$ 11.457 | $d_{13}$ 0.900 | $N_{13}$ 1.00000 | |
| $r_{14}$ 70.576 | $d_{14}$ 2.700 | $N_{14}$ 1.77250 | $\nu_{14}$ 49.8 |
| $r_{15}$ −13.770 | $d_{15}$ 0.100 | $N_{15}$ 1.00000 | |
| $r_{16}$ 12.779 | $d_{16}$ 3.300 | $N_{16}$ 1.77250 | $\nu_{16}$ 49.8 |
| $r_{17}$ 231.473 | $d_{17}$ 2.000 | $N_{17}$ 1.00000 | |

TABLE 20-continued

Embodiment 20 f = 9.2 − 20.3    F = 1.61 − 1.75

| Radius of Curvature | Axial Distance | Refractive Index (Nd) | Abbe Number (νd) |
|---|---|---|---|
| $r_{18}$ ∞ | $d_{18}$ 8.600 | $N_{18}$ 1.51680 | $ν_{18}$ 64.1 |
| $r_{19}$ ∞ | | | |

$d_4 = 11.334 - 5.601 - 1.000$
$d_8 = 2.600 - 8.33 - 12.934$
$d_9 = 1.500 - 1.415 - 1.866$
$d_{17} = 2.000 - 2.085 - 1.634$

TABLE 21

Embodiment 21 f = 8.2 − 15.8    F = 1.63 − 1.63

| Radius of Curvature | Axial Distance | Refractive Index (Nd) | Abbe Number (νd) |
|---|---|---|---|
| $r_1$ 21.317 | $d_1$ 1.200 | $N_1$ 1.84666 | $ν_1$ 23.8 |
| $r_2$ 14.351 | $d_2$ 1.200 | $N_2$ 1.00000 | |
| $r_3$ 16.766 | $d_3$ 4.500 | $N_3$ 1.71300 | $ν_3$ 53.9 |
| $r_4$ −90.680 | $d_4$ 8.398 | $N_4$ 1.00000 | |
| $r_5$ −80.837 | $d_5$ 0.900 | $N_5$ 1.71300 | $ν_5$ 53.9 |
| $r_6$ 6.961 | $d_6$ 1.500 | $N_6$ 1.00000 | |
| $r_7$ 7.082 | $d_7$ 2.000 | $N_7$ 1.84666 | $ν_7$ 23.8 |
| $r_8$ 8.120 | $d_8$ 2.500 | $N_8$ 1.00000 | |
| $r_9$ ∞ | $d_9$ 1.600 | $N_9$ 1.00000 | |
| $r_{10}$ 8.607 | $d_{10}$ 3.00 | $N_{10}$ 1.78831 | $ν_{10}$ 47.3 |
| $r_{11}$ −19.673 | $d_{11}$ 1.900 | $N_{11}$ 1.84666 | $ν_{12}$ 23.8 |
| $r_{13}$ 12.548 | $d_{13}$ 0.700 | $N_{13}$ 1.00000 | |
| $r_{14}$ −159.427 | $d_{14}$ 3.100 | $N_{14}$ 1.78831 | $ν_{14}$ 47.3 |
| $r_{15}$ −9.046 | $d_{15}$ 0.100 | $N_{15}$ 1.00000 | |
| $r_{16}$ 11.398 | $d_{16}$ 3.000 | $N_{16}$ 1.78831 | $ν_{16}$ 47.3 |
| $r_{17}$ 240.408 | $d_{17}$ 2.000 | $N_{17}$ 1.00000 | |
| $r_{18}$ ∞ | $d_{18}$ 8.600 | $N_{18}$ 1.51680 | $ν_{18}$ 64.1 |
| $r_{19}$ ∞ | | | |

$d_4 = 8.398 - 4.383 - 1.000$
$d_8 = 2.500 - 6.515 - 9.898$
$d_9 = 1.600 - 1.495 - 1.727$
$d_{17} = 2.000 - 2.105 - 1.873$

TABLE 22

Embodiment 22 f = 10.2 − 19.8    F = 1.63 − 1.75

| Radius of Curvature | Axial Distance | Refractive Index (Nd) | Abbe Number (νd) |
|---|---|---|---|
| $r_1$ 26.786 | $d_1$ 1.300 | $N_1$ 1.84666 | $ν_1$ 23.8 |
| $r_2$ 17.279 | $d_2$ 1.200 | $N_2$ 1.00000 | |
| $r_3$ 20.612 | $d_3$ 3.900 | $N_3$ 1.71300 | $ν_3$ 53.9 |
| $r_4$ −108.133 | $d_4$ 11.089 | $N_4$ 1.00000 | |
| $r_5$ −49.914 | $d_5$ 1.000 | $N_5$ 1.71300 | $ν_5$ 53.9 |
| $r_6$ 9.569 | $d_6$ 1.700 | $N_6$ 1.00000 | |
| $r_7$ 9.914 | $d_7$ 2.300 | $N_7$ 1.84666 | $ν_7$ 23.8 |
| $r_8$ 12.779 | $d_8$ 2.900 | $N_8$ 1.00000 | |
| $r_9$ ∞ | $d_9$ 1.600 | $N_9$ 1.00000 | |
| $r_{10}$ −62.323 | $d_{10}$ 1.900 | $N_{10}$ 1.77250 | $ν_{10}$ 49.8 |
| $r_{11}$ −15.759 | $d_{11}$ 0.100 | $N_{11}$ 1.00000 | |
| $r_{12}$ 8.558 | $d_{12}$ 2.700 | $N_{12}$ 1.77250 | $ν_{12}$ 49.8 |
| $r_{13}$ −242.796 | $d_{13}$ 4.000 | $N_{13}$ 1.00000 | |
| $r_{14}$ −31.879 | $d_{14}$ 4.0000 | $N_{14}$ 1.80518 | $ν_{14}$ 25.4 |
| $r_{15}$ 6.669 | $d_{15}$ 1.200 | $N_{15}$ 1.00000 | |
| $r_{16}$ 16.482 | $d_{16}$ 2.894 | $N_{16}$ 1.78831 | $ν_{16}$ 47.3 |
| $r_{17}$ −21.289 | $d_{17}$ 2.000 | $N_{17}$ 1.00000 | |
| $r_{18}$ ∞ | $d_{18}$ 8.600 | $N_{18}$ 1.51680 | $ν_{18}$ 64.1 |
| $r_{19}$ ∞ | | | |

$d_4 = 11.089 - 5.237 - 1.000$
$d_8 = 2.900 - 8.751 - 12.989$
$d_9 = 1.600 - 1.516 - 1.807$
$d_{17} = 2.000 - 2.084 - 1.793$

TABLE 23

Embodiment 23 f = 10.2 − 19.8    F = 1.53 − 1.53

| Radius of Curvature | Axial Distance | Refractive Index (Nd) | Abbe Number (νd) |
|---|---|---|---|
| $r_1$ 26.737 | | | |
| | $d_1$ 1.300 | $N_1$ 1.84666 | $ν_1$ 23.8 |
| $r_2$ 17.165 | | | |
| | $d_2$ 1.300 | $N_2$ 1.00000 | |
| $r_3$ 19.729 | | | |
| | $d_3$ 3.950 | $N_3$ 1.71300 | $ν_3$ 53.9 |
| $r_4$ −129.683 | | | |
| | $d_4$ 11.007 | $N_4$ 1.00000 | |
| $r_5$ −57.733 | | | |
| | $d_5$ 1.000 | $N_5$ 1.71300 | $ν_5$ 53.9 |
| $r_6$ 9.296 | | | |
| | $d_6$ 1.700 | $N_6$ 1.00000 | |
| $r_7$ 9.837 | | | |
| | $d_7$ 2.400 | $N_7$ 1.84666 | $ν_7$ 23.8 |
| $r_8$ 12.555 | | | |
| | $d_8$ 2.800 | $N_8$ 1.00000 | |
| $r_9$ ∞ | | | |
| | $d_9$ 1.600 | $N_9$ 1.00000 | |
| $r_{10}$ −75.036 | | | |
| | $d_{10}$ 2.100 | $N_{10}$ 1.77250 | $ν_{10}$ 49.8 |
| $r_{11}$ −16.680 | | | |
| | $d_{11}$ 0.100 | $N_{11}$ 1.00000 | |
| $r_{12}$ 8.824 | | | |
| | $d_{12}$ 2.900 | $N_{12}$ 1.77250 | $ν_{12}$ 49.8 |
| $r_{13}$ −142.727 | | | |
| | $d_{13}$ 0.500 | $N_{13}$ 1.00000 | |
| $r_{14}$ −31.305 | | | |
| | $d_{14}$ 3.900 | $N_{14}$ 1.80518 | $ν_{14}$ 25.4 |
| $r_{15}$ 6.935 | | | |
| | $d_{15}$ 1.100 | $N_{15}$ 1.00000 | |
| $r_{16}$ 17.800 | | | |
| | $d_{16}$ 2.800 | $N_{16}$ 1.78831 | $ν_{16}$ 47.3 |
| $r_{17}$ −19.209 | | | |
| | $d_{17}$ 2.000 | $N_{17}$ 1.00000 | |
| $r_{18}$ ∞ | | | |
| | $d_{18}$ 8.600 | $N_{18}$ 1.51680 | $ν_{18}$ 64.1 |
| $r_{19}$ ∞ | | | |

$d_4 = 11.007 - 5.196 - 1.000$
$d_8 = 2.800 - 8.611 - 12.807$
$d_9 = 1.600 - 1.477 - 1.753$
$d_{17} = 2.000 - 2.123 - 1.847$

TABLE 24

Embodiment 24 f = 9.2 − 17.8    F = 1.53 − 1.53

| Radius of Curvature | Axial Distance | Refractive Index (Nd) | Abbe Number (νd) |
|---|---|---|---|
| $r_1$ 25.189 | | | |
| | $d_1$ 1.200 | $N_1$ 1.80518 | $ν_1$ 25.4 |
| $r_2$ 15.504 | | | |
| | $d_2$ 1.200 | $N_2$ 1.00000 | |
| $r_3$ 18.067 | | | |
| | $d_3$ 3.900 | $N_3$ 1.71300 | $ν_3$ 53.9 |
| $r_4$ −91.379 | | | |
| | $d_4$ 10.000 | $N_4$ 1.00000 | |
| $r_5$ −51.627 | | | |
| | $d_5$ 0.900 | $N_5$ 1.71300 | $ν_5$ 53.9 |
| $r_6$ 8.454 | | | |
| | $d_6$ 1.600 | $N_6$ 1.00000 | |
| $r_7$ 8.991 | | | |
| | $d_7$ 2.200 | $N_7$ 1.84666 | $ν_7$ 25.4 |
| $r_8$ 11.387 | | | |
| | $d_8$ 2.700 | $N_8$ 1.00000 | |
| $r_9$ ∞ | | | |
| | $d_9$ 1.500 | $N_9$ 1.00000 | |
| $r_{10}$ −77.501 | | | |
| | $d_{10}$ 2.000 | $N_{10}$ 1.77250 | $ν_{10}$ 49.8 |
| $r_{11}$ −15.466 | | | |
| | $d_{11}$ 0.100 | $N_{11}$ 1.00000 | |
| $r_{12}$ 8.071 | | | |
| | $d_{12}$ 2.700 | $N_{12}$ 1.77250 | $ν_{12}$ 49.8 |
| $r_{13}$ −100.462 | | | |
| | $d_{13}$ 0.400 | $N_{13}$ 1.00000 | |
| $r_{14}$ −28.780 | | | |
| | $d_{14}$ 3.200 | $N_{14}$ 1.80518 | $ν_{14}$ 25.4 |
| $r_{15}$ 6.382 | | | |
| | $d_{15}$ 1.050 | $N_{15}$ 1.00000 | |
| $r_{16}$ 16.154 | | | |
| | $d_{16}$ 2.700 | $N_{16}$ 1.78831 | $ν_{16}$ 47.3 |
| $r_{17}$ −17.880 | | | |

TABLE 24-continued

Embodiment 24
f = 9.2 — 17.8    F = 1.53 — 1.53

| Radius of Curvature | Axial Distance | Refractive Index (Nd) | Abbe Number (νd) |
|---|---|---|---|
| | $d_{17}$ 1.500 | $N_{17}$ 1.00000 | |
| $r_{18}$ ∞ | | | |
| | $d_{18}$ 8.500 | $N_{18}$ 1.51680 | $\nu_{18}$ 64.1 |
| $r_{19}$ ∞ | | | |

$d_4 = 10.007 - 5.129 - 1.000$
$d_8 = 2.700 - 7.570 - 11.700$
$d_9 = 1.500 - 1.274 - 1.489$
$d_{17} = 1.500 - 1.726 - 1.511$

TABLE 25

Embodiment 25
f = 10.2 — 24.7    F = 1.61 — 1.61

| Radius of Curvature | Axial Distance | Refractive Index (Nd) | Abbe Number (νd) |
|---|---|---|---|
| $r_1$ 26.712 | | | |
| | $d_1$ 1.300 | $N_1$ 1.84666 | $\nu_1$ 23.8 |
| $r_2$ 17.301 | | | |
| | $d_2$ 1.300 | $N_2$ 1.00000 | |
| $r_3$ 18.791 | | | |
| | $d_3$ 3.950 | $N_3$ 1.71300 | $\nu_3$ 53.9 |
| $r_4$ −236.859 | | | |
| | $d_4$ 14.241 | $N_4$ 1.00000 | |
| $r_5$ −59.993 | | | |
| | $d_5$ 1.000 | $N_5$ 1.71300 | $\nu_5$ 53.9 |
| $r_6$ 9.509 | | | |
| | $d_6$ 1.700 | $N_6$ 1.00000 | |
| $r_7$ 9.730 | | | |
| | $d_7$ 2.400 | $N_7$ 1.84666 | $\nu_7$ 23.8 |
| $r_8$ 11.661 | | | |
| | $d_8$ 2.800 | $N_8$ 1.00000 | |
| $r_9$ ∞ | | | |
| | $d_9$ 1.800 | $N_9$ 1.00000 | |
| $r_{10}$ −383.646 | | | |
| | $d_{10}$ 2.200 | $N_{10}$ 1.77250 | $\nu_{10}$ 49.8 |
| $r_{11}$ −18.476 | | | |
| | $d_{11}$ 0.100 | $N_{11}$ 1.00000 | |
| $r_{12}$ 8.892 | | | |
| | $d_{12}$ 3.000 | $N_{12}$ 1.77250 | $\nu_{12}$ 49.8 |
| $r_{13}$ −188.536 | | | |
| | $d_{13}$ 0.500 | $N_{13}$ 1.00000 | |
| $r_{14}$ −37.863 | | | |
| | $d_{14}$ 4.100 | $N_{14}$ 1.80518 | $\nu_{14}$ 25.4 |
| $r_{15}$ 6.559 | | | |
| | $d_{15}$ 1.200 | $N_{15}$ 1.00000 | |
| $r_{16}$ 20.685 | | | |
| | $d_{16}$ 2.800 | $N_{16}$ 1.78831 | $\nu_{16}$ 47.3 |
| $r_{17}$ −23.562 | | | |
| | $d_{17}$ 2.000 | $N_{17}$ 1.00000 | |
| $r_{18}$ ∞ | | | |
| | $d_{18}$ 8.600 | $N_{18}$ 1.51680 | $\nu_{18}$ 64.1 |
| $r_{19}$ ∞ | | | |

$d_4 = 14.241 - 6.096 - 1.000$
$d_8 = 2.800 - 10.945 - 16.041$
$d_9 = 1.800 - 1.179 - 1.600$
$d_{17} = 2.000 - 2.621 - 2.200$

TABLE 26

Embodiment 26
f = 9.2 — 26.3    F = 1.63 — 1.63

| Radius of Curvature | Axial Distance | Refractive Index (Nd) | Abbe Number (νd) |
|---|---|---|---|
| $r_1$ 27.495 | | | |
| | $d_1$ 1.300 | $N_1$ 1.80518 | $\nu_1$ 25.4 |
| $r_2$ 17.599 | | | |
| | $d_2$ 1.300 | $N_2$ 1.00000 | |
| $r_3$ 19.300 | | | |
| | $d_3$ 5.600 | $N_3$ 1.69100 | $\nu_3$ 54.8 |
| $r_4$ −139.004 | | | |
| | $d_4$ 14.736 | $N_4$ 1.00000 | |
| $r_5$ 18.486 | | | |
| | $d_5$ 0.900 | $N_5$ 1.77250 | $\nu_5$ 49.8 |
| $r_6$ 10.170 | | | |

TABLE 26-continued

Embodiment 26
f = 9.2 — 26.3    F = 1.63 — 1.63

| Radius of Curvature | Axial Distance | Refractive Index (Nd) | Abbe Number (νd) |
|---|---|---|---|
| | $d_6$ 3.000 | $N_6$ 1.00000 | |
| $r_7$ −17.232 | | | |
| | $d_7$ 0.900 | $N_7$ 1.69350 | $\nu_7$ 50.3 |
| $r_8$ 11.259 | | | |
| | $d_8$ 2.600 | $N_8$ 1.80518 | $\nu_8$ 25.4 |
| $r_9$ 69.596 | | | |
| | $d_9$ 1.900 | $N_9$ 1.00000 | |
| $r_{10}$ ∞ | | | |
| | $d_{10}$ 1.800 | $N_{10}$ 1.00000 | |
| $r_{11}$ 10.858 | | | |
| | $d_{11}$ 3.100 | $N_{11}$ 1.77250 | $\nu_{11}$ 49.8 |
| $r_{12}$ −117.810 | | | |
| | $d_{12}$ 3.000 | $N_{12}$ 1.00000 | |
| $r_{13}$ −12.400 | | | |
| | $d_{13}$ 3.500 | $N_{13}$ 1.80518 | $\nu_{13}$ 25.4 |
| $r_{14}$ 13.840 | | | |
| | $d_{14}$ 0.900 | $N_{14}$ 1.00000 | |
| $r_{15}$ 76.945 | | | |
| | $d_{15}$ 2.900 | $N_{15}$ 1.77250 | $\nu_{15}$ 49.8 |
| $r_{16}$ −13.904 | | | |
| | $d_{16}$ 0.100 | $N_{16}$ 1.00000 | |
| $r_{17}$ 13.793 | | | |
| | $d_{17}$ 3.300 | $N_{17}$ 1.77250 | $\nu_{17}$ 49.8 |
| $r_{18}$ −190.016 | | | |
| | $d_{18}$ 3.000 | $N_{18}$ 1.00000 | |
| $r_{19}$ ∞ | | | |
| | $d_{19}$ 8.600 | $N_{19}$ 1.51680 | $\nu_{19}$ 64.1 |
| $r_{20}$ ∞ | | | |

$d_4 = 14.736 - 5.614 - 0.800$
$d_8 = 2.600 - 11.021 - 15.836$
$d_9 = 1.900 - 1.223 - 1.722$
$d_{18} = 3.000 - 3.577 - 3.078$

TABLE 27

Embodiment 27
f = 7.65 — 14.8    F = 1.63 — 1.63

| Radius of Curvature | Axial Distance | Refractive Index (Nd) | Abbe Number (νd) |
|---|---|---|---|
| $r_1$ 25.107 | | | |
| | $d_1$ 1.200 | $N_1$ 1.84666 | $\nu_1$ 23.8 |
| $r_2$ 15.861 | | | |
| | $d_2$ 1.100 | $N_2$ 1.00000 | |
| $r_3$ 18.975 | | | |
| | $d_3$ 4.800 | $N_3$ 1.77250 | $\nu_3$ 49.8 |
| $r_4$ −101.514 | | | |
| | $d_4$ 8.218 | $N_4$ 1.00000 | |
| $r_5$ 21.211 | | | |
| | $d_5$ 0.900 | $N_5$ 1.78100 | $\nu_5$ 44.6 |
| $r_6$ 8.919 | | | |
| | $d_6$ 2.400 | $N_6$ 1.00000 | |
| $r_7$ −13.384 | | | |
| | $d_7$ 0.900 | $N_7$ 1.72000 | $\nu_7$ 50.3 |
| $r_8$ 15.208 | | | |
| | $d_8$ 2.000 | $N_8$ 1.84666 | $\nu_8$ 23.8 |
| $r_9$ −190.190 | | | |
| | $d_9$ 1.500 | $N_9$ 1.00000 | |
| $r_{10}$ ∞ | | | |
| | $d_{10}$ 1.500 | $N_{10}$ 1.00000 | |
| $r_{11}$ 8.334 | | | |
| | $d_{11}$ 2.900 | $N_{11}$ 1.77250 | $\nu_{11}$ 49.8 |
| $r_{12}$ −33.264 | | | |
| | $d_{12}$ 1.900 | $N_{12}$ 1.00000 | |
| $r_{13}$ −8.910 | | | |
| | $d_{13}$ 1.900 | $N_{13}$ 1.84666 | $\nu_{13}$ 23.8 |
| $r_{14}$ 10.559 | | | |
| | $d_{14}$ 1.000 | $N_{14}$ 1.00000 | |
| $r_{15}$ 70.057 | | | |
| | $d_{15}$ 3.300 | $N_{15}$ 1.74250 | $\nu_{15}$ 52.5 |
| $r_{16}$ −9.925 | | | |
| | $d_{16}$ 0.100 | $N_{16}$ 1.00000 | |
| $r_{17}$ 12.062 | | | |
| | $d_{17}$ 3.800 | $N_{17}$ 1.74250 | $\nu_{17}$ 52.5 |
| $r_{18}$ −91.780 | | | |
| | $d_{18}$ 2.000 | $N_{18}$ 1.00000 | |
| $r_{19}$ ∞ | | | |

TABLE 27-continued

Embodiment 27 f = 7.65 — 14.8    F = 1.63 — 1.63

| Radius of Curvature | Axial Distance | Refractive Index (Nd) | Abbe Number (νd) |
|---|---|---|---|
| | $d_{19}$ 8.000 | $N_{19}$ 1.51680 | $ν_{19}$ 64.1 |
| $r_{20}$ ∞ | | | |

$d_4 = 8.218 - 4.501 - 0.800$
$d_8 = 1.500 - 5.217 - 8.918$
$d_9 = 1.500 - 1.804 - 2.253$
$d_{18} = 2.000 - 1.696 - 1.247$

TABLE 28

Embodiment 28 f = 9.2 — 22.2    F = 1.63 — 1.90

| Radius of Curvature | Axial Distance | Refractive Index (Nd) | Abbe Number (νd) |
|---|---|---|---|
| $r_1$ 27.821 | | | |
| | $d_1$ 1.300 | $N_1$ 1.84666 | $ν_1$ 23.8 |
| $r_2$ 17.042 | | | |
| | $d_2$ 1.200 | $N_2$ 1.00000 | |
| $r_3$ 19.503 | | | |
| | $d_3$ 4.800 | $N_3$ 1.71300 | $ν_3$ 53.9 |
| $r_4$ −90.072 | | | |
| | $d_4$ 12.094 | $N_4$ 1.00000 | |
| $r_5$ 41.743 | | | |
| | $d_5$ 0.900 | $N_5$ 1.78831 | $ν_5$ 47.3 |
| $r_6$ 12.210 | | | |
| | $d_6$ 2.100 | $N_6$ 1.00000 | |
| $r_7$ −12.390 | | | |
| | $d_7$ 0.900 | $N_7$ 1.71700 | $ν_7$ 47.9 |
| $r_8$ 15.049 | | | |
| | $d_8$ 2.300 | $N_8$ 1.80518 | $ν_8$ 25.4 |
| $r_9$ −43.586 | | | |
| | $d_9$ 1.500 | $N_9$ 1.00000 | |
| $r_{10}$ ∞ | | | |
| | $d_{10}$ 1.500 | $N_{10}$ 1.00000 | |
| $r_{11}$ 161.125 | | | |
| | $d_{11}$ 2.100 | $N_{11}$ 1.77250 | $ν_{11}$ 49.8 |
| $r_{12}$ −19.907 | | | |
| | $d_{12}$ 0.100 | $N_{12}$ 1.00000 | |
| $r_{13}$ 8.020 | | | |
| | $d_{13}$ 2.900 | $N_{13}$ 1.77250 | $ν_{13}$ 49.8 |
| $r_{14}$ −6231.694 | | | |
| | $d_{14}$ 0.500 | $N_{14}$ 1.00000 | |
| $r_{15}$ −42.416 | | | |
| | $d_{15}$ 3.500 | $N_{15}$ 1.80518 | $ν_{15}$ 25.4 |
| $r_{16}$ 5.752 | | | |
| | $d_{16}$ 1.200 | $N_{16}$ 1.00000 | |
| $r_{17}$ 16.835 | | | |
| | $d_{17}$ 2.700 | $N_{17}$ 1.78831 | $ν_{17}$ 47.3 |
| $r_{18}$ −25.029 | | | |
| | $d_{18}$ 2.000 | $N_{18}$ 1.00000 | |
| $r_{19}$ ∞ | | | |
| | $d_{19}$ 8.500 | $N_{19}$ 1.51680 | $ν_{19}$ 64.1 |
| $r_{20}$ ∞ | | | |

$d_4 = 12.094 - 6.179 - 0.800$
$d_8 = 1.500 - 7.415 - 12.794$
$d_9 = 1.500 - 1.603 - 2.288$
$d_{18} = 2.000 - 1.897 - 1.212$

TABLE 29

Embodiment 29 f = 9.2 — 26.3    F = 1.63 — 1.63

| Radius of Curvature | Axial Distance | Refractive Index (Nd) | Abbe Number (νd) |
|---|---|---|---|
| $r_1$ 27.544 | | | |
| | $d_1$ 1.300 | $N_1$ 1.80518 | $ν_1$ 25.4 |
| $r_2$ 17.067 | | | |
| | $d_2$ 1.300 | $N_2$ 1.00000 | |
| $r_3$ 18.586 | | | |
| | $d_3$ 5.700 | $N_3$ 1.69100 | $ν_3$ 54.8 |
| $r_4$ −133.219 | | | |
| | $d_4$ 14.670 | $N_4$ 1.00000 | |
| $r_5$ 17.832 | | | |
| | $d_5$ 0.900 | $N_5$ 1.77250 | $ν_5$ 49.8 |
| $r_6$ 9.572 | | | |
| | $d_6$ 2.900 | $N_6$ 1.00000 | |
| $r_7$ −16.184 | | | |
| | $d_7$ 0.900 | $N_7$ 1.69350 | $ν_7$ 50.3 |
| $r_8$ 10.878 | | | |
| | $d_8$ 2.600 | $N_8$ 1.80518 | $ν_8$ 25.4 |
| $r_9$ 110.835 | | | |
| | $d_9$ 2.000 | $N_9$ 1.00000 | |
| $r_{10}$ ∞ | | | |
| | $d_{10}$ 1.500 | $N_{10}$ 1.00000 | |
| $r_{11}$ 10.928 | | | |
| | $d_{11}$ 3.100 | $N_{11}$ 1.77250 | $ν_{11}$ 49.8 |
| $r_{12}$ −138.397 | | | |
| | $d_{12}$ 3.250 | $N_{12}$ 1.00000 | |
| $r_{13}$ −12.325 | | | |
| | $d_{13}$ 3.900 | $N_{13}$ 1.84666 | $ν_{13}$ 23.8 |
| $r_{14}$ 14.638 | | | |
| | $d_{14}$ 0.800 | $N_{14}$ 1.00000 | |
| $r_{15}$ 75.983 | | | |
| | $d_{15}$ 3.000 | $N_{15}$ 1.77250 | $ν_{15}$ 49.8 |
| $r_{16}$ −13.420 | | | |
| | $d_{16}$ 0.100 | $N_{16}$ 1.00000 | |
| $r_{17}$ 13.240 | | | |
| | $d_{17}$ 3.400 | $N_{17}$ 1.77250 | $ν_{17}$ 49.8 |
| $r_{18}$ −460.552 | | | |
| | $d_{18}$ 3.000 | $N_{18}$ 1.00000 | |
| $r_{19}$ ∞ | | | |
| | $d_{19}$ 8.600 | $N_{19}$ 1.51680 | $ν_{19}$ 64.1 |
| $r_{20}$ ∞ | | | |

$d_4 = 14.670 - 2.507 - 0.800$
$d_9 = 2.000 - 15.208 - 15.856$

TABLE 30

Embodiment 30 f = 9.2 — 22.0    F = 1.63 — 1.63

| Radius of Curvature | Axial Distance | Refractive Index (Nd) | Abbe Number (νd) |
|---|---|---|---|
| $r_1$ 31.580 | | | |
| | $d_1$ 1.400 | $N_1$ 1.84666 | $ν_1$ 23.8 |
| $r_2$ 17.516 | | | |
| | $d_2$ 1.350 | $N_2$ 1.00000 | |
| $r_3$ 19.812 | | | |
| | $d_3$ 6.000 | $N_3$ 1.77250 | $ν_3$ 49.8 |
| $r_4$ −95.136 | | | |
| | $d_4$ 12.873 | $N_4$ 1.00000 | |
| $r_5$ 30.621 | | | |
| | $d_5$ 1.000 | $N_5$ 1.77250 | $ν_5$ 49.8 |
| $r_6$ 11.301 | | | |
| | $d_6$ 2.300 | $N_6$ 1.00000 | |
| $r_7$ −15.719 | | | |
| | $d_7$ 1.000 | $N_7$ 1.71300 | $ν_7$ 53.9 |
| $r_8$ 13.920 | | | |
| | $d_8$ 2.500 | $N_8$ 1.80518 | $ν_8$ 25.4 |
| $r_9$ −192.320 | | | |
| | $d_9$ 1.800 | $N_9$ 1.00000 | |
| $r_{10}$ ∞ | | | |
| | $d_{10}$ 1.500 | $N_{10}$ 1.00000 | |
| $r_{11}$ 9.797 | | | |
| | $d_{11}$ 3.200 | $N_{11}$ 1.77250 | $ν_{11}$ 49.8 |
| $r_{12}$ −55.688 | | | |
| | $d_{12}$ 2.200 | $N_{12}$ 1.00000 | |
| $r_{13}$ −12.390 | | | |
| | $d_{13}$ 2.200 | $N_{13}$ 1.84666 | $ν_{13}$ 23.8 |
| $r_{14}$ 11.506 | | | |
| | $d_{14}$ 1.100 | $N_{14}$ 1.00000 | |
| $r_{15}$ 67.549 | | | |
| | $d_{15}$ 3.100 | $N_{15}$ 1.74250 | $ν_{15}$ 52.5 |
| $r_{16}$ −12.763 | | | |
| | $d_{16}$ 0.100 | $N_{16}$ 1.00000 | |
| $r_{17}$ 13.089 | | | |
| | $d_{17}$ 3.500 | $N_{17}$ 1.74250 | $ν_{17}$ 52.5 |
| $r_{18}$ −210.947 | | | |
| | $d_{18}$ 3.000 | $N_{18}$ 1.00000 | |
| $r_{19}$ ∞ | | | |
| | $d_{19}$ 8.500 | $N_{19}$ 1.51680 | $ν_{19}$ 64.1 |

TABLE 30-continued

Embodiment 30 f = 9.2 − 22.0    F = 1.63 − 1.63

| Radius of Curvature | Axial Distance | Refractive Index (Nd) | Abbe Number ($\nu d$) |
|---|---|---|---|
| $r_{20}$  ∞ | | | |

$d_4 = 12.873 - 6.965 - 1.000$
$d_9 = 1.800 - 9.579 - 12.864$

TABLE 31

Embodiment 31 f = 8.2 − 15.8    F = 1.63 − 1.63

| Radius of Curvature | Axial Distance | Refractive Index (Nd) | Abbe Number ($\nu d$) |
|---|---|---|---|
| $r_1$  25.123 | | | |
| | $d_1$  1.300 | $N_1$  1.84666 | $\nu_1$  23.8 |
| $r_2$  15.737 | | | |
| | $d_2$  1.200 | $N_2$  1.00000 | |
| $r_3$  17.785 | | | |
| | $d_3$  5.200 | $N_3$  1.77250 | $\nu_3$  49.8 |
| $r_4$  −157.789 | | | |
| | $d_4$  10.068 | $N_4$  1.00000 | |
| $r_5$  24.698 | | | |
| | $d_5$  0.900 | $N_5$  1.78100 | $\nu_5$  44.6 |
| $r_6$  8.012 | | | |
| | $d_6$  2.500 | $N_6$  1.00000 | |
| $r_7$  −11.344 | | | |
| | $d_7$  0.900 | $N_7$  1.71700 | $\nu_7$  47.9 |
| $r_8$  21.312 | | | |
| | $d_8$  2.400 | $N_8$  1.84666 | $\nu_8$  23.8 |
| $r_9$  −29.117 | | | |
| | $d_9$  2.000 | $N_9$  1.00000 | |
| $r_{10}$  ∞ | | | |
| | $d_{10}$  1.500 | $N_{10}$  1.00000 | |
| $r_{11}$  ∞ | | | |
| | $d_{11}$  3.000 | $N_{11}$  1.77250 | $\nu_{11}$  49.8 |
| $r_{12}$  −34.738 | | | |
| | $d_{12}$  2.100 | $N_{12}$  1.00000 | |
| $r_{13}$  −10.152 | | | |
| | $d_{13}$  2.000 | $N_{13}$  1.84666 | $\nu_{13}$  23.8 |
| $r_{14}$  11.027 | | | |
| | $d_{14}$  1.000 | $N_{14}$  1.00000 | |
| $r_{15}$  152.547 | | | |
| | $d_{15}$  3.500 | $N_{15}$  1.74250 | $\nu_{15}$  52.5 |
| $r_{16}$  −10.412 | | | |
| | $d_{16}$  0.100 | $N_{16}$  1.00000 | |
| $r_{17}$  11.379 | | | |
| | $d_{17}$  4.300 | $N_{17}$  1.74250 | $\nu_{17}$  52.5 |
| $r_{18}$  −375.049 | | | |
| | $d_{18}$  2.000 | $N_{18}$  1.00000 | |
| $r_{19}$  ∞ | | | |
| | $d_{19}$  8.600 | $N_{19}$  1.51680 | $\nu_{19}$  64.1 |
| $r_{20}$  ∞ | | | |

$d_4 = 12.873 - 6.965 - 1.000$
$d_9 = 1.800 - 9.579 - 12.864$

TABLE 32

Embodiment 32 f = 7.65 − 14.8    F = 1.63 − 1.63

| Radius of Curvature | Axial Distance | Refractive Index (Nd) | Abbe Number ($\nu d$) |
|---|---|---|---|
| $r_1$  24.331 | | | |
| | $d_1$  1.200 | $N_1$  1.84666 | $\nu_1$  23.8 |
| $r_2$  16.131 | | | |
| | $d_2$  1.100 | $N_2$  1.00000 | |
| $r_3$  19.104 | | | |
| | $d_3$  5.700 | $N_3$  1.77250 | $\nu_3$  49.8 |
| $r_4$  −119.429 | | | |
| | $d_4$  9.818 | $N_4$  1.00000 | |
| $r_5$  24.423 | | | |
| | $d_5$  0.900 | $N_5$  1.78100 | $\nu_5$  44.6 |
| $r_6$  8.241 | | | |
| | $d_6$  2.400 | $N_6$  1.00000 | |
| $r_7$  −11.348 | | | |
| | $d_7$  0.900 | $N_7$  1.71700 | $\nu_7$  47.9 |
| $r_8$  16.762 | | | |
| | $d_8$  2.300 | $N_8$  1.8466 | $\nu_8$  23.8 |

TABLE 32-continued

Embodiment 32 f = 7.65 − 14.8    F = 1.63 − 1.63

| Radius of Curvature | Axial Distance | Refractive Index (Nd) | Abbe Number ($\nu d$) |
|---|---|---|---|
| $r_9$  −38.695 | | | |
| | $d_9$  1.500 | $N_9$  1.00000 | |
| $r_{10}$  ∞ | | | |
| | $d_{10}$  1.500 | $N_{10}$  1.00000 | |
| $r_{11}$  9.009 | | | |
| | $d_{11}$  2.800 | $N_{11}$  1.77250 | $\nu_{11}$  49.8 |
| $r_{12}$  −22.169 | | | |
| | $d_{12}$  1.900 | $N_{12}$  1.00000 | |
| $r_{13}$  −8.124 | | | |
| | $d_{13}$  1.900 | $N_{13}$  1.84666 | $\nu_{13}$  23.8 |
| $r_{14}$  12.121 | | | |
| | $d_{14}$  1.000 | $N_{14}$  1.00000 | |
| $r_{15}$  −797.728 | | | |
| | $d_{15}$  3.300 | $N_{15}$  1.74250 | $\nu_{15}$  52.5 |
| $r_{16}$  −9.076 | | | |
| | $d_{16}$  0.100 | $N_{16}$  1.00000 | |
| $r_{17}$  12.014 | | | |
| | $d_{17}$  4.400 | $N_{17}$  1.74250 | $\nu_{17}$  52.5 |
| $r_{18}$  −67.356 | | | |
| | $d_{18}$  2.000 | $N_{18}$  1.00000 | |
| $r_{19}$  ∞ | | | |
| | $d_{19}$  8.000 | $N_{19}$  1.51680 | $\nu_{19}$  64.1 |
| $r_{20}$  ∞ | | | |

$d_4 = 9.818 - 5.954 - 1.000$
$d_9 = 1.500 - 5.000 - 7.320$

TABLE 33

Embodiment 33 f = 9.2 − 22.2    F = 1.63 − 1.68

| Radius of Curvature | Axial Distance | Refractive Index (Nd) | Abbe Number ($\nu d$) |
|---|---|---|---|
| $r_1$  26.631 | | | |
| | $d_1$  1.300 | $N_1$  1.84666 | $\nu_1$  23.8 |
| $r_2$  17.079 | | | |
| | $d_2$  1.200 | $N_2$  1.00000 | |
| $r_3$  18.863 | | | |
| | $d_3$  5.500 | $N_3$  1.71300 | $\nu_3$  53.9 |
| $r_4$  −142.200 | | | |
| | $d_4$  13.359 | $N_4$  1.00000 | |
| $r_5$  30.043 | | | |
| | $d_5$  0.900 | $N_5$  1.78831 | $\nu_5$  47.3 |
| $r_6$  11.402 | | | |
| | $d_6$  2.200 | $N_6$  1.00000 | |
| $r_7$  −13.585 | | | |
| | $d_7$  0.900 | $N_7$  1.71700 | $\nu_7$  47.9 |
| $r_8$  16.162 | | | |
| | $d_8$  2.200 | $N_8$  1.80518 | $\nu_8$  25.4 |
| $r_9$  −71.183 | | | |
| | $d_9$  1.500 | $N_9$  1.00000 | |
| $r_{10}$  ∞ | | | |
| | $d_{10}$  1.500 | $N_{10}$  1.00000 | |
| $r_{11}$  −267.072 | | | |
| | $d_{11}$  1.900 | $N_{11}$  1.77250 | $\nu_{11}$  49.8 |
| $r_{12}$  −17.205 | | | |
| | $d_{12}$  0.100 | $N_{12}$  1.00000 | |
| $r_{13}$  8.284 | | | |
| | $d_{13}$  3.300 | $N_{13}$  1.77250 | $\nu_{13}$  49.8 |
| $r_{14}$  −95.924 | | | |
| | $d_{14}$  0.350 | $N_{14}$  1.00000 | |
| $r_{15}$  −30.680 | | | |
| | $d_{15}$  3.500 | $N_{15}$  1.80518 | $\nu_{15}$  25.4 |
| $r_{16}$  6.119 | | | |
| | $d_{16}$  0.100 | $N_{16}$  1.00000 | |
| $r_{17}$  15.508 | | | |
| | $d_{17}$  2.600 | $N_{17}$  1.78831 | $\nu_{17}$  47.3 |
| $r_{18}$  −21.578 | | | |
| | $d_{18}$  1.500 | $N_{18}$  1.00000 | |
| $r_{19}$  ∞ | | | |
| | $d_{19}$  8.500 | $N_{19}$  1.51680 | $\nu_{19}$  64.1 |
| $r_{20}$  ∞ | | | |

$d_4 = 13.359 - 8.236 - 1.000$
$d_9 = 1.500 - 8.319 - 12.310$

In the first to fifteenth embodiments, the first lens unit and the second lens unit are shiftable along the optical axis in the zooming operation, while th third lens unit is stationary in the zooming operation. In the first to eighth embodiments, the third lens unit consists of, from the object side, a positive lens element whose object side surface has a stronger refractive power than its image side surface has, a bi-concave lens element, a positive lens element whose image side surface has a stronger refractive power than its object side surface has, and a positive lens element whose object side surface has a stronger refractive power than its image side surface has. On the other hand, in the ninth to fifteenth embodiments, the third lens unit consists of, from the object side, a positive lens element whose image side surface has a stronger refractive power than its object side surface has, a positive lens element whose object side surface has a stronger refractive power than its image side surface has, a biconcave lens whose image side surface has a stronger refractive power than its object side surface has, and a bi-convex lens.

In the sixteenth to twenty-fifth embodiments, the first lens unit is stationary in the zooming operation, while the second lens unit and the third lens unit are shiftable in the zooming operation. In the sixteenth to twenty-first embodiments, the third lens unit consists of, from the object side, a positive lens element whose object side surface has a stronger refractive power than its image side surface has, a bi-concave lens element, a positive lens element whose image side surface has a stronger refractive power than its object side surface has, and a positive lens element whose object side surface has a stronger refractive power than its image side surface has On the other hand, in the twenty-second embodiment, the the third lens unit consists of, from the object side, a positive lens element whose image side surface has a stronger refractive power than its object side surface has, a positive lens element whose object side surface has a stronger refractive power than its image side surface has, a bi-concave lens whose image side surface has a stronger refractive power than its object side surface has, and a bi-convex lens.

In the twenty-sixth to thirty-third embodiments, the second lens unit consists of, from the object side, a negative lens element whose image side surface has a stronger refractive power than its object side surface has, and a negative lens component in which a negative lens element and a positive lens element are cemented to each other In the twenty-sixth to twenty-eighth embodiments, the first lens unit is stationary in the zooming operation, while the second and third lens units are shiftable in the zooming operation. On the other hand, in the twenty-ninth to thirty-third embodiments, the first and second lens units are shiftable in the zooming operation, while the third lens unit is stationary in the zooming operation.

In the above embodiments so the zoom lens system with the focusing operation, the embodiments 1, 4, 5, 6, 7, 15, 17, 18 and 21 each relate to a case of focusing method that the first lens unit (I) thereof serves as a focusing lens unit, as well as the embodiments 10, 11, 13, 16, 23, 24 and 25 each relate to another case of focusing method that the third lens unit (III) thereof serves as a focusing lens unit, As can be readily appreciated, it is possible to deviate from the above embodiments of the present invention and, as will be readily understood by those skilled in the optical art, the invention is capable of many modifications and improvements within the scope and spirit thereof Accordingly, it will be understood that the invention is not to be limited by these specific embodiments, but only by the scope and spirit of the appended claims.

What is claimed is:

1. A zoom lens system consisting of from the object side to the image side:
   a first lens unit of a positive refractive power, consisting of a negative meniscus lens element having an object side surface convex to the object side, and a bi-convex lens element whose object side surface has stronger refractive power than its image side surface has;
   a second lens unit of a negative refractive power, consisting of a negative lens element whose image side surface has a stronger refractive power than its object side surface has, and a positive meniscus lens element having an object side surface convex to the object side; and
   a third lens unit of a positive refractive power;
   wherein the second lens unit and one of the first and third lens units are shiftable along the optical axis of the lens system in the zooming operation while another thereof is stationary on the optical axis in the zooming operation 2. A zoom lens system as claimed in claim 1, wherein the first lens unit is shiftable with the second lens unit along the optical axis in the zooming operation, while the third lens unit is stationary on the optical axis in the zooming operation.

3. A zoom lens system as claimed in claim 2, wherein the lens system fulfills the following conditions:

$$0.05 < R_{1P}/|R_{2R}| < 0.43 \ (R_{2R} < 0)$$

$$0.30 < R_{4R}/R_{1P} < 0.60$$

$$0.28 < \phi_I/|\phi_{II}| < 0.45 \ (\phi_{II} < 0)$$

$$0.38 < R_{3R}/|\phi_{II}| < 0.75 \ (\phi_{II} < 0)$$

$$0.65 < R_{1R}/R_{2P} < 1.00$$

$$(n_1 + n_4)/2 < 1.78$$

wherein;
   R represents the radius of curvature, wherein the first subscript thereof represents the lens number counted from the object side, and the second subscript thereof, that is P represents the object side surface and R represents the image side surface;
   $\phi_I$ represents the refractive power of the first lens unit;
   $\phi_{II}$ represents the refractive power of the second lens unit; and
   $n_i$ represents the refractive index of the i-th lens element counted from the object side.

4. A zoom lens system as claimed in claim 2, wherein the third lens unit consists of, from the object side to the image side, a positive lens element whose object side surface has stronger refractive power than its image side surface has, a bi-concave lens element, a positive lens element whose image side surface has stronger refractive power than its object side surface has, and a positive lens element whose object side surface has stronger refractive power than its image side surface has.

5. A zoom lens system as claimed in claim 4, wherein the lens system fulfills the following conditions:

$1.0 < A_1/A_2$ $0.40 < |R_{6P}|/R_{6R} < 1.02 \ (R_{6P} < 0)$ $0.60 < f_7 \cdot \phi_{7R} < 1.30 \ (\text{wherein } \phi_{7R} = (n_7 - 1)/|R_{7R}|)$ $0.70 < f_8 \cdot \phi_{8P} < 1.60 \ (\text{wherein } \phi_{8P} = (n_8 - 1)/R_{8P})$ wherein;
- $A_1$ represents the axial air space between the fifth lens element and the sixth lens element counted from the object side;
- $A_2$ represents the axial air space between the sixth lens element and the seventh lens element counted from the object side;
- R represents the radius of curvature, wherein the first subscript thereof represents the lens number counted from the object side, and the second subscript thereof, that is P represents the object side surface and R represents the image side surface;
- $f_i$ represents the focal length of the i-th lens element counted from the object side; and
- $n_i$ represents the refractive index of the i-th lens element counted from the object side.

6. A zoom lens system as claimed in claim 2, wherein the third lens unit consists of, from the object side to the image side, a positive lens element whose image side surface has stronger refractive power than its object side surface has, a positive lens element whose object side surface has stronger refractive power than its image side surface has, a bi-concave lens element whose image side surface has stronger refractive power than its object side surface has, and a bi-convex lens element.

7. A zoom lens system as claimed in claim 6, wherein the lens system fulfills the following conditions:

$0.30 < f_6/f_5 < 0.60$ $0.10 < R_{7R}/|R_{7P}| < 0.50 \ (R_{7P} < 0)$ $0.20 < T_7/f_W < 0.60$ wherein:
- $f_i$ represents the focal length of the i-th lens element counted from the object side;
- R represents the radius of curvature, wherein the first subscript thereof represents the lens number counted from the object side, and the second subscript thereof, that is P represents the object side surface and R represents the image side surface;
- $T_7$ represents the axial thickness of the seventh lens element counted from the object side; and
- $f_W$ represents the shortest focal length of the whole lens system.

8. A zoom lens system as claimed in claim 1, wherein the first lens unit is stationary on the optical axis and the third lens unit is shiftable along the optical axis in the zooming operation.

9. A zoom lens system as claimed in claim 8, wherein the lens system fulfills the following conditions:

$0.05 < R_{1P}/|R_{2R}| < 0.43 \ (R_{2R} < 0)$ $0.30 < R_{4R}/R_{1P} < 0.60$ $0.28 < \phi_I/|\phi_{II}| < 0.45 \ (\phi_{II} < 0)$ $0.38 < R_{3R}/\phi_{II}| < 0.75 \ (\phi_{II} < 0)$ $0.65 < R_{1R}/R_{2P} < 1.00$ $(n_1 + n_4)/2 > 1.78$ wherein:
- R represents the radius of curvature, wherein the first subscript thereof represents the lens number counted from the object side, and the second subscript thereof, that is P represents the object side surface and R represents the image side surface;
- $\phi_I$ represents the refractive power of the first lens unit;
- $\phi_{II}$ represents the refractive power of the second lens unit; and
- $n_i$ represents the refractive index of the i-th lens element counted from the object side.

10. A zoom lens system as defined in claim 8, wherein the third lens consists of, from the object side to the image side, a positive lens element whose object side surface has stronger refractive power than its image side surface has, a bi-concave lens element, a positive lens element whose image side surface has stronger refractive power than its object side surface has, and a positive lens element whose object side surface has stronger refractive power than its image side surface has.

11. A zoom lens system as claimed in claim 10, wherein the lens system fulfills the following conditions:

$1.0 < A_1/A_2$ $0.40 < |R_{6P}|/R_{6R} < 1.20 \ (R_{6P} < 0)$ $0.60 < f_7 \cdot \phi_{7R} < 1.30 \ (\phi_{7R} = (n_7 - 1)/|R_{7R}|)$ $0.70 < f_8 \cdot \phi_{8P} < 1.60 \ (\phi_{8P} = (n_8 - 1)/R_{8P})$ wherein;
- $A_1$ represents the axial air space between the fifth lens element and the sixth lens element counted from the object side;
- $A_2$ represents the axial air space between the sixth lens element and the seventh lens element counted from the object side;
- $f_i$ represents the focal length of the i-th lens element counted from the object side; and
- $n_i$ represents the refractive index of the i-th lens element counted from the object side.

12. A compact zoom lens system as claimed in claim 8, wherein the third lena unit consists of, from the object side to the image side, a positive lens element whose image side surface has stronger refractive power than its object side surface has, a positive lens element whose image side surface has stronger refractive power than its object side surface has, a bi-concave lens element whose image side surface has stronger refractive power than its object side surface has, and a bi-convex lens element.

13. A zoom lens system as claimed in claim 12, wherein the lens system fulfills the following conditions:

$0.30 < f_6/f_5 < 0.60$ $0.10 < R_{7R}/R_{7P} < 0.50 \ (R_{7P} < 0)$ $$0.20 < T_7/f_W < 0.60$$

wherein:

$f_i$ represents the focal length of the i-th lens element counted from the object side;

R represents the radius of curvature, wherein the first subscript thereof represents the lens number counted from the object side, and the second subscript thereof, that is P represents the object side surface and R represents the image side surface;

$T_7$ represents the axial thickness of the seventh lens element counted from the object side; and $f_W$ represents the shortest focal length of the whole lens system.

14. A zoom lens system, comprising from the object side to the image side:

a first lens unit of a positive refractive power;
a second lens unit of a negative refractive power, and
a third lens unit of a positive refractive power, wherein one of the first and third lens units is shiftable along the optical axis of the lens system in both the zooming operation and the focusing operation, and the second lens unit is also shiftable along the optical axis of the lens system in the zooming operation, the third lens unit is shiftable along the optical axis of the lens system in both the zooming operation and the focusing operation while the first lens unit is stationary in both the zooming operation and the focusing operation, and wherein the lens system fulfills the following conditions:

$$0.28 < \phi_I/|\phi_{II}| < 0.43 \ (\phi_{II} < 0)$$

$$0.85 < \phi_{III} \cdot f_M < 1.70 \ (\text{wherein } f_M = (f_W \cdot f_T)^{\frac{1}{2}})$$

wherein:

$\phi_I$ represents the refractive power of the first lens unit;

$\phi_{II}$ represents the refractive power of the second lens unit;

$\phi_{III}$ represents the refractive power of the third lens unit;

$f_W$ represents the shortest focal length of the whole lens system, and $f_T$ represents the longest focal length of the whole lens system.

15. A zoom lens system as claimed in claim 14, wherein the first lens unit consists of, from the object side to the image side, a negative meniscus lens element having an object side surface convex to the object side, and a bi-convex lens element whose object side surface has stronger refractive power than its image side surface has, and the second lens unit consists of, from the object side to the image side, a negative lens element whose image side surface has stronger refractive power than its object side surface has, and a positive meniscus lens element having an object side surface convex to the object side, and wherein the lens system fulfills the following conditions:

$$0.05 < R_{1P}/|R_{2R}| < 0.45 \ (R_{2R} < 0)$$

$$0.60 < R_{1R}/R_{2P} < 1.00$$

$$0.43 < R_{3R} \cdot |\phi_{II}| < 0.75 \ (\phi_{II} < 0)$$

wherein:

R represents the radius of curvature, wherein the first subscript thereof represents the lens number counted from the object side, and the second subscript thereof, that is P represents the object side surface and R represents the image side surface; and $\phi_{II}$ represents the refractive power of the second lens unit.

16. A zoom lens system as claimed in claim 15, wherein the side, a positive lens element whose object side surface has stronger refractive power than its image side surface has, a bi-concave lens element, a positive lens element whose image side surface has stronger refractive power than its object side surface has, and a positive lens element whose object side surface has stronger refractive power than its image side surface has, and wherein the lens system further fulfills the following conditions:

$$1.0 < A_1/A_2$$

$$0.40 < |R_{6P}|/R_{6R} < 1.20 \ (R_{6P} < 0)$$

wherein;

$A_1$ represents the axial air space between the fifth lens element and the sixth lens element counted from the object side; and $A_2$ represents the axial air space between the sixth lens element and the seventh lens element counted from the object side.

17. A compact zoom lens system as claimed in claim 15, wherein the third lens unit consists of, from the object side to the image side, a positive lens element whose image side surface has stronger refractive power than its object side surface has, a positive lens element whose image side surface has stronger refractive power than its object side surface has, a bi-concave lens element whose image side surface has stronger refractive power than its object side surface has, and a bi-convex lens element, and wherein the lens system further fulfills the following conditions:

$$0.30 < f_6/f_5 < 0.60$$

$$0.10 < R_{7R}/|R_{7P}| < 0.50 \ (R_{7P} < 0)$$

wherein:

$f_i$ represents the focal length of the i-th lens element counted from the object side.

18. A zoom lens system, comprising from the object side to the image side:

a first lens unit of a positive refractive power;
a second lens unit of a negative refractive power, and
a third lens unit of a positive refractive power, wherein one of the first and third lens units is shiftable along the optical axis of the lens system in both the zooming operation and the focusing operation, and the second lens unit is also shiftable along the optical axis of the lens system in the zooming operation, wherein the first lens unit is shiftable along the optical axis of the lens system in both the zooming operation and the focusing operation while the third lens unit is stationary in both the zooming operation and the focusing operation, and wherein the lens system fulfills the following conditions:

$$0.28 < \phi_I/|\phi_{II}| < 0.43 \ (\phi_{II} < 0)$$

$$0.18 < \phi_I \cdot f_W < 0.32$$

wherein:

$\phi_I$ represents the refractive power of the first lens unit;

$\phi_{II}$ represents the refractive power of the second lens unit, and $f_W$ represents the shortest focal length of the whole lens system.

19. A zoom lens system as claimed in claim 18, wherein the first lens unit consists of, from the object side to the image side, a negative meniscus lens element having an object side surface convex to the object side, and a bi-convex lens element whose object side surface has stronger refractive power than its image side surface has, and the second lens unit consists of, from the object side to the image side, a negative lens element whose image side surface has stronger refractive power than its object side surface has, and a positive meniscus lens element having an object side surface convex to the object side, and wherein the lens system fulfills the following conditions:

$$0.05 < R_{1P}/|R_{2R}| < 0.45 \ (R_{2R} < 0)$$

$$0.60 < R_{1R}/R_{2P} < 1.00 \ (\phi_{II} < 0)$$

$$0.43 < R_{3R} \cdot |\phi_{II}| < 0.75$$

wherein:

R represents the radius of curvature, wherein the first subscript thereof represents the lens number counted from the object side, and the second subscript thereof, that is P represents the object side surface and R represents the image side surface; and $\phi_{II}$ represents the refractive power of the second lens unit.

20. A zoom lens system as claimed in claim 19, wherein the third lens unit consists of, from the object side to the image side, a positive lens element whose object side surface has stronger refractive power than its image side surface has, a bi-concave lens element, a positive lens element whose image side surface has stronger refractive power than its object side surface has, and a positive lens element whose object side surface has stronger refractive power than its image side surface has, and wherein the lens system further fulfills the following conditions:

$$1.0 < A_1/A_2$$

$$0.40 < |R_{6P}|/R_{6R} < 1.20 \ (R_{6P} < 0)$$

wherein;

$A_1$ represents the axial air space between the fifth lens element and the sixth lens element counted from the object side; and $A_2$ represents the axial air space between the sixth lens element and the seventh lens element counted from the object side.

21. A compact zoom lens system as claimed in claim 20, wherein the third lens unit consists of, from the object side to the image side, a positive lens element whose image side surface has stronger refractive power than its object side surface has, a positive lens element whose image side surface has stronger refractive power than its object side surface has, a bi-concave lens element whose image side surface has stronger refractive power than its object side surface has, and a bi-convex lens element, and wherein the lens system further fulfills the following conditions:

$$0.30 < f_6/f_5 < 0.60$$

$$0.10 < R_{7R}/|R_{7P}| < 0.50 \ (R_{7P} < 0)$$

wherein:

$f_i$ represents the focal length of the i-th lens element counted from the object side.

22. A zoom lens system, comprising from the object side to the image side:

a first lens unit of a positive refractive power consisting of from the object side to the image side, a negative meniscus lens element having an object side surface convex to the object side, and a biconvex lens element whose object side surface has stronger refractive power than its image side surface;

a second lens unit of a negative refractive power, consisting of a negative lens element whose image side surface has stronger refractive power than its object side surface, and a negative compound lens component in which a negative lens element is cemented on a positive lens element, and a third lens unit of a positive refractive power, wherein the second lens unit and one of the first and third lens units are shiftable along the optical axis of the lens system in the zooming operation, while another thereof is stationary on the optical axis in the zooming operation, wherein the first lens unit is shiftable with the second lens unit along the optical axis in the zooming operation, while the third lens unit is stationary on the optical axis in the zooming operation, and wherein the lens system fulfills the following conditions:

$$0 < R_{1P}/|R_{2R}| < 0.5 \ (R_{2R} < 0)$$

$$0.28 < \phi/I|\phi II < 0.40 \ (\phi_{II} < 0)$$

$$0.85 < \phi_{III} \cdot f_M < 1.70 \ (\text{wherein } f_M = (f_W \cdot f_T)^{\frac{1}{2}})$$

wherein:

R represents the radius of curvature, wherein the first subscript thereof represents the lens number counted from the object side, and the second subscript thereof, that is, P, represents the object side surface, and R represents the image side surface;

$\phi_I$ represents the refractive power of the first lens unit;

$\phi_{II}$ represents the refractive power of the second lens unit;

$\phi_{III}$ represents the refractive power of the third lens unit;

$f_W$ represents the shortest focal length of the whole lens system, and $f_T$ represents the longest focal length of the whole lens system.

23. A zoom lens system as claimed in claim 22, wherein the third lens unit consists of, from the object side to the image side, a positive lens element whose object side surface has stronger refractive power than its image side surface has, a bi-concave lens element, a positive lens element whose image side surface has stronger refractive power than its object side surface has, and a positive lens element whose object side surface has stronger refractive power than its image side surface has, and wherein the lens system fulfills the following conditions:

$$1.0 < A_1/A_2$$

$$0.40 < |R_{7P}|/R_{7R} < 1.20 \ (R_{7P} < 0)$$

wherein;
- $A_1$ represents the axial air space between the fifth lens element and the sixth lens element counted from the object side; and
- $A_2$ represents the axial air space between the sixth lens element and the seventh lens element counted from the object side.

24. A compact zoom lens system as claimed in claim 22, wherein the third lens unit consists of, from the object side to the image side, a positive lens element whose image side surface has stronger refractive power than its object side surface has, a positive lens element whose image side surface has stronger refractive power than its object side surface has, a bi-concave lens element whose image side surface has stronger refractive power than its object side surface has, and a bi-convex lens element, and wherein the lens system fulfills the following conditions:

$$0.30 < f_7/f_6 < 0.60$$

$$0.05 < R_{8R}/|R_{8P}| < 0.50 \ (R_{8P} < 0)$$

wherein:
- $f_i$ represents the focal length of the i-th lens element counted from the object side; and
- R represents the radius of curvature, wherein the first subscript thereof represents the lens number counted from the object side, and the second subscript thereof, that is P represents the object side surface and R represents the image side surface.

25. A zoom lens system, comprising from the object side to the image side:
- a first lens unit of a positive refractive power, consisting of from the object side to the image side, a negative meniscus lens element having an object side surface convex to the object side, and a biconvex lens element whose object side surface has stronger refractive power than its image side surface;
- a second lens unit of a negative refractive power, consisting of a negative lens element whose image side surface has stronger refractive power than its object side surface, and a negative compound lens component in which a negative lens element is cemented on a positive lens element, and
- a third lens unit lens unit of a positive refractive power, wherein the second lens unit and one of the first and third lens units are shiftable along the optical axis of the lens system in the zooming operation, while another thereof is stationary on the optical axis in the zooming operation, wherein the first lens unit is stationary on the optical axis and the third lens unit is shiftable along the optical axis in the zooming operation, and the lens system fulfills the following conditions:

$$0 < R_{1P}/|R_{2R}| < 0.5 \ (R_{2R} < 0)$$

$$0.27 < \phi_I/|\phi_{II}| < 0.40 \ (\phi_{II} < 0)$$

$$0.18 < \phi_I \cdot f_W < 0.35$$

wherein:
- R represents the radius of curvature, wherein the first subscript thereof represents the lens number counted from the object side, and the second subscript thereof, that is, P, represents the object side surface, and R represents the image side surface;
- $\phi_I$ represents the refractive power of the first lens unit;
- $\phi_{II}$ represents the refractive power of the second lens unit, and
- $f_W$ represents the shortest focal length of the whole lens system.

26. A zoom lens system as claimed in claim 25, wherein the third lens unit consists of, from the object side to the image side, a positive lens element whose object side surface has stronger refractive power than its image side surface has, a bi-concave lens element, a positive lens element whose image side surface has stronger refractive power than its object side surface has, and a positive lens element whose object side surface has stronger refractive power than its image side surface has, and wherein the lens system fulfills the following conditions:

$$1.0 < A_1/A_2$$

$$0.40 < |R_{7P}|/R_{7R} < 1.20 \ (R_{7P} < 0)$$

wherein;
- $A_1$ represents the axial air space between the fifth lens element and the sixth lens element counted from the object side; and
- $A_2$ represents the axial air space between the sixth lens element and the seventh lens element counted from the object side.

27. A compact zoom lens system as claimed in claim 25, wherein the third lens unit consists of, from the object side to the image side, a positive lens element whose image side surface has stronger refractive power than its object side surface has, a positive lens element whose image side surface has stronger refractive power than its object side surface has, a bi-concave lens element whose image side surface has stronger refractive power than its object side surface has, and a bi-convex lens element, and wherein the lens system fulfills the following conditions:

$$0.30 < f_7/f_6 < 0.60$$

$$0.05 < R_{8R}|R_{8P}| < 0.50 \ (R_{8P} < 0)$$

wherein:
- $f_i$ represents the focal length of the i-th lens element counted from the object side; and
- R represents the radius of curvature, wherein the first subscript thereof represents the lens number counted from the object side, and the second subscript thereof, that is P represents the object side surface and R represents the image side surface.

28. A zoom lens system, comprising from the object side the image side:
- a first lens unit of a positive refractive power, consisting of from the object side to the image side, a negative meniscus lens element having an object side surface convex to the object side, and a biconvex lens element whose object side surface has stronger refractive power than its image side surface;

a second lens unit of a negative refractive power, consisting of a negative lens element whose image side surface has stronger refractive power than its object side surface, and a negative compound lens component in which a negative lens element is cemented on a positive lens element, and a third lens unit of a positive refractive power, wherein the second lens unit and one of the first and third lens units are shiftable along the optical axis of the lens system in the zooming operation, while another thereof is stationary on the optical axis in the zooming operation, and the third lens unit consists of, from the object side to the image side, a positive lens element whose object side surface has stronger refractive power than its image side surface, a bi-concave lens element, a positive lens element whose image side surface has stronger refractive power than its object side surface, and a positive lens element whose object side surface has stronger refractive power than its image side surface.

29. A zoom lens system, comprising from the object side to the image side:

a first lens unit of a positive refractive power, consisting of from the object side to the image side, a negative meniscus lens element having an object side surface convex to the object side, and a biconvex lens element whose object side surface has stronger refractive power than its image side surface;

a second lens unit of a negative refractive power, consisting of a negative lens element whose image side surface has stronger refractive power than its object side surface, and a negative compound lens component in which a negative lens element is cemented on a positive lens element, and a third lens unit of a positive refractive power, wherein the second lens unit and one of the first and third lens units are shiftable along the optical axis of the lens system in the zooming operation, while another thereof is stationary on the optical axis in the zooming operation, wherein the third lens unit consists of, from the object side to the image side, a positive lens element whose image side surface has stronger refractive power than its object side surface, a positive lens element whose image side surface has stronger refractive power than its object side surface, a bi-concave lens element whose image side surface has stronger refractive power than its object side surface, and a biconvex lens element.

30. A zoom lens system comprising from the object side to the image side:

a first lens unit of a positive refractive power, consisting of a negative meniscus lens element having an object side surface convex to the object side, and a biconvex lens element whose object side surface has a stronger refractive power than its image side surface;

a second lens unit of a negative refractive power, consisting of a negative lens element whose image side surface has a stronger refractive power than its object side surface, and a positive meniscus lens element having an object side surface convex to the object side, and a third lens unit of a positive refractive power, wherein the second lens unit and the first lens units are shiftable along the optical axis of the lens system in the zooming operation, while the third lens unit is stationary on the optical axis in the zooming operation.

31. A zoom lens system as claimed in claim 30, wherein the lens system fulfills the following conditions:

$$0.05 < R_{1P}/|R_{2R}| < 0.43 \ (R_{2R} < 0)$$

$$0.30 < R_{4R}/R_{1P} < 0.60$$

$$0.28 < \phi_I/|\phi_{II}| < 0.45 \ (\phi_{II} < 0)$$

$$0.38 < R_{3R}/|\phi_{II}| < 0.75 \ (\phi_{II} < 0)$$

$$0.65 < R_{1R}/R_{2P} < 1.00$$

$$(n_1 + n_4)/2 < 1.78$$

wherein:

R represents the radius of curvature, wherein the first subscript thereof represents the lens number counted from the object side, and the second subscript thereof, that is, P, represents the object side surface, and R represents the image side surface;

$\phi_I$ represents the refractive power of the first lens unit;

$\phi_{II}$ represents the refractive power of the second lens unit; and $n_i$ represents the refractive index of the i-th lens element counted from the object side.

32. A zoom lens system as claimed in claim 30, wherein the third lens unit consists of, from the object side to the image side, a positive lens element whose object side surface has a stronger refractive power than its image side surface, a bi-concave lens element, a positive lens element whose image side surface has a stronger refractive power than its object side surface, and a positive lens element whose object side surface has a stronger refractive power than its image side surface.

33. A zoom lens system as claimed in claim 32, wherein the lens system fulfills the following conditions:

$$1.0 < A_1/A_2$$

$$0.40 < |R_{6P}|/R_{6R} < 1.02 \ (R_{6P} < 0)$$

$$0.60 < f_7 \cdot \phi_{7R} < 1.30 \ (\text{wherein } \phi_{7R} = (n_7-1)/R_{7R})$$

$$0.70 < f_8 \cdot \phi_{8P} < 1.60 \ (\text{wherein } \phi_{8P} = (n_8-1)/R_{8P})$$

wherein:

$A_1$ represents the axial air space between the fifth lens element and the sixth lens element counted from the object side;

$A_2$ represents the axial air space between the sixth lens element and the seventh lens element counted from the object side;

R represents the radius of curvature, wherein the first subscript thereof represents the lens number counted from the object side, and the second subscript thereof, that is, P, represents the object side surface, and R represents the image side surface;

$f_i$ represents the focal length of the i-th lens element counted from the object side; and $n_i$ represents the refractive index of the i-th lens element counted from the object side.

34. A zoom lens system as claimed in claim 30, wherein the third lens unit consists of, from the object side to the image side, a positive lens element whose image side surface has a stronger refractive power than its object side surface, a positive lens element whose object side surface has a stronger refractive power than its image side surface, a bi-concave lens element whose image side surface has a stronger refractive power than its object side surface, and a biconvex lens element.

35. A zoom lens system as claimed in claim 34, wherein the lens system fulfills the following conditions:

$$0.30 < f_6/f_5 < 0.60$$

$$0.10 < R_{7R}/R_{7P} < 0.50 \ (R_{7P} < 0)$$

$$0.20 < T_7/f_W < 0.60$$

wherein:
- $f_i$ represents the focal length of the i-th lens element counted from the object side;
- R represents the radius of curvature, wherein the first subscript thereof represents the lens number counted from the object side, and the second subscript thereof, that is, P, represents the object side surface, and R represents the image side surface;
- $T_7$ represents the axial thickness of the seventh lens element counted from the object side; and
- $f_w$ represents the shortest focal length of the whole lens system.

36. A zoom lens system comprising from the object side to the image side:
- a first lens unit of a positive refractive power, consisting of a negative meniscus lens element having an object side surface convex to the object side, and a biconvex lens element whose object side surface has a stronger refractive power than its image side surface;
- a second lens unit of a negative refractive power, consisting of a negative lens element whose image side surface has a stronger refractive power than its object side surface, and a positive meniscus lens element having an object side surface convex to the object side, and
- a third lens unit of a positive refractive power including, from the object side to the image side, a positive lens element whose object side surface has a stronger refractive power than its image side surface, a bi-concave lens element, a positive lens element whose image side surface has a stronger refractive power than its object side surface, and a positive lens element whose object side surface has a stronger refractive power than its image side surface, wherein the second lens unit and the third lens unit are shiftable along the optical axis of the lens system in the zooming operation, while the first lens unit is stationary on the optical axis in the zooming operation.

37. A zoom lens system as claimed in claim 36, wherein the lens system fulfills the following conditions:

$$0.05 < R_{1P}/|R_{2R}| < 0.43 \ (R_{2R} < 0)$$

$$0.30 < R_{4R}/R_{1P} < 0.60$$

$$0.28 < \phi_I/|\phi_{II}| < 0.45 \ (\phi_{II} < 0)$$

$$0.38 < R_{3R}/|\phi_{II}| < 0.75 \ (\phi_{II} < 0)$$

$$0.65 < R_{1R}/R_{2P} < 1.00$$

$$(n_1 + n_4)/2 > 1.78$$

R represents the radius of curvature, wherein the first subscript thereof represents the lens number counted from the object side, and the second subscript thereof, that is, P, represents the object side surface, and R represents the image side surface;
$\phi_I$ represents the refractive power of the first lens unit; and
$\phi_{II}$ represents the refractive power of the second lens unit; and
$n_i$ represents the refractive index of the i-th lens element counted from the object side.

38. A zoom lens system as claimed in claim 36, wherein the lens system fulfills the following conditions:

$$1.0 < A_1/A_2$$

$$0.40 < |R_{6P}|/R_{6R} < 1.20 \ (R_{6P} < 0)$$

$$0.60 < f_7 \cdot \phi_{7R} < 1.30 \ (\phi_{7R} = (n_7 - 1)/|R_{7R}|)$$

$$0.70 < f_8 \cdot \phi_{8P} < 1.60 \ (\phi_{8P} = (n_8 - 1)/R_{8P})$$

wherein:
- $A_1$ represents the axial air space between the fifth lens element and the sixth lens element counted from the object side;
- $A_2$ represents the axial air space between the sixth lens element and the seventh lens element counted from the object side;
- $f_i$ represents the focal length of the i-th lens element counted from the object side; and
- $n_i$ represents the refractive index of the i-th lens element counted from the object side.

39. A zoom lens system as claimed in claim 36, wherein the lens system fulfills the following conditions:

$$0.30 < f_6/f_5 < 0.60$$

$$0.10 < R_{7R}/|R_{7P}| < 0.50 \ (R_{7P} < 0)$$

$$0.20 < T_7/f_W < 0.60$$

wherein:
- $f_i$ represents the focal length of the i-th lens element counted from the object side;
- R represents the radius of curvature, wherein the first subscript thereof represents the lens number counted from the object side, and the second subscript thereof, that is, P, represents the object side surface, and R represents the image side surface;
- $T_7$ represents the axial thickness of the seventh lens element counted from the object side; and
- $f_w$ represents the shortest focal length of the whole lens system.

* * * * *